US012621116B2

(12) United States Patent
Kadiri et al.

(10) Patent No.: US 12,621,116 B2
(45) Date of Patent: May 5, 2026

(54) CARRIER AGGREGATION SCELL NEW STATE TRANSITION DESIGN

(71) Applicant: QUALCOMM Incorporated, San Diego, CA (US)

(72) Inventors: Prasad Kadiri, San Diego, CA (US); Umesh Phuyal, San Diego, CA (US)

( * ) Notice: Subject to any disclaimer, the term of this patent is extended or adjusted under 35 U.S.C. 154(b) by 36 days.

(21) Appl. No.: 18/626,277

(22) Filed: Apr. 3, 2024

(65) Prior Publication Data

US 2024/0259174 A1 Aug. 1, 2024

Related U.S. Application Data

(62) Division of application No. 16/224,311, filed on Dec. 18, 2018, now Pat. No. 11,968,154.

(Continued)

(51) Int. Cl.
*H04L 5/00* (2006.01)
*H04W 36/00* (2009.01)
(Continued)

(52) U.S. Cl.
CPC ............ *H04L 5/0098* (2013.01); *H04L 5/001* (2013.01); *H04L 5/0053* (2013.01);
(Continued)

(58) Field of Classification Search
CPC ............... H04L 5/00551; H04L 5/0011; H04L 5/00461; H04L 5/00731; H04L 5/18251;
(Continued)

(56) References Cited

U.S. PATENT DOCUMENTS

2005/0265350 A1 12/2005 Narasimha et al.
2011/0134774 A1 6/2011 Pelletier et al.
(Continued)

FOREIGN PATENT DOCUMENTS

CA 2982800 A1 10/2016
CN 103889027 A 6/2014
(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 14)", 3GPP Standard; Technical Specification; 3GPP TS 36.321, 3rd Generation Partnership Project, Mobile Competence Centre, 650, Route Des Lucioles, F-06921 Sophia-Antipolis Cedex, France, vol. RAN WG2, No. V14.4.0, Sep. 25, 2017, XP051337312, pp. 1-108, sections 5.13 and 6.1.3.8.
(Continued)

*Primary Examiner* — Atique Ahmed

(57) ABSTRACT

Aspects of the disclosure relate to a method of operating a user equipment (UE) for wireless communication with a network. In some aspects, the UE obtains a medium access control (MAC) control element (CE) from a network. The MAC CE may be configured to indicate any one of a plurality of state transition actions for a secondary cell. The UE transitions to a secondary cell dormant state when a state transition action indicated by the MAC CE includes a transition to the secondary cell dormant state. The UE operates in the secondary cell dormant state.

20 Claims, 42 Drawing Sheets

Related U.S. Application Data

(60) Provisional application No. 62/619,692, filed on Jan. 19, 2018, provisional application No. 62/607,889, filed on Dec. 19, 2017.

(51) Int. Cl.

| | |
|---|---|
| *H04W 36/08* | (2009.01) |
| *H04W 72/0453* | (2023.01) |
| *H04W 76/11* | (2018.01) |
| *H04W 76/27* | (2018.01) |
| H04W 80/02 | (2009.01) |

(52) U.S. Cl.
CPC . *H04W 36/0069* (2018.08); *H04W 36/00692* (2023.05); *H04W 36/08* (2013.01); *H04W 72/0453* (2013.01); *H04W 76/11* (2018.02); *H04W 76/27* (2018.02); *H04W 80/02* (2013.01)

(58) Field of Classification Search
CPC ..... H04L 5/1854; H04L 5/0098; H04L 5/001; H04L 5/0053; H04W 36/0069; H04W 36/00692; H04W 36/08; H04W 72/0453; H04W 76/11; H04W 76/27; H04W 80/02; Y02D 30/70
See application file for complete search history.

(56) References Cited

U.S. PATENT DOCUMENTS

| | | | | |
|---|---|---|---|---|
| 2011/0292854 | A1 | 12/2011 | Terry et al. | |
| 2012/0224552 | A1* | 9/2012 | Feuersanger | H04L 5/0007 |
| | | | | 370/329 |
| 2012/0281544 | A1 | 11/2012 | Anepu et al. | |
| 2013/0010611 | A1 | 1/2013 | Wiemann et al. | |
| 2013/0182687 | A1 | 7/2013 | Ng et al. | |
| 2013/0215772 | A1 | 8/2013 | Kaur et al. | |
| 2014/0029514 | A1 | 1/2014 | Yu et al. | |
| 2014/0161111 | A1* | 6/2014 | Kim | H04W 56/0045 |
| | | | | 370/336 |
| 2015/0003312 | A1 | 1/2015 | Jeong et al. | |
| 2015/0110011 | A1 | 4/2015 | Wei | |
| 2015/0208269 | A1 | 7/2015 | Damnjanovic et al. | |
| 2015/0215929 | A1* | 7/2015 | Damnjanovic | H04W 72/21 |
| | | | | 370/241 |
| 2015/0271806 | A1 | 9/2015 | Kim et al. | |
| 2015/0304915 | A1 | 10/2015 | Uchino et al. | |
| 2016/0119969 | A1 | 4/2016 | Vajapeyam et al. | |
| 2016/0212737 | A1* | 7/2016 | Jang | H04L 5/0053 |
| 2016/0255611 | A1 | 9/2016 | Damnjanovic et al. | |
| 2016/0278083 | A1 | 9/2016 | Dinan | |
| 2016/0301513 | A1* | 10/2016 | He | H04L 5/0098 |
| 2016/0329993 | A1* | 11/2016 | Kim | H04W 72/23 |

| | | | | |
|---|---|---|---|---|
| 2017/0041820 | A1 | 2/2017 | Wei et al. | |
| 2017/0041880 | A1 | 2/2017 | Ouchi et al. | |
| 2017/0085345 | A1 | 3/2017 | Dinan | |
| 2017/0086172 | A1 | 3/2017 | Dinan | |
| 2017/0099667 | A1 | 4/2017 | Dinan | |
| 2017/0111888 | A1 | 4/2017 | Dinan | |
| 2017/0201306 | A1 | 7/2017 | Shimezawa et al. | |
| 2018/0020503 | A1* | 1/2018 | Deenoo | H04W 72/046 |
| 2018/0317123 | A1* | 11/2018 | Chen | H04W 72/21 |
| 2019/0141546 | A1 | 5/2019 | Zhou et al. | |
| 2019/0166631 | A1* | 5/2019 | Park | H04W 72/23 |
| 2019/0190682 | A1 | 6/2019 | Kadiri et al. | |
| 2020/0008259 | A1* | 1/2020 | Aiba | H04W 72/12 |
| 2020/0128557 | A1* | 4/2020 | Suzuki | H04L 5/0044 |

FOREIGN PATENT DOCUMENTS

| | | | | |
|---|---|---|---|---|
| CN | 104581800 | A | 4/2015 | |
| CN | 104811929 | A | 7/2015 | |
| CN | 105451364 | A | 3/2016 | |
| CN | 105850189 | A | 8/2016 | |
| CN | 106301721 | A | 1/2017 | |
| KR | 20130050264 | A * | 5/2013 | H04W 76/28 |
| WO | 2014084111 | A1 | 6/2014 | |
| WO | 2015141177 | A1 | 9/2015 | |
| WO | 2015152554 | A1 | 10/2015 | |
| WO | 2019014003 | | 1/2019 | |

OTHER PUBLICATIONS

International Preliminary Report on Patentability—PCT/US2018/066559, The International Bureau of WIPO—Geneva, Switzerland, Jul. 2, 2020.

International Search Report and Written Opinion—PCT/US2018/066559—ISA/EPO—Apr. 2, 2019.

Nokia, et al., "Faster Activation for SCells", 3GPP Draft, 3GPP TSG-RAN WG2 #99bis, R2-1710997, Faster Activation for SCells, 3rd Generation Partnership Project (3GPP), Mobile Competence Centre, 650, Route Des Lucioles, F-06921 Sophia-Antipolis Cedex, France, vol. RAN WG2, No. Prague, Czech Republic; Oct. 9, 2017-Oct. 13, 2017, Oct. 8, 2017, XP051343007, Section 2, 5 pages.

Qualcomm Inc, et al., "Fast Scell Activation for Enhanced CA Utilization", 3GPP Draft, 3GPP TSG-RAN2 Meeting #100, R2-1712255_Fast Scell Activation for Enhanced CA Utilization_V3, 3rd Generation Partnership Project (3GPP), Mobile Competence Centre, 650, Route Des Lucioles, F-06921 Sophia-Antipolis Cedex, France, vol. RAN WG2, No. Reno, USA; Nov. 27, 2017-Dec. 1, 2017 Nov. 16, 2017, XP051370932, sections 2 and 3, proposals 1-3 and observation 8; figure 1, 8 pages, Parts 2 to 3.

Taiwan Search Report—TW107145852—TIPO—Dec. 20, 2021.

Taiwan Search Report—TW107145852—TIPO—Sep. 7, 2022.

Taiwan Search Report—TW111124178—TIPO—Dec. 26, 2022.

\* cited by examiner

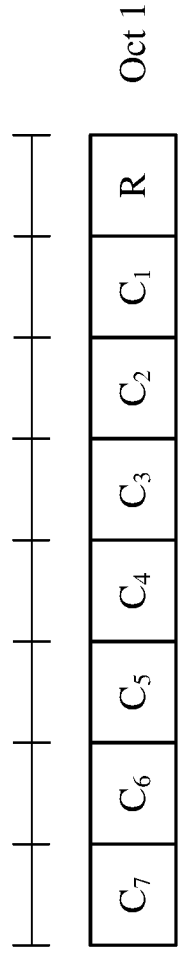
FIG. 7

| | Oct 1 | Oct 2 | Oct 3 | Oct 4 |
|---|---|---|---|---|
| | R | $C_8$ | $C_{16}$ | $C_{24}$ |
| | $C_1$ | $C_9$ | $C_{17}$ | $C_{25}$ |
| | $C_2$ | $C_{10}$ | $C_{18}$ | $C_{26}$ |
| | $C_3$ | $C_{11}$ | $C_{19}$ | $C_{27}$ |
| | $C_4$ | $C_{12}$ | $C_{20}$ | $C_{28}$ |
| | $C_5$ | $C_{13}$ | $C_{21}$ | $C_{29}$ |
| | $C_6$ | $C_{14}$ | $C_{22}$ | $C_{30}$ |
| | $C_7$ | $C_{15}$ | $C_{23}$ | $C_{31}$ |

800

900

| Index | LCID Values |
|---|---|
| 00000 | CCCH |
| 00001-01010 | Identity of the logical channel |
| 01011-11000 | Reserved |
| 10111 | Fast Activation/Deactivation (4 octets) |
| 10110 | Fast Activation/Deactivation (1 octet) |
| 10101 | Activation/Deactivation of CSI-RS |
| 10110 | Recommended bit rate |
| 10111 | SC-PTM Stop Indication |
| 11000 | Activation/Deactivation (4 octets) |
| 11001 | SC-MCCH, SC-MTCH (see Note) |
| 11010 | Long DRX Command |
| 11011 | Activation/Deactivation (1 octet) |
| 11100 | UE Contention Resolution Identity |
| 11101 | Timing Advance Command |
| 11110 | DRX Command |
| 11111 | Padding |

| | State Transition | New MAC-CE Value | Legacy MAC-CE Value |
|---|---|---|---|
| 1002 | Deactivated -> New State | 1 | -- |
| 1004 | Deactivated -> New State | 1 | X |
| | Deactivated -> Activated | -- | 1 |
| | Deactivated -> Activated | 0 | 1 |
| 1006 | Activated -> New State | 1 | -- |
| 1008 | Activated -> New State | 1 | X |
| | Activated -> Deactivated | -- | 0 |
| | Activated -> Deactivated | 0 | 0 |

1100

| State Transition | New MAC-CE Value | Legacy MAC-CE Value |
|---|---|---|
| New State -> Activated | 0 | 1 |
| New State -> Deactivated | 0 | 0 |

1102

1104

1300

| State Transition | New MAC-CE Value | Legacy MAC-CE Value |
|---|---|---|
| Activated -> New State | 1 | -- |
| Activated -> New State | 1 | 1 |
| Activated (no transition) | 0 | 1 |
| Activated -> Deactivated | X | 0 |
| New State -> Activated | 0 | -- |
| New State -> Activated | 0 | X |
| Deactivated -> Activated | X | 1 |
| Deactivated -> Activated | -- | 1 |

1302 (first row)
1304 (second row)
1306 (fifth row)
1308 (sixth row)

1500

| State Transition | New MAC-CE Value | Legacy MAC-CE Value |
|---|---|---|
| Activated -> New State | 1 | -- |
| Activated -> New State | 1 | X |
| New State -> Activated | 0 | 1 |
| New State -> Deactivated | 0 | 0 |
| Deactivated -> Activated | -- | 1 |
| Deactivated -> Activated | X | 1 |
| Activated -> Deactivated | 0 | 0 |
| Activated -> Deactivated | -- | 0 |

1502

1504

1506

1508

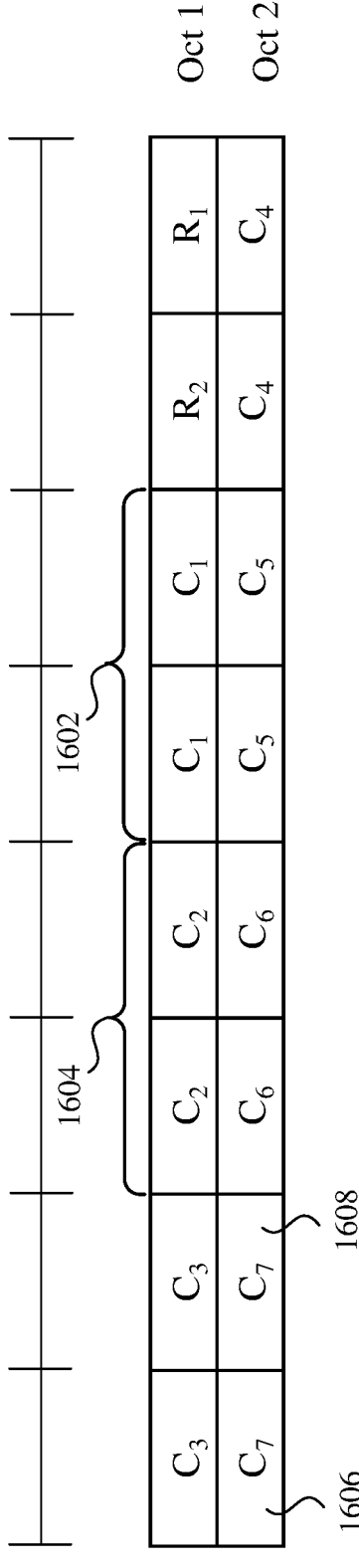
FIG. 16

| | Oct 1 | Oct 2 | Oct 3 | Oct 4 | Oct 5 | Oct 6 | Oct 7 | Oct 8 |
|---|---|---|---|---|---|---|---|---|
| | $R_1$ | $C_4$ | $C_8$ | $C_{12}$ | $C_{16}$ | $C_{20}$ | $C_{24}$ | $C_{28}$ |
| | $R_2$ | $C_4$ | $C_8$ | $C_{12}$ | $C_{16}$ | $C_{20}$ | $C_{24}$ | $C_{28}$ |
| 1702 | $C_1$ | $C_5$ | $C_9$ | $C_{13}$ | $C_{17}$ | $C_{21}$ | $C_{25}$ | $C_{29}$ |
| | $C_1$ | $C_5$ | $C_9$ | $C_{13}$ | $C_{17}$ | $C_{21}$ | $C_{25}$ | $C_{29}$ |
| 1704 | $C_2$ | $C_6$ | $C_{10}$ | $C_{14}$ | $C_{18}$ | $C_{22}$ | $C_{26}$ | $C_{30}$ |
| | $C_2$ | $C_6$ | $C_{10}$ | $C_{14}$ | $C_{18}$ | $C_{22}$ | $C_{26}$ | $C_{30}$ |
| | $C_3$ | $C_7$ | $C_{11}$ | $C_{15}$ | $C_{19}$ | $C_{23}$ | $C_{27}$ | $C_{31}$ |
| | $C_3$ | $C_7$ | $C_{11}$ | $C_{15}$ | $C_{19}$ | $C_{23}$ | $C_{27}$ | $C_{31}$ |

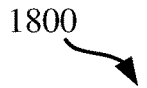

1802

| Index | LCID Values |
|---|---|
| 00000 | CCCH |
| 00001-01010 | Identity of the logical channel |
| 01011-10111 | Reserved |
| 10110 | Fast Activation/Deactivation |
| 10101 | Activation/Deactivation of CSI-RS |
| 10110 | Recommended bit rate |
| 10111 | SC-PTM Stop Indication |
| 11000 | Activation/Deactivation (4 octets) |
| 11001 | SC-MCCH, SC-MTCH (see Note) |
| 11010 | Long DRX Command |
| 11011 | Activation/Deactivation (1 octet) |
| 11100 | UE Contention Resolution Identity |
| 11101 | Timing Advance Command |
| 11110 | DRX Command |
| 11111 | Padding |

| $C_iC_i$ value for New MAC CE | Action |
|---|---|
| 00 | No Change |
| 01 | New State |
| 10 | Activated |
| 11 | Deactivated |

1902 →
1904 →
1906 →
1908 →

2000

| Source State | Target State | $C_iC_i$ value for New MAC CE | Legacy MAC CE |
|---|---|---|---|
| Deactivated | Activated | 10 | X |
| Deactivated | New | 01 | X |
| Deactivated | Deactivated | 00 | X |
| Activated | Deactivated | 11 | X |
| Activated | New | 01 | X |
| Activated | Activated | 00 | X |
| New | Activated | 10 | X |
| New | Deactivated | 11 | X |
| New | New | 00 | X |

2002
2004
2006
2008
2010
2012
2014
2016
2018

2100

| Source State | Target State | $C_iC_i$ value for New MAC CE | Legacy MAC CE |
|---|---|---|---|
| Deactivated | Activated | 10 | X |
| Deactivated | Deactivated | 00 | X |
| Activated | Deactivated | 11 | X |
| Activated | New | 01 | X |
| Activated | Activated | 00 | X |
| New | Activated | 10 | X |
| New | New | 00 | X |

2102
2104
2106
2108
2110
2112
2114

2200

| Source State | Target State | $C_iC_i$ value for New MAC CE | Legacy MAC CE |
|---|---|---|---|
| Deactivated | Activated | 10 | X |
| Deactivated | Deactivated | 00 | X |
| Activated | Deactivated | 11 | X |
| Activated | New | 01 | X |
| Activated | Activated | 00 | X |
| New | Activated | 10 | X |
| New | Deactivated | 11 | X |
| New | New | 00 | X |

2202
2204
2206
2208
2210
2212
2214
2216

2300

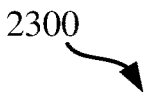

2302

Obtain a medium access control (MAC) control element (CE) from a network, wherein the MAC CE is configured to indicate any one of a plurality of state transition actions for a secondary cell.

2304

Transition to a secondary cell fast activation state when a state transition action indicated by the MAC CE includes a transition to the secondary cell fast activation state.

2306

Operate in the secondary cell fast activation state.

FIG. 23

2400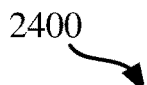

2402

Obtain a medium access control (MAC) control element (CE) from a network, wherein the MAC CE is configured to indicate any one of a plurality of state transition actions for a secondary cell.

2404

Transition to a secondary cell activated state from either a secondary cell deactivated state or a secondary cell fast activation state when a state transition action indicated by the MAC CE includes a transition to the secondary cell activated state.

2406

Transition to the secondary cell deactivated state from either the secondary cell activated state or the secondary cell fast activation state when the state transition action indicated by the MAC CE includes a transition to the secondary cell deactivated state.

2408

Operate in the secondary cell activated state based on the transition to the secondary cell activated state or operate in the secondary cell deactivated state based on the transition to the secondary cell deactivated state.

FIG. 24

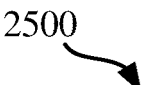
2500
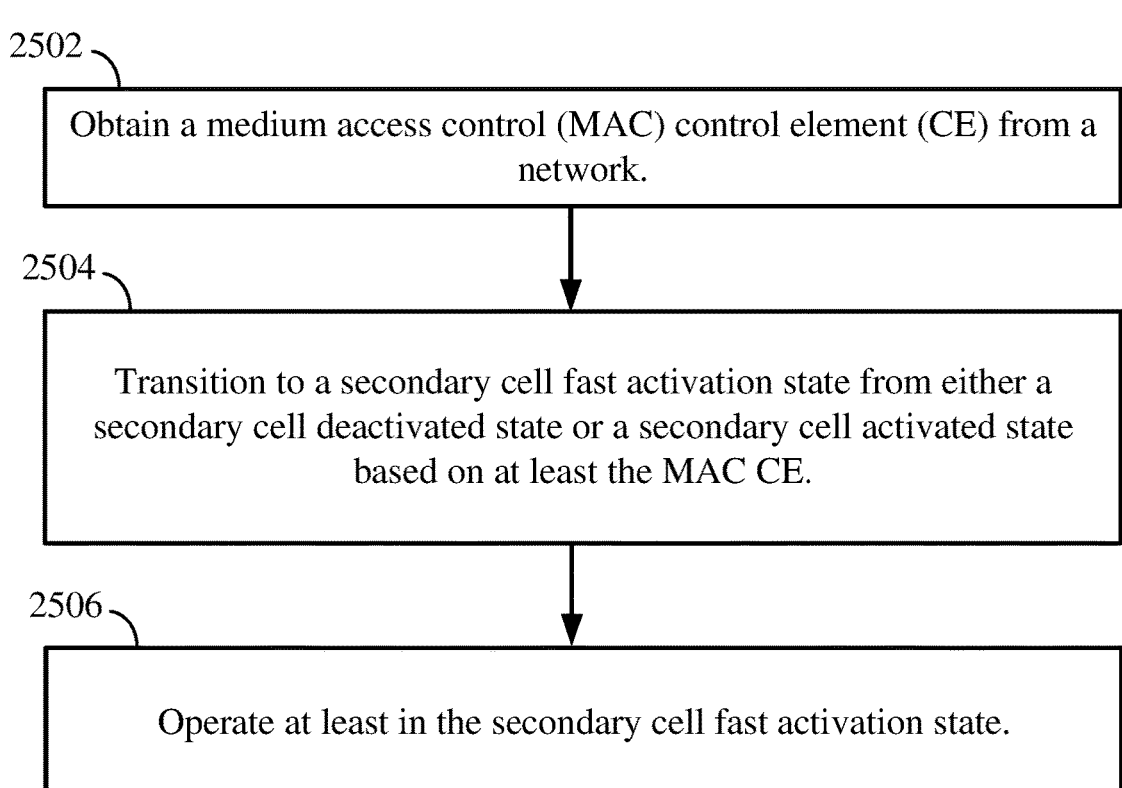
2502
> Obtain a medium access control (MAC) control element (CE) from a network.
2504
> Transition to a secondary cell fast activation state from either a secondary cell deactivated state or a secondary cell activated state based on at least the MAC CE.
2506
> Operate at least in the secondary cell fast activation state.
FIG. 25

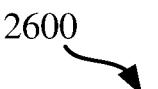
2600
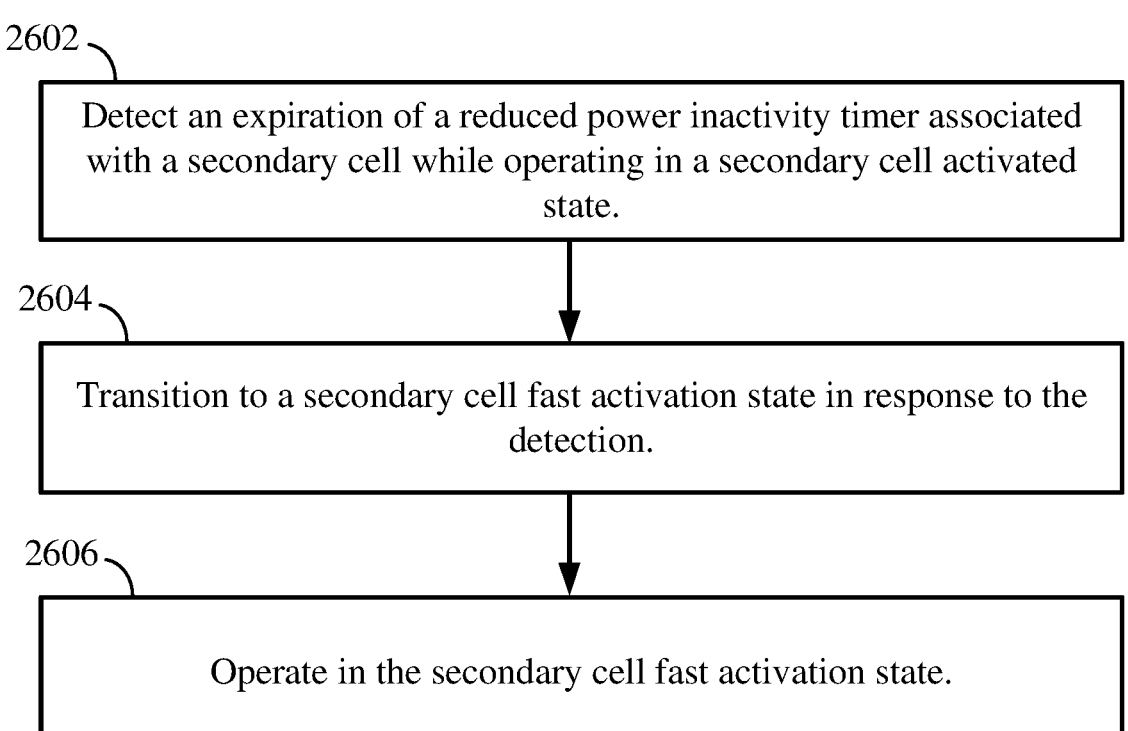
2602
Detect an expiration of a reduced power inactivity timer associated with a secondary cell while operating in a secondary cell activated state.
2604
Transition to a secondary cell fast activation state in response to the detection.
2606
Operate in the secondary cell fast activation state.
FIG. 26

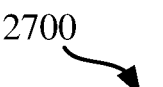
2700
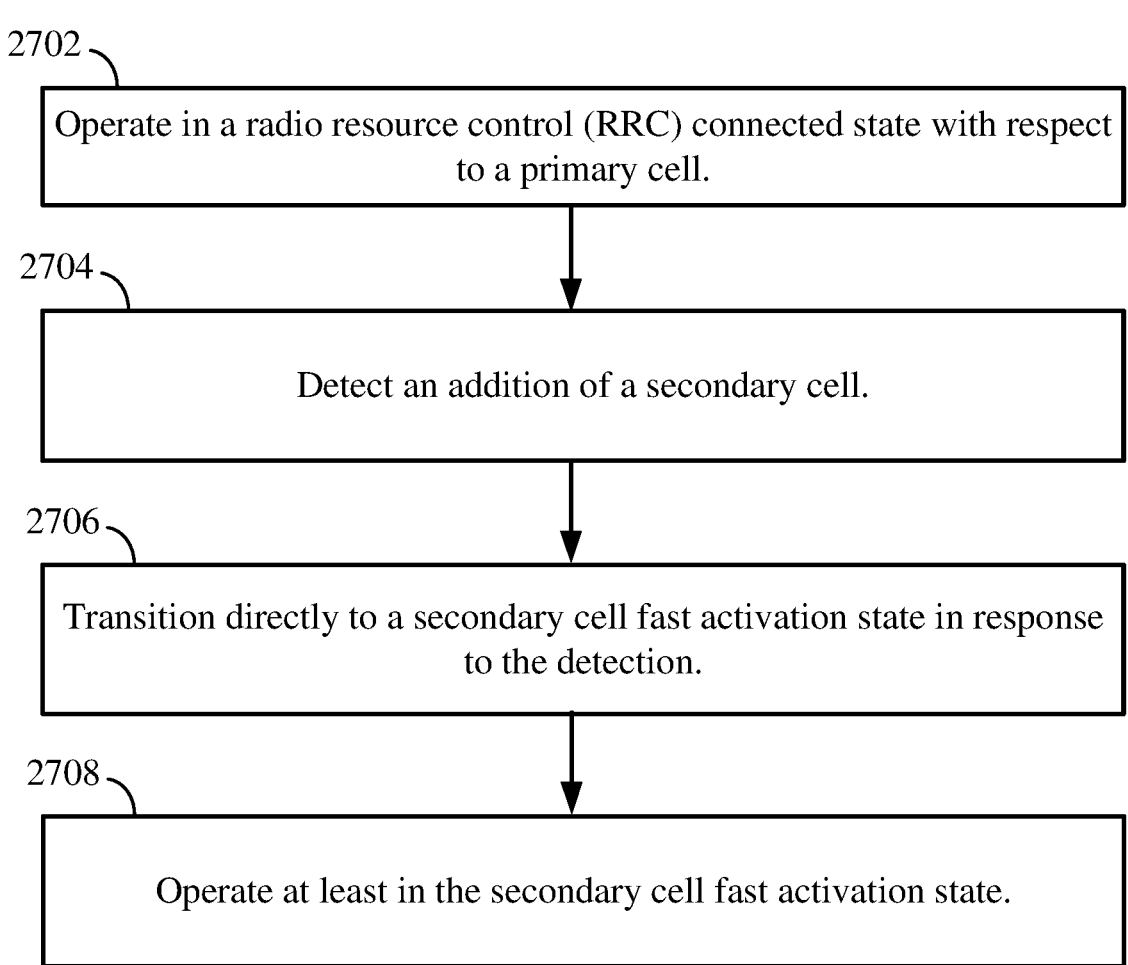
2702
Operate in a radio resource control (RRC) connected state with respect to a primary cell.
2704
Detect an addition of a secondary cell.
2706
Transition directly to a secondary cell fast activation state in response to the detection.
2708
Operate at least in the secondary cell fast activation state.
FIG. 27

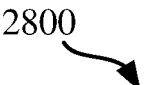

2800

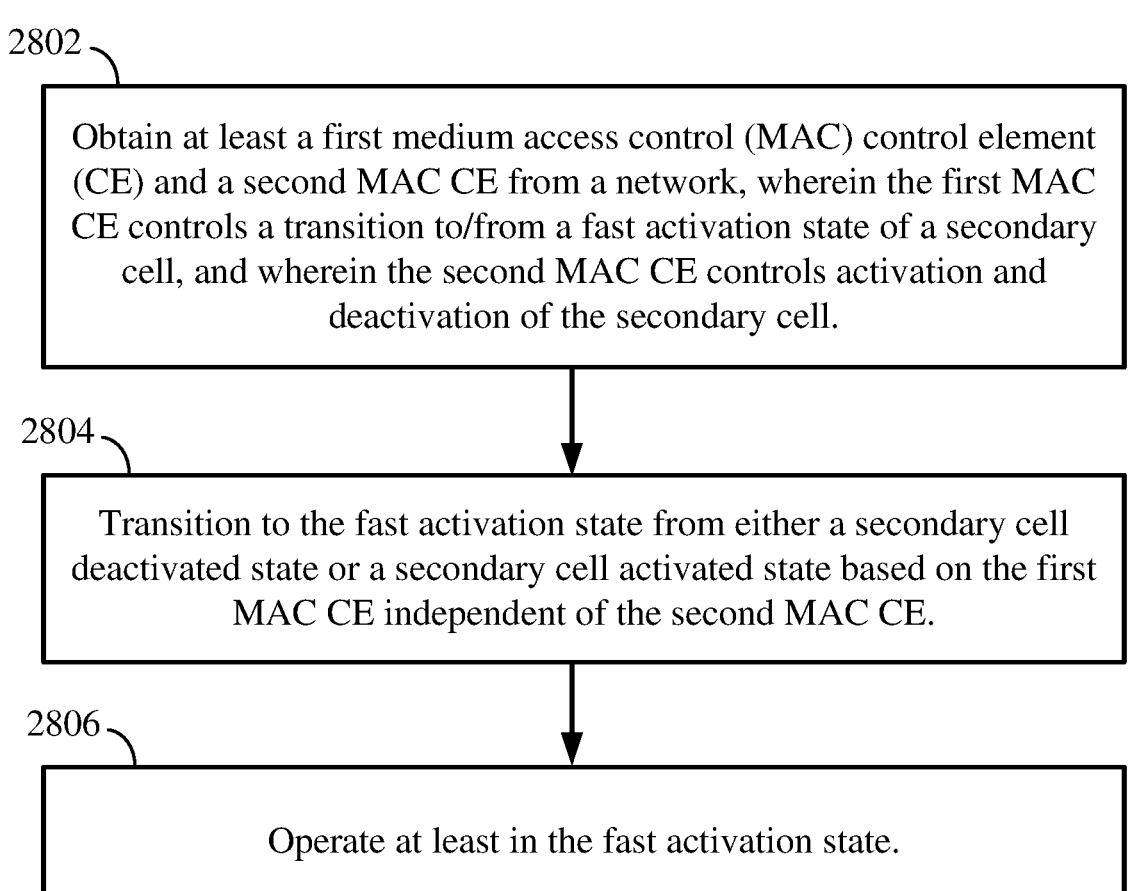

2802

Obtain at least a first medium access control (MAC) control element (CE) and a second MAC CE from a network, wherein the first MAC CE controls a transition to/from a fast activation state of a secondary cell, and wherein the second MAC CE controls activation and deactivation of the secondary cell.

2804

Transition to the fast activation state from either a secondary cell deactivated state or a secondary cell activated state based on the first MAC CE independent of the second MAC CE.

2806

Operate at least in the fast activation state.

Figure 29:
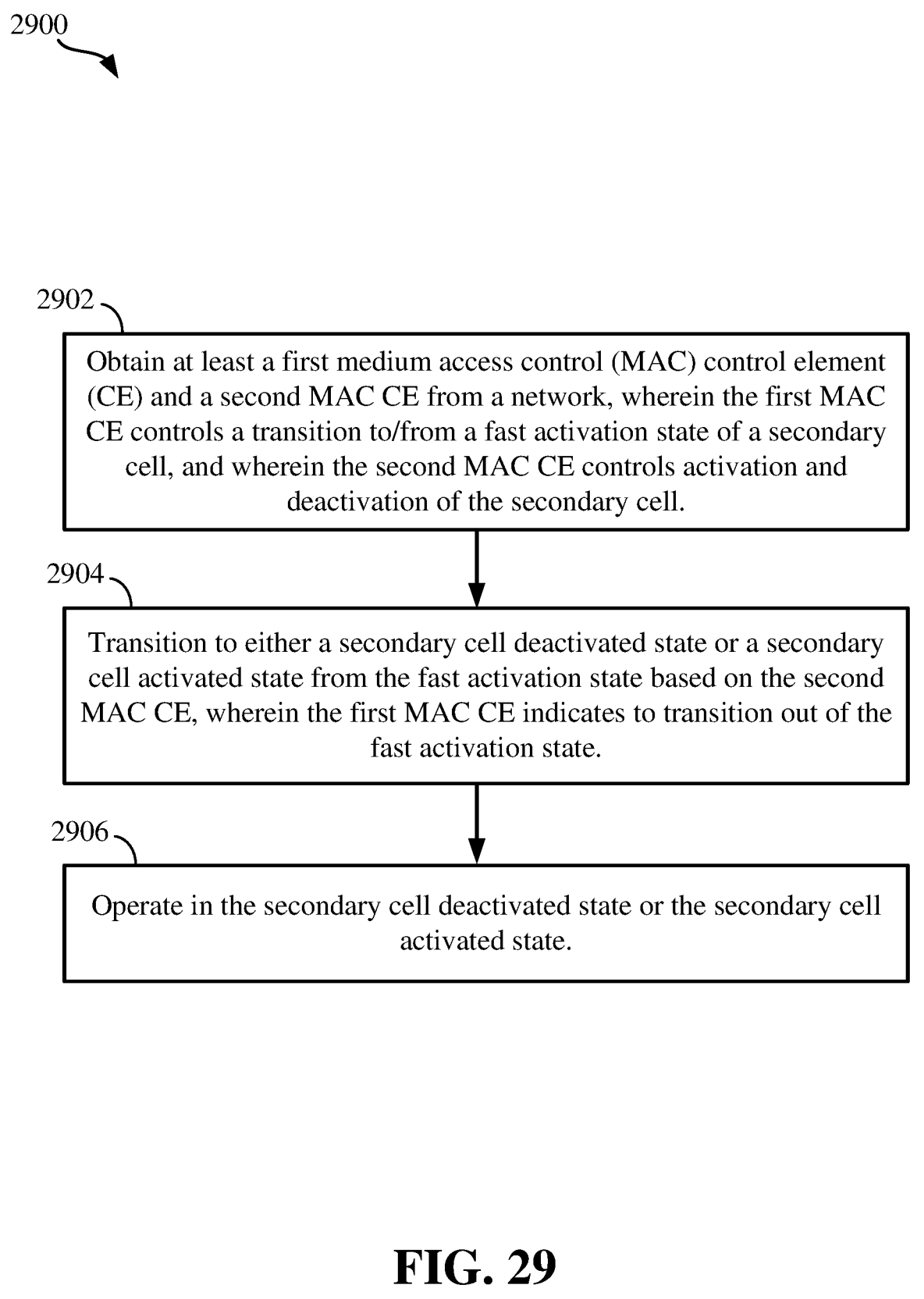

Obtain at least a first medium access control (MAC) control element (CE) and a second MAC CE from a network, wherein the first MAC CE controls a transition to/from a fast activation state of a secondary cell, and wherein the second MAC CE controls activation and deactivation of the secondary cell.

2904

Transition to either a secondary cell deactivated state or a secondary cell activated state from the fast activation state based on the second MAC CE, wherein the first MAC CE indicates to transition out of the fast activation state.

2906

Operate in the secondary cell deactivated state or the secondary cell activated state.

Figure 30:
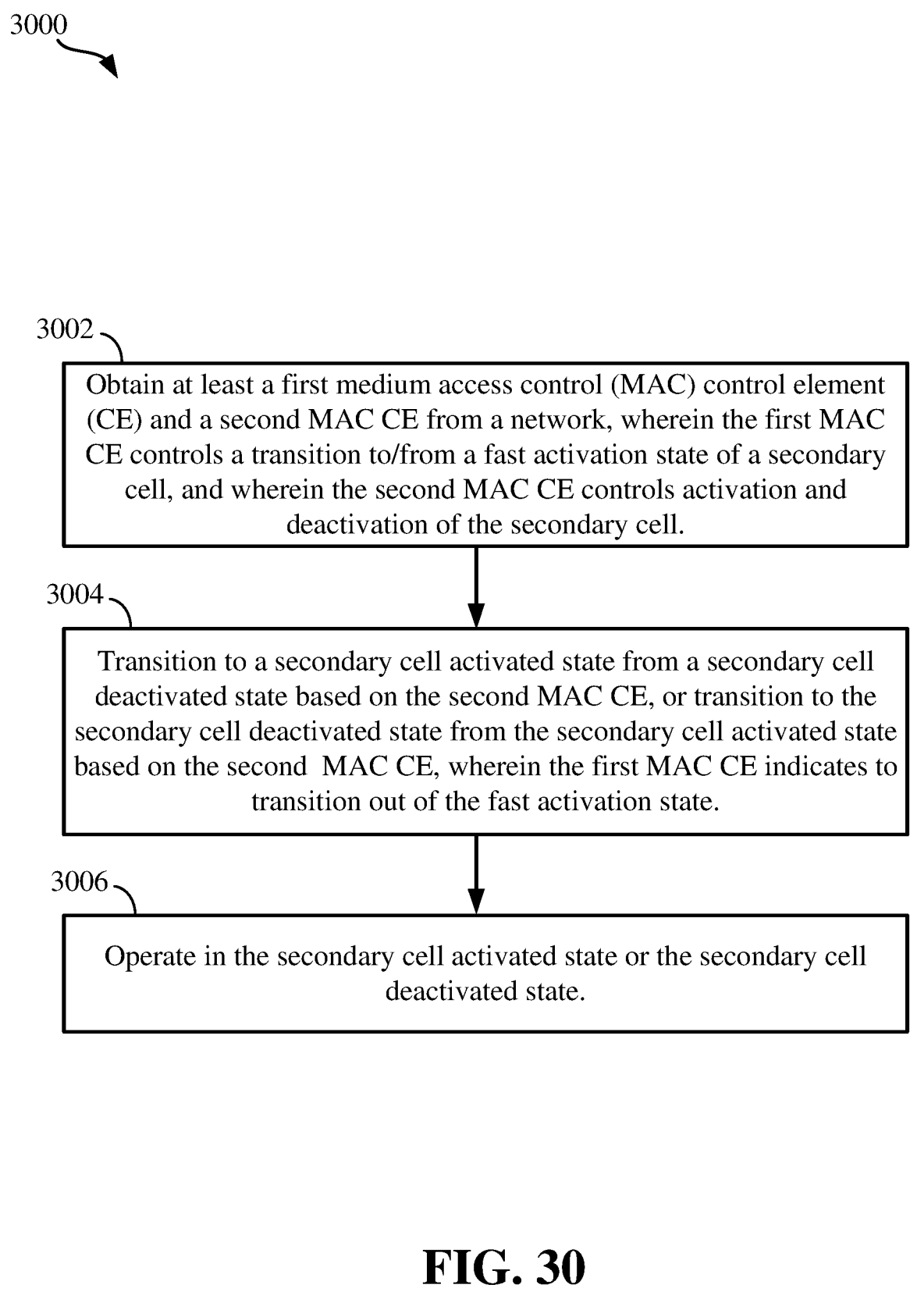

Obtain at least a first medium access control (MAC) control element (CE) and a second MAC CE from a network, wherein the first MAC CE controls a transition to/from a fast activation state of a secondary cell, and wherein the second MAC CE controls activation and deactivation of the secondary cell.

3004

Transition to a secondary cell activated state from a secondary cell deactivated state based on the second MAC CE, or transition to the secondary cell deactivated state from the secondary cell activated state based on the second MAC CE, wherein the first MAC CE indicates to transition out of the fast activation state.

3006

Operate in the secondary cell activated state or the secondary cell deactivated state.

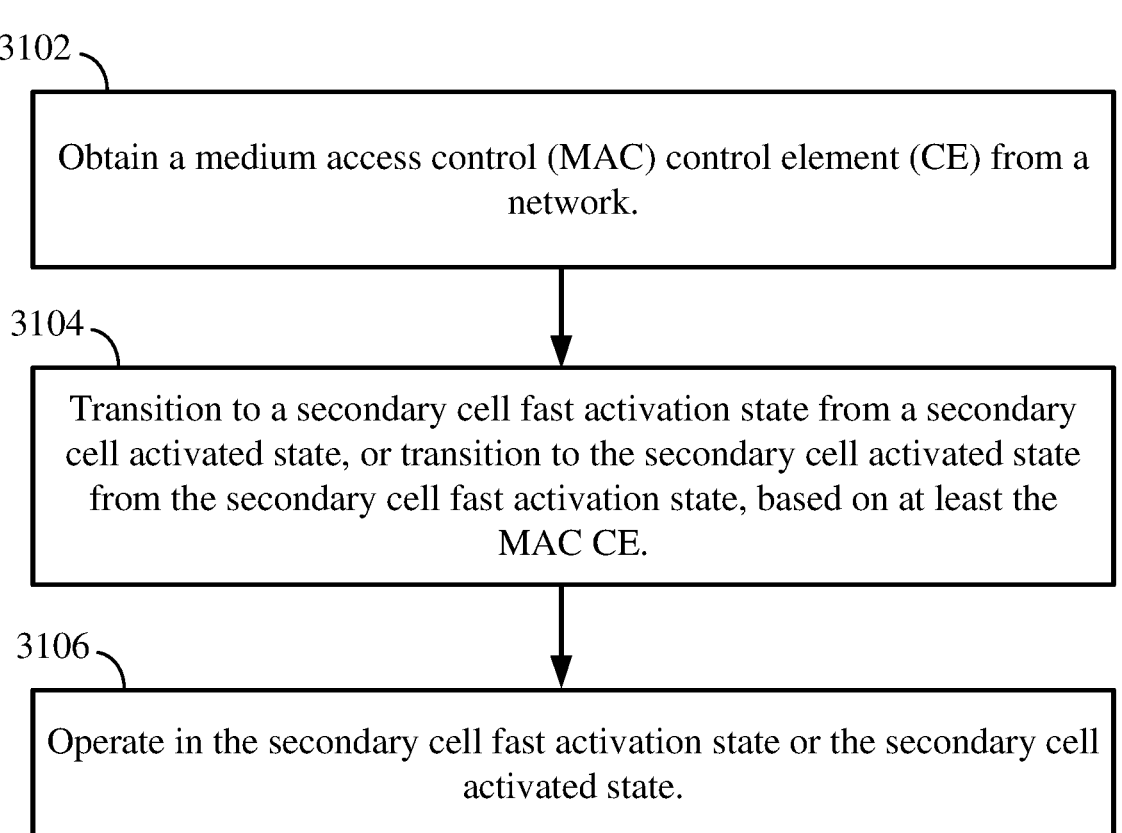

3102

Obtain a medium access control (MAC) control element (CE) from a network.

3104

Transition to a secondary cell fast activation state from a secondary cell activated state, or transition to the secondary cell activated state from the secondary cell fast activation state, based on at least the MAC CE.

3106

Operate in the secondary cell fast activation state or the secondary cell activated state.

FIG. 31

3200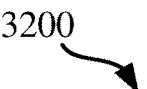
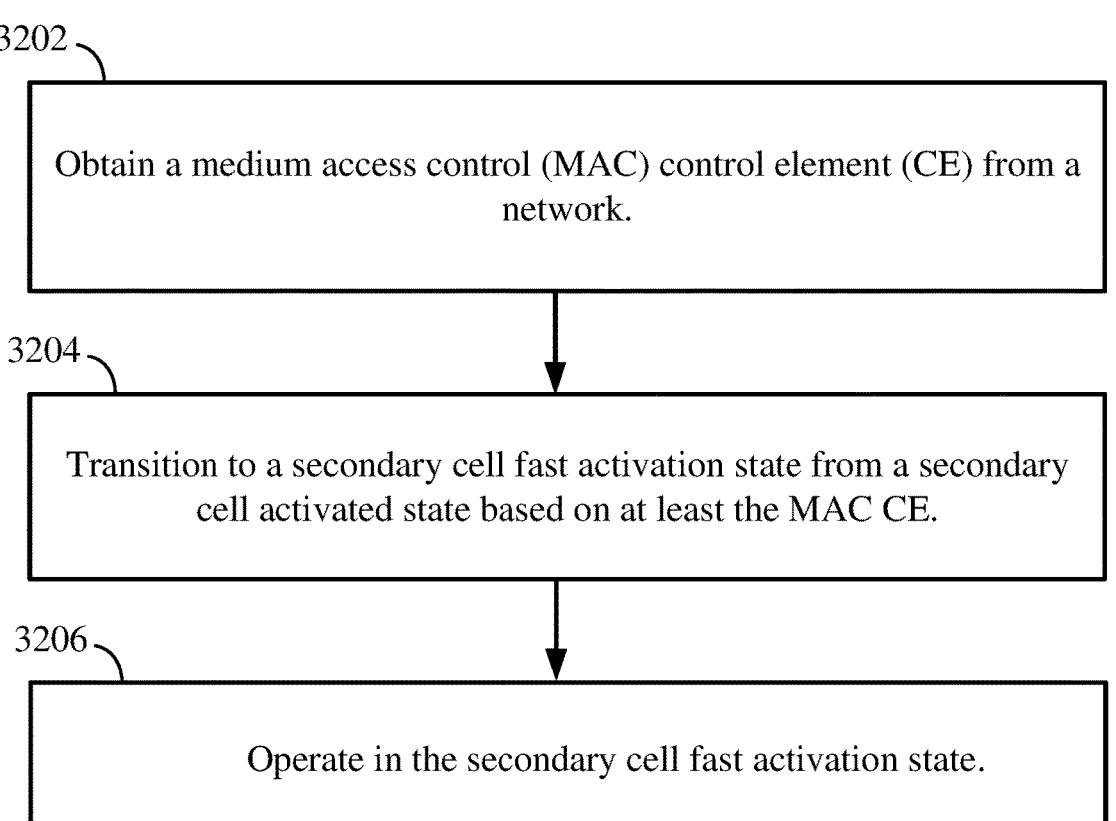
3202
Obtain a medium access control (MAC) control element (CE) from a network.
3204
Transition to a secondary cell fast activation state from a secondary cell activated state based on at least the MAC CE.
3206
Operate in the secondary cell fast activation state.
FIG. 32

3300

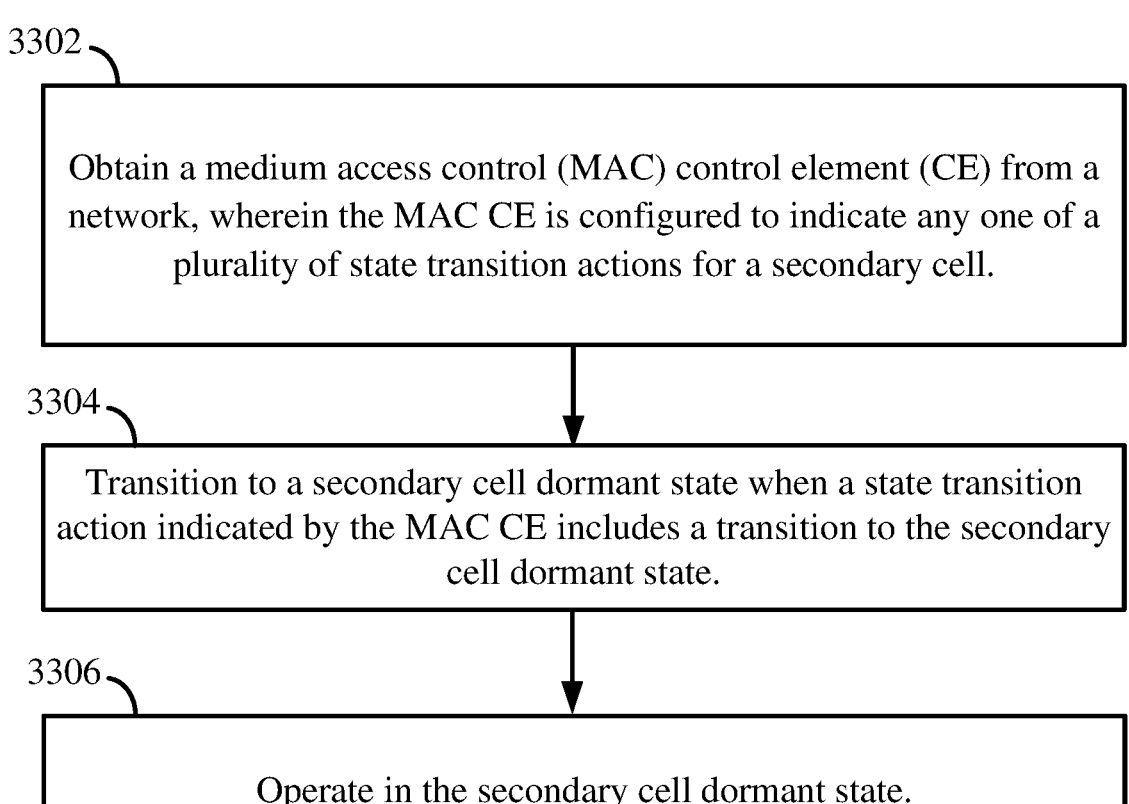

3302

Obtain a medium access control (MAC) control element (CE) from a network, wherein the MAC CE is configured to indicate any one of a plurality of state transition actions for a secondary cell.

3304

Transition to a secondary cell dormant state when a state transition action indicated by the MAC CE includes a transition to the secondary cell dormant state.

3306

Operate in the secondary cell dormant state.

FIG. 33

3400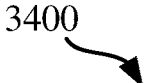

3402

Obtain a medium access control (MAC) control element (CE) from a network, wherein the MAC CE is configured to control activation and deactivation of a secondary cell.

3404

Transition to a secondary cell deactivated state from a secondary cell dormant state when the MAC CE includes an indication to transition to a secondary cell deactivated state.

3406

Operate in the secondary cell deactivated state.

FIG. 34

3500

3502

Obtain a first medium access control (MAC) control element (CE) and a second MAC CE from a network, wherein the first and second MAC CEs are configured to indicate one of a plurality of state transition actions for a secondary cell, wherein the first MAC CE is configured to control a transition to a secondary cell dormant state and the second MAC CE is configured to control activation and deactivation of the secondary cell.

3504

Transition to the secondary cell dormant state from either a secondary cell activated state or a secondary cell deactivated state when the first MAC CE includes an indication to transition to the secondary cell dormant state and the second MAC CE includes an indication to transition to the secondary cell activated state or the secondary cell deactivated state.

3506

Operate in the secondary cell dormant state.

3602

Obtain a first medium access control (MAC) control element (CE) and a second MAC CE from a network, wherein the first and second MAC CEs are configured to indicate one of a plurality of state transition actions for a secondary cell, wherein the first MAC CE is configured to control a transition to a secondary cell dormant state and the second MAC CE is configured to control activation and deactivation of the secondary cell.

3604

Transition to a secondary cell activated state from the secondary cell dormant state when the first MAC CE excludes an indication to transition to the secondary cell dormant state and the second MAC CE includes an indication to transition to the secondary cell activated state.

3606

Transition to a secondary cell deactivated state from the secondary cell dormant state when the first MAC CE excludes an indication to transition to the secondary cell dormant state and the second MAC CE includes an indication to transition to the secondary cell deactivated state.

3608

Operate in the secondary cell activated state based on the transition to the secondary cell activated state or operate in the secondary cell deactivated state based on the transition to the secondary cell deactivated state.

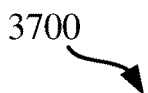

3702

Obtain a first medium access control (MAC) control element (CE) and a second MAC CE from a network, wherein the first and second MAC CEs are configured to indicate one of a plurality of state transition actions for a secondary cell, wherein the first MAC CE is configured to control a transition to a secondary cell dormant state and the second MAC CE is configured to control activation and deactivation of the secondary cell.

3704

Transition to a secondary cell activated state from a secondary cell deactivated state when the first MAC CE excludes an indication to transition to the secondary cell dormant state and the second MAC CE includes an indication to transition to the secondary cell activated state.

3706

Transition to the secondary cell deactivated state from the secondary cell activated state when the first MAC CE excludes an indication to transition to the secondary cell dormant state and the second MAC CE includes an indication to transition to the secondary cell deactivated state.

3708

Operate in the secondary cell activated state based on the transition to the secondary cell activated state or operate in the secondary cell deactivated state based on the transition to the secondary cell deactivated state.

FIG. 37

3800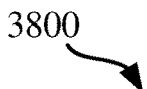

3802

Obtain a medium access control (MAC) control element (CE) from a network, wherein the MAC CE is configured to indicate any one of a plurality of state transition actions for a secondary cell.

3804

Obtain a first logical channel identifier (LCID) value indicating that the MAC CE is a dormant state activation/deactivation MAC CE based on a one octet format or obtain a second LCID value indicating that the MAC CE is the dormant state activation/deactivation MAC CE based on a four octet format.

3806

Identify the MAC CE corresponding to the secondary cell based on the one octet format or the four octet format.

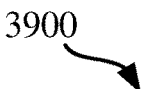

3902

Receive a radio resource control (RRC) connection reconfiguration message, the RRC connection reconfiguration message including an indication to add a secondary cell into a secondary cell activated state or into a secondary cell dormant state.

3904

Transition directly to the secondary cell activated state or the secondary cell dormant state based on the indication.

FIG. 39

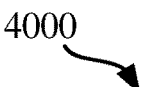
4000
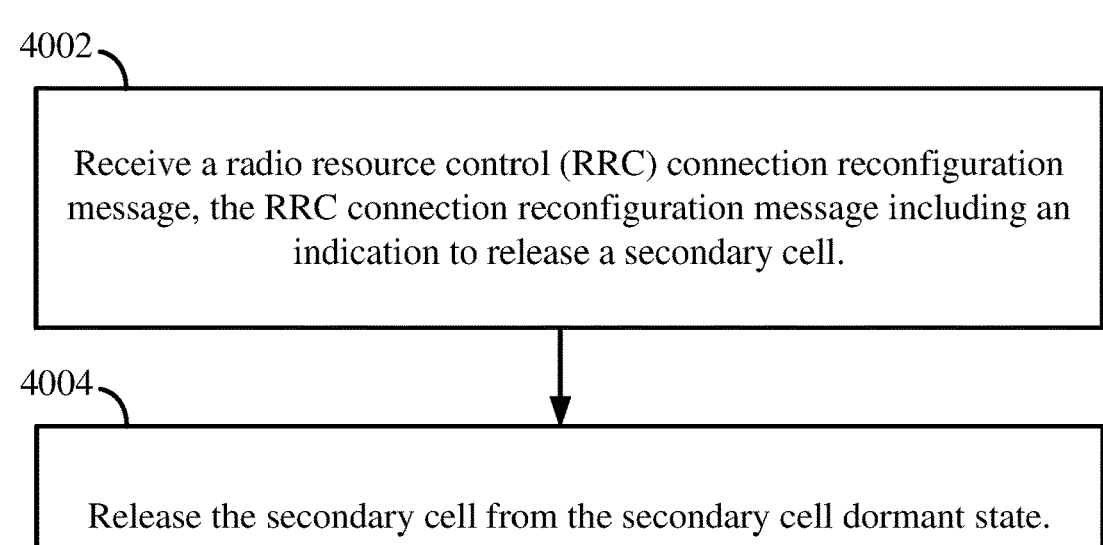
4002
Receive a radio resource control (RRC) connection reconfiguration message, the RRC connection reconfiguration message including an indication to release a secondary cell.
4004
Release the secondary cell from the secondary cell dormant state.
FIG. 40

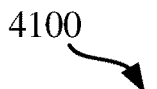
4100
4102
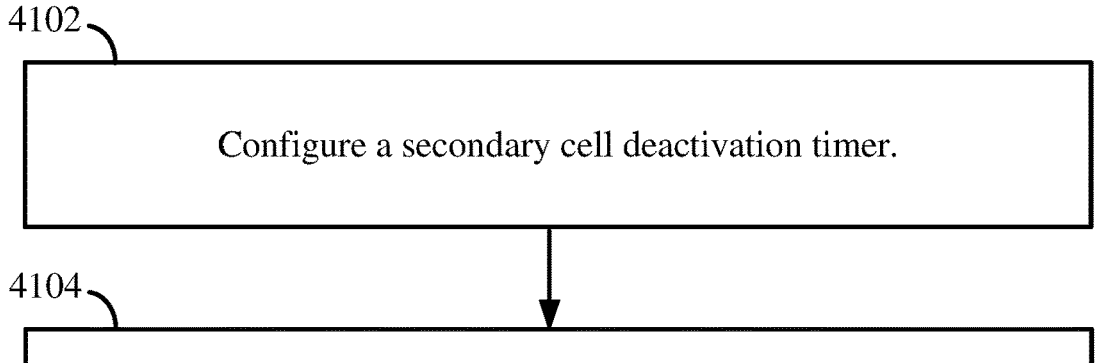
Configure a secondary cell deactivation timer.
4104
Transition to a secondary cell deactivated state from a secondary cell dormant state upon expiration of the secondary cell deactivation timer.
FIG. 41

4200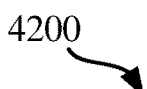

4202

Configure a secondary cell inactivity timer for a secondary cell, wherein the secondary cell inactivity timer controls a transition to a secondary cell dormant state from a secondary cell activated state.

4204

Prioritize the secondary cell inactivity timer over at least one other timer configured for the secondary cell.

4206

Transition to the secondary cell dormant state from the secondary cell activated state upon expiration of the secondary cell inactivity timer.

FIG. 42

CARRIER AGGREGATION SCELL NEW STATE TRANSITION DESIGN

PRIORITY CLAIM

This application is a divisional application of the earlier-filed U.S. patent application Ser. No. 16/224,311 filed in the U.S. Patent and Trademark Office on Dec. 18, 2018, which claims priority to and the benefit of U.S. Provisional Application No. 62/607,889 filed in the U.S. Patent and Trademark Office on Dec. 19, 2017 and U.S. Provisional Application No. 62/619,692 filed in the U.S. Patent and Trademark Office on Jan. 19, 2018, the entire contents of these earlier-filed applications are incorporated herein by reference as if fully set forth below in their entireties and for all applicable purposes.

TECHNICAL FIELD

The technology discussed below relates generally to wireless communication systems, and more particularly, to a carrier aggregation (CA) secondary cell (SCell) new state transition design.

INTRODUCTION

In wireless communication networks equipped with carrier aggregation (CA) features, the operating states of secondary cells (SCells)) may be controlled to improve user equipment (UE) performance (e.g., to reduce power consumption in UEs). In one example, a set of SCells may be configured to operate in an activated state during times when one or more UEs need to communicate with the set of SCells. In another example, to reduce power consumption in the UEs, the set of SCells may be configured to operate in a deactivated state during times when the one or more UEs no longer need to communicate with the set of SCells. As new operating states for the SCells and UEs are introduced to further improve performance, improved mechanisms for controlling the transitions between the new operating states and legacy operating states are needed.

BRIEF DESCRIPTION OF THE DRAWINGS

FIG. 7 illustrates an example format of a legacy SCell activation/deactivation medium access control (MAC) control element (CE) of one octet.

FIG. 9 illustrates a table including a list of example logical channel identifier (LCID) values.

FIG. 16 illustrates an example format of a new SCell activation/deactivation MAC CE of two octets.

FIG. 17 illustrates an example format of a new SCell activation/deactivation MAC CE of eight octets.

FIG. 18 illustrates a table including a list of example logical channel identifier (LCID) values.

FIG. 23 is a flow chart illustrating an exemplary process according to some aspects of the disclosure.

FIG. 24 is a flow chart illustrating an exemplary process according to some aspects of the disclosure.

FIG. 25 is a flow chart illustrating an exemplary process according to some aspects of the disclosure.

FIG. 26 is a flow chart illustrating an exemplary process according to some aspects of the disclosure.

FIG. 27 is a flow chart illustrating an exemplary process according to some aspects of the disclosure.

FIG. 28 is a flow chart illustrating an exemplary process according to some aspects of the disclosure.

FIG. 29 is a flow chart illustrating an exemplary process according to some aspects of the disclosure.

FIG. 30 is a flow chart illustrating an exemplary process according to some aspects of the disclosure.

FIG. 31 is a flow chart illustrating an exemplary process according to some aspects of the disclosure.

FIG. 32 is a flow chart illustrating an exemplary process according to some aspects of the disclosure.

FIG. 33 is a flow chart illustrating an exemplary process according to some aspects of the disclosure.

FIG. 34 is a flow chart illustrating an exemplary process according to some aspects of the disclosure.

FIG. 35 is a flow chart illustrating an exemplary process according to some aspects of the disclosure.

FIG. 36 is a flow chart illustrating an exemplary process according to some aspects of the disclosure.

FIG. 37 is a flow chart illustrating an exemplary process according to some aspects of the disclosure.

FIG. 38 is a flow chart illustrating an exemplary process according to some aspects of the disclosure.

FIG. 39 is a flow chart illustrating an exemplary process according to some aspects of the disclosure.

FIG. 40 is a flow chart illustrating an exemplary process according to some aspects of the disclosure.

FIG. 41 is a flow chart illustrating an exemplary process according to some aspects of the disclosure.

FIG. 42 is a flow chart illustrating an exemplary process according to some aspects of the disclosure.

BRIEF SUMMARY OF SOME EXAMPLES

Figure 1:
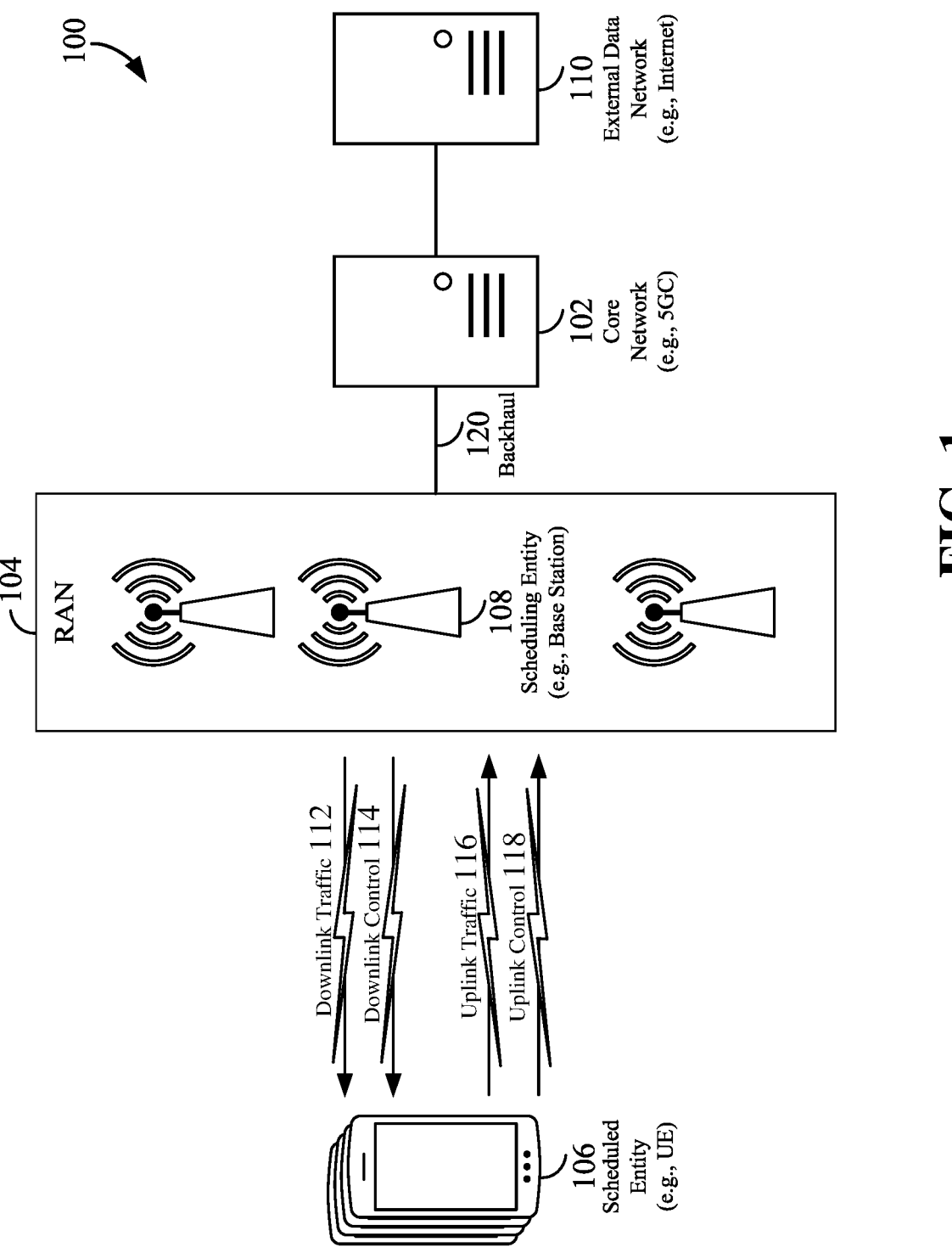
FIG. 1 is a schematic illustration of a wireless communication system.

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method for wireless communication is disclosed. The method may be performed by a scheduled entity (e.g., a user equipment (UE)). The method includes obtaining a medium access control (MAC) control element (CE) from a network, wherein the MAC CE is configured to indicate any one of a plurality of state transition actions for a secondary cell, transitioning to a secondary cell fast activation state when a state transition action indicated by the MAC CE includes a transition to the secondary cell fast activation state, and operating in the secondary cell fast activation state.

In one example, a method for wireless communication is disclosed. The method may be performed by a scheduled entity. The method includes obtaining a MAC CE from a network, wherein the MAC CE is configured to indicate any one of a plurality of state transition actions for a secondary cell. The method further includes transitioning to a secondary cell activated state from either a secondary cell deactivated state or a secondary cell fast activation state when a state transition action indicated by the MAC CE includes a transition to the secondary cell activated state. The method further includes transitioning to the secondary cell deactivated state from either the secondary cell activated state or the secondary cell fast activation state when the state transition action indicated by the MAC CE includes a transition to the secondary cell deactivated state. The method further includes operating in the secondary cell activated state based on the transition to the secondary cell activated state or operating in the secondary cell deactivated state based on the transition to the secondary cell deactivated state.

In one example, an apparatus for wireless communication is disclosed. The apparatus may include at least one processor, a transceiver communicatively coupled to the at least one processor, and a memory communicatively coupled to the at least one processor. The processor is configured to obtain a MAC CE from a network, wherein the MAC CE is configured to indicate any one of a plurality of state transition actions for a secondary cell. The processor is further configured to transition to a secondary cell activated state from either a secondary cell deactivated state or a secondary cell fast activation state when a state transition action indicated by the MAC CE includes a transition to the secondary cell activated state. The processor is further configured to transition to the secondary cell deactivated state from either the secondary cell activated state or the secondary cell fast activation state when the state transition action indicated by the MAC CE includes a transition to the secondary cell deactivated state. The processor is further configured to operate in the secondary cell activated state based on the transition to the secondary cell activated state or operating in the secondary cell deactivated state based on the transition to the secondary cell deactivated state.

In one example, a method for wireless communication is disclosed. The method may be performed by a scheduled entity. The method includes obtaining a MAC CE from a network, wherein the MAC CE is configured to indicate any one of a plurality of state transition actions for a secondary cell. The method further includes transitioning to a secondary cell fast activation state from a secondary cell activated state when a state transition action indicated by the MAC CE includes a transition to the secondary cell fast activation state. The method further includes transitioning to the secondary cell activated state from the secondary cell fast activation state when the state transition action indicated by the MAC CE includes a transition to the secondary cell activated state. The method further includes operating in the secondary cell fast activation state based on the transition to the secondary cell fast activation state or operating in the secondary cell activated state based on the transition to the secondary cell activated state.

In one example, an apparatus for wireless communication is disclosed. The apparatus may include at least one processor, a transceiver communicatively coupled to the at least one processor, and a memory communicatively coupled to the at least one processor. The processor is configured to obtain a MAC CE from a network, wherein the MAC CE is configured to indicate any one of a plurality of state transition actions for a secondary cell. The processor is further configured to transition to a secondary cell fast activation state from a secondary cell activated state when a state transition action indicated by the MAC CE includes a transition to the secondary cell fast activation state. The processor is further configured to transition to the secondary cell activated state from the secondary cell fast activation state when the state transition action indicated by the MAC CE includes a transition to the secondary cell activated state. The processor is further configured to operate in the secondary cell fast activation state based on the transition to the secondary cell fast activation state or operating in the secondary cell activated state based on the transition to the secondary cell activated state.

In one example, a method for wireless communication is disclosed. The method may be performed by a scheduled entity. The method includes obtaining a MAC CE from a network, wherein the MAC CE is configured to indicate any one of a plurality of state transition actions for a secondary cell. The method further includes transitioning to a secondary cell deactivated state from a secondary cell activated state when a state transition action indicated by the MAC CE includes a transition to the secondary cell deactivated state. The method further includes transitioning to the secondary cell activated state from the secondary cell deactivated state when the state transition action indicated by the MAC CE includes a transition to the secondary cell activated state. The method further includes operating in the secondary cell deactivated state based on the transition to the secondary cell deactivated state or operating in the secondary cell activated state based on the transition to the secondary cell activated state.

In one example, an apparatus for wireless communication is disclosed. The apparatus may include at least one processor, a transceiver communicatively coupled to the at least one processor, and a memory communicatively coupled to the at least one processor. The processor is configured to obtain a MAC CE from a network, wherein the MAC CE is configured to indicate any one of a plurality of state transition actions for a secondary cell. The processor is further configured to transition to a secondary cell deactivated state from a secondary cell activated state when a state transition action indicated by the MAC CE includes a transition to the secondary cell deactivated state. The processor is further configured to transition to the secondary cell activated state from the secondary cell deactivated state when the state transition action indicated by the MAC CE includes a transition to the secondary cell activated state. The processor is further configured to operate in the secondary cell deactivated state based on the transition to the secondary cell deactivated state or operating in the secondary cell activated state based on the transition to the secondary cell activated state.

In one example, a method for wireless communication is disclosed. The method may be performed by a scheduled entity. The method includes obtaining a MAC CE from a network, wherein the MAC CE is configured to indicate any one of a plurality of state transition actions for a secondary cell. The method further includes transitioning to a secondary cell fast activation state from a secondary cell activated state when a state transition action indicated by the MAC CE includes a transition to the secondary cell fast activation state. The method further includes operating in the secondary cell fast activation state.

In one example, an apparatus for wireless communication is disclosed. The apparatus may include at least one processor, a transceiver communicatively coupled to the at least one processor, and a memory communicatively coupled to the at least one processor. The processor is configured to obtain a MAC CE from a network, wherein the MAC CE is configured to indicate any one of a plurality of state transition actions for a secondary cell. The processor is further configured to transition to a secondary cell fast activation state from a secondary cell activated state when a state transition action indicated by the MAC CE includes a transition to the secondary cell fast activation state. The processor is further configured to operate in the secondary cell fast activation state.

In one example, a method for wireless communication is disclosed. The method may be performed by a scheduled entity. The method includes obtaining a MAC CE from a network, wherein the MAC CE is configured to indicate any one of a plurality of state transition actions for a secondary cell. The method further includes transitioning to a secondary cell activated state from a secondary cell fast activation state when a state transition action indicated by the MAC CE includes a transition to the secondary cell activated state. The method further includes transitioning to the secondary cell deactivated state from the secondary cell fast activation state when the state transition action indicated by the MAC CE includes a transition to the secondary cell deactivated state. The method further includes operating in the secondary cell activated state based on the transition to the secondary cell activated state or operating in the secondary cell deactivated state based on the transition to the secondary cell deactivated state.

In one example, an apparatus for wireless communication is disclosed. The apparatus may include at least one processor, a transceiver communicatively coupled to the at least one processor, and a memory communicatively coupled to the at least one processor. The processor is configured to obtain a MAC CE from a network, wherein the MAC CE is configured to indicate any one of a plurality of state transition actions for a secondary cell. The processor is further configured to transition to a secondary cell activated state from a secondary cell fast activation state when a state transition action indicated by the MAC CE includes a transition to the secondary cell activated state. The processor is further configured to transition to the secondary cell deactivated state from the secondary cell fast activation state when the state transition action indicated by the MAC CE includes a transition to the secondary cell deactivated state. The processor is further configured to operate in the secondary cell activated state based on the transition to the secondary cell activated state or operating in the secondary cell deactivated state based on the transition to the secondary cell deactivated state.

In one example, a method for wireless communication is disclosed. The method may be performed by a scheduled entity. The method includes obtaining a MAC CE from a network, wherein the MAC CE is configured to indicate any one of a plurality of state transition actions for a secondary cell. The method further includes obtaining a logical channel identifier (LCID) value indicating that the MAC CE is a fast activation/deactivation MAC CE, wherein the fast activation/deactivation MAC CE supports a two octet format or an eight octet format. The method further includes determining whether the two octet format or the eight octet format is to be used based on a value of a preselected bit in the MAC CE.

In one example, an apparatus for wireless communication is disclosed. The apparatus may include at least one processor, a transceiver communicatively coupled to the at least one processor, and a memory communicatively coupled to the at least one processor. The processor is configured to obtain a MAC CE from a network, wherein the MAC CE is configured to indicate any one of a plurality of state transition actions for a secondary cell. The processor is further configured to obtain a logical channel identifier (LCID) value indicating that the MAC CE is a fast activation/deactivation MAC CE, wherein the fast activation/deactivation MAC CE supports a two octet format or an eight octet format. The processor is further configured to determine whether the two octet format or the eight octet format is to be used based on a value of a preselected bit in the MAC CE.

In one example, a method for wireless communication is disclosed. The method may be performed by a scheduled entity (e.g., a user equipment (UE)). The method includes obtaining a MAC CE from a network, wherein the MAC CE is configured to indicate any one of a plurality of state transition actions for a secondary cell, transitioning to a secondary cell dormant state when a state transition action indicated by the MAC CE includes a transition to the secondary cell dormant state, and operating in the secondary cell dormant state.

In one example, an apparatus for wireless communication is disclosed. The apparatus may include at least one processor and a transceiver communicatively coupled to the at least one processor. The apparatus may further include a memory communicatively coupled to the at least one processor. The at least one processor may be configured to obtain a MAC CE from a network, wherein the MAC CE is configured to indicate any one of a plurality of state transition actions for a secondary cell, transition to a secondary cell dormant state when a state transition action indicated by the MAC CE includes a transition to the secondary cell dormant state, and operate in the secondary cell dormant state.

In one example, an apparatus for wireless communication is disclosed. The apparatus may include means for obtaining a MAC CE from a network, wherein the MAC CE is configured to indicate any one of a plurality of state transition actions for a secondary cell, means for transitioning to a secondary cell dormant state when a state transition action indicated by the MAC CE includes a transition to the secondary cell dormant state, and means for operating in the secondary cell dormant state.

In one example, a non-transitory computer-readable medium storing computer-executable code is disclosed. The computer-executable code may include code for causing a computer to obtain a MAC CE from a network, wherein the MAC CE is configured to indicate any one of a plurality of state transition actions for a secondary cell, transition to a secondary cell dormant state when a state transition action indicated by the MAC CE includes a transition to the secondary cell dormant state, and operate in the secondary cell dormant state.

In one example, a method for wireless communication is disclosed. The method may be performed by a scheduled entity (e.g., a user equipment (UE)). The method includes obtaining a MAC CE from a network, wherein the MAC CE is configured to control activation and deactivation of a secondary cell, transitioning to a secondary cell deactivated state from a secondary cell dormant state when the MAC CE includes an indication to transition to a secondary cell deactivated state, and operating in the secondary cell deactivated state.

In one example, an apparatus for wireless communication is disclosed. The apparatus may include at least one processor and a transceiver communicatively coupled to the at least one processor. The apparatus may further include a memory communicatively coupled to the at least one processor. The at least one processor may be configured to obtain a MAC CE from a network, wherein the MAC CE is configured to control activation and deactivation of a secondary cell, transition to a secondary cell deactivated state from a secondary cell dormant state when the MAC CE includes an indication to transition to a secondary cell deactivated state, and operate in the secondary cell deactivated state.

In one example, an apparatus for wireless communication is disclosed. The apparatus may include means for obtaining a MAC CE from a network, wherein the MAC CE is configured to control activation and deactivation of a secondary cell, means for transitioning to a secondary cell deactivated state from a secondary cell dormant state when the MAC CE includes an indication to transition to a secondary cell deactivated state, and means for operating in the secondary cell deactivated state.

In one example, a non-transitory computer-readable medium storing computer-executable code is disclosed. The computer-executable code may include code for causing a computer to obtain a MAC CE from a network, wherein the MAC CE is configured to control activation and deactivation of a secondary cell, transition to a secondary cell deactivated state from a secondary cell dormant state when the MAC CE includes an indication to transition to a secondary cell deactivated state, and operate in the secondary cell deactivated state.

In one example, a method for wireless communication is disclosed. The method may be performed by a scheduled entity (e.g., a user equipment (UE)). The method includes obtaining a first MAC CE and a second MAC CE from a network, wherein the first and second MAC CEs are configured to indicate one of a plurality of state transition actions for a secondary cell, wherein the first MAC CE is configured to control a transition to a secondary cell dormant state and the second MAC CE is configured to control activation and deactivation of the secondary cell. The method further includes transitioning to the secondary cell dormant state from either a secondary cell activated state or a secondary cell deactivated state when the first MAC CE includes an indication to transition to the secondary cell dormant state and the second MAC CE includes an indication to transition to the secondary cell activated state or the secondary cell deactivated state. The method further includes operating in the secondary cell dormant state.

In one example, an apparatus for wireless communication is disclosed. The apparatus may include at least one processor and a transceiver communicatively coupled to the at least one processor. The apparatus may further include a memory communicatively coupled to the at least one processor. The at least one processor may be configured to obtain a first MAC CE and a second MAC CE from a network, wherein the first and second MAC CEs are configured to indicate one of a plurality of state transition actions for a secondary cell, wherein the first MAC CE is configured to control a transition to a secondary cell dormant state and the second MAC CE is configured to control activation and deactivation of the secondary cell. The at least one processor may be further configured to transition to the secondary cell dormant state from either a secondary cell activated state or a secondary cell deactivated state when the first MAC CE includes an indication to transition to the secondary cell dormant state and the second MAC CE includes an indication to transition to the secondary cell activated state or the secondary cell deactivated state. The at least one processor may be further configured to operate in the secondary cell dormant state.

In one example, an apparatus for wireless communication is disclosed. The apparatus may include means for obtaining a first MAC CE and a second MAC CE from a network, wherein the first and second MAC CEs are configured to indicate one of a plurality of state transition actions for a secondary cell, wherein the first MAC CE is configured to control a transition to a secondary cell dormant state and the second MAC CE is configured to control activation and deactivation of the secondary cell. The apparatus may further include means for transitioning to the secondary cell dormant state from either a secondary cell activated state or a secondary cell deactivated state when the first MAC CE includes an indication to transition to the secondary cell dormant state and the second MAC CE includes an indication to transition to the secondary cell activated state or the secondary cell deactivated state. The apparatus may further include means for operating in the secondary cell dormant state.

In one example, a non-transitory computer-readable medium storing computer-executable code is disclosed. The computer-executable code may include code for causing a computer to obtain a first MAC CE and a second MAC CE from a network, wherein the first and second MAC CEs are configured to indicate one of a plurality of state transition actions for a secondary cell, wherein the first MAC CE is configured to control a transition to a secondary cell dormant state and the second MAC CE is configured to control activation and deactivation of the secondary cell. The computer-executable code may further include code for causing the computer to transition to the secondary cell dormant state from either a secondary cell activated state or a secondary cell deactivated state when the first MAC CE includes an indication to transition to the secondary cell dormant state and the second MAC CE includes an indication to transition to the secondary cell activated state or the secondary cell deactivated state. The computer-executable code may further include code for causing the computer to operate in the secondary cell dormant state.

In one example, a method for wireless communication is disclosed. The method may be performed by a scheduled entity (e.g., a user equipment (UE)). The method includes obtaining a first MAC CE and a second MAC CE from a network, wherein the first and second MAC CEs are configured to indicate one of a plurality of state transition actions for a secondary cell, wherein the first MAC CE is configured to control a transition to a secondary cell dormant state and the second MAC CE is configured to control activation and deactivation of the secondary cell. The method further includes transitioning to a secondary cell activated state from the secondary cell dormant state when the first MAC CE excludes an indication to transition to the secondary cell dormant state and the second MAC CE includes an indication to transition to the secondary cell activated state. The method further includes transitioning to a secondary cell deactivated state from the secondary cell dormant state when the first MAC CE excludes an indication to transition to the secondary cell dormant state and the second MAC CE includes an indication to transition to the secondary cell deactivated state. The method further includes operating in the secondary cell activated state based on the transition to the secondary cell activated state or operating in the secondary cell deactivated state based on the transition to the secondary cell deactivated state.

In one example, an apparatus for wireless communication is disclosed. The apparatus may include at least one processor and a transceiver communicatively coupled to the at least one processor. The apparatus may further include a memory communicatively coupled to the at least one processor. The at least one processor may be configured to obtain a first MAC CE and a second MAC CE from a network, wherein the first and second MAC CEs are configured to indicate one of a plurality of state transition actions for a secondary cell, wherein the first MAC CE is configured to control a transition to a secondary cell dormant state and the second MAC CE is configured to control activation and deactivation of the secondary cell. The at least one processor may be further configured to transition to a secondary cell activated state from the secondary cell dormant state when the first MAC CE excludes an indication to transition to the secondary cell dormant state and the second MAC CE includes an indication to transition to the secondary cell activated state. The at least one processor may be further configured to transition to a secondary cell deactivated state from the secondary cell dormant state when the first MAC CE excludes an indication to transition to the secondary cell dormant state and the second MAC CE includes an indication to transition to the secondary cell deactivated state. The at least one processor may be further configured to operate in the secondary cell activated state based on the transition to the secondary cell activated state or operating in the secondary cell deactivated state based on the transition to the secondary cell deactivated state.

In one example, an apparatus for wireless communication is disclosed. The apparatus may include means for obtaining a first MAC CE and a second MAC CE from a network, wherein the first and second MAC CEs are configured to indicate one of a plurality of state transition actions for a secondary cell, wherein the first MAC CE is configured to control a transition to a secondary cell dormant state and the second MAC CE is configured to control activation and deactivation of the secondary cell. The apparatus may further include means for transitioning to a secondary cell activated state from the secondary cell dormant state when the first MAC CE excludes an indication to transition to the secondary cell dormant state and the second MAC CE includes an indication to transition to the secondary cell activated state. The apparatus may further include means for transitioning to a secondary cell deactivated state from the secondary cell dormant state when the first MAC CE excludes an indication to transition to the secondary cell dormant state and the second MAC CE includes an indication to transition to the secondary cell deactivated state. The apparatus may further include means for operating in the secondary cell activated state based on the transition to the secondary cell activated state or operating in the secondary cell deactivated state based on the transition to the secondary cell deactivated state.

In one example, a non-transitory computer-readable medium storing computer-executable code is disclosed. The computer-executable code may include code for causing a computer to obtain a first MAC CE and a second MAC CE from a network, wherein the first and second MAC CEs are configured to indicate one of a plurality of state transition actions for a secondary cell, wherein the first MAC CE is configured to control a transition to a secondary cell dormant state and the second MAC CE is configured to control activation and deactivation of the secondary cell. The computer-executable code may further include code for causing the computer to transition to a secondary cell activated state from the secondary cell dormant state when the first MAC CE excludes an indication to transition to the secondary cell dormant state and the second MAC CE includes an indication to transition to the secondary cell activated state. The computer-executable code may further include code for causing a computer to transition to a secondary cell deactivated state from the secondary cell dormant state when the first MAC CE excludes an indication to transition to the secondary cell dormant state and the second MAC CE includes an indication to transition to the secondary cell deactivated state. The computer-executable code may further include code for causing a computer to operate in the secondary cell activated state based on the transition to the secondary cell activated state or operating in the secondary cell deactivated state based on the transition to the secondary cell deactivated state.

In one example, a method for wireless communication is disclosed. The method may be performed by a scheduled entity (e.g., a user equipment (UE)). The method includes obtaining a first MAC CE and a second MAC CE from a network, wherein the first and second MAC CEs are configured to indicate one of a plurality of state transition actions for a secondary cell, wherein the first MAC CE is configured to control a transition to a secondary cell dormant state and the second MAC CE is configured to control activation and deactivation of the secondary cell. The method further includes transitioning to a secondary cell activated state from a secondary cell deactivated state when the first MAC CE excludes an indication to transition to the secondary cell dormant state and the second MAC CE includes an indication to transition to the secondary cell activated state. The method further includes transitioning to the secondary cell deactivated state from the secondary cell activated state when the first MAC CE excludes an indication to transition to the secondary cell dormant state and the second MAC CE includes an indication to transition to the secondary cell deactivated state. The method further includes operating in the secondary cell activated state based on the transition to the secondary cell activated state or operating in the secondary cell deactivated state based on the transition to the secondary cell deactivated state.

In one example, an apparatus for wireless communication is disclosed. The apparatus may include at least one processor and a transceiver communicatively coupled to the at least one processor. The apparatus may further include a memory communicatively coupled to the at least one processor. The at least one processor may be configured to obtain a first MAC CE and a second MAC CE from a network, wherein the first and second MAC CEs are configured to indicate one of a plurality of state transition actions for a secondary cell, wherein the first MAC CE is configured to control a transition to a secondary cell dormant state and the second MAC CE is configured to control activation and deactivation of the secondary cell. The at least one processor may be further configured to transition to a secondary cell activated state from a secondary cell deactivated state when the first MAC CE excludes an indication to transition to the secondary cell dormant state and the second MAC CE includes an indication to transition to the secondary cell activated state. The at least one processor may be further configured to transition to the secondary cell deactivated state from the secondary cell activated state when the first MAC CE excludes an indication to transition to the secondary cell dormant state and the second MAC CE includes an indication to transition to the secondary cell deactivated state. The at least one processor may be further configured to operate in the secondary cell activated state based on the transition to the secondary cell activated state or operate in the secondary cell deactivated state based on the transition to the secondary cell deactivated state.

In one example, an apparatus for wireless communication is disclosed. The apparatus may include means for obtaining a first MAC CE and a second MAC CE from a network, wherein the first and second MAC CEs are configured to indicate one of a plurality of state transition actions for a secondary cell, wherein the first MAC CE is configured to control a transition to a secondary cell dormant state and the second MAC CE is configured to control activation and deactivation of the secondary cell. The apparatus may further include means for transitioning to a secondary cell activated state from a secondary cell deactivated state when the first MAC CE excludes an indication to transition to the secondary cell dormant state and the second MAC CE includes an indication to transition to the secondary cell activated state. The apparatus may further include means for transitioning to the secondary cell deactivated state from the secondary cell activated state when the first MAC CE excludes an indication to transition to the secondary cell dormant state and the second MAC CE includes an indication to transition to the secondary cell deactivated state. The apparatus may further include means for operating in the secondary cell activated state based on the transition to the secondary cell activated state or operating in the secondary cell deactivated state based on the transition to the secondary cell deactivated state.

In one example, a non-transitory computer-readable medium storing computer-executable code is disclosed. The computer-executable code may include code for causing a computer to obtain a first MAC CE and a second MAC CE from a network, wherein the first and second MAC CEs are configured to indicate one of a plurality of state transition actions for a secondary cell, wherein the first MAC CE is configured to control a transition to a secondary cell dormant state and the second MAC CE is configured to control activation and deactivation of the secondary cell. The computer-executable code may further include code for causing the computer to transition to a secondary cell activated state from a secondary cell deactivated state when the first MAC CE excludes an indication to transition to the secondary cell dormant state and the second MAC CE includes an indication to transition to the secondary cell activated state. The computer-executable code may further include code for causing the computer to transition to the secondary cell deactivated state from the secondary cell activated state when the first MAC CE excludes an indication to transition to the secondary cell dormant state and the second MAC CE includes an indication to transition to the secondary cell deactivated state. The computer-executable code may further include code for causing the computer to operate in the secondary cell activated state based on the transition to the secondary cell activated state or operate in the secondary cell deactivated state based on the transition to the secondary cell deactivated state.

In one example, a method for wireless communication is disclosed. The method may be performed by a scheduled entity (e.g., a user equipment (UE)). The method includes obtaining a MAC CE from a network, wherein the MAC CE is configured to indicate any one of a plurality of state transition actions for a secondary cell, obtaining a first logical channel identifier (LCID) value indicating that the MAC CE is a dormant state activation/deactivation MAC CE based on a one octet format or obtaining a second LCID value indicating that the MAC CE is the dormant state activation/deactivation MAC CE based on a four octet format, and identify the MAC CE corresponding to the secondary cell based on the one octet format or the four octet format.

In one example, an apparatus for wireless communication is disclosed. The apparatus may include at least one processor and a transceiver communicatively coupled to the at least one processor. The apparatus may further include a memory communicatively coupled to the at least one processor. The at least one processor may be configured to obtain a MAC CE from a network, wherein the MAC CE is configured to indicate any one of a plurality of state transition actions for a secondary cell, obtain a first logical channel identifier (LCID) value indicating that the MAC CE is a dormant state activation/deactivation MAC CE based on a one octet format or obtaining a second LCID value indicating that the MAC CE is the dormant state activation/deactivation MAC CE based on a four octet format, and identify the MAC CE corresponding to the secondary cell based on the one octet format or the four octet format.

In one example, an apparatus for wireless communication is disclosed. The apparatus may include means for obtaining a MAC CE from a network, wherein the MAC CE is configured to indicate any one of a plurality of state transition actions for a secondary cell, means for obtaining a first logical channel identifier (LCID) value indicating that the MAC CE is a dormant state activation/deactivation MAC CE based on a one octet format or obtaining a second LCID value indicating that the MAC CE is the dormant state activation/deactivation MAC CE based on a four octet format, and means for identifying the MAC CE corresponding to the secondary cell based on the one octet format or the four octet format.

In one example, a non-transitory computer-readable medium storing computer-executable code is disclosed. The computer-executable code may include code for causing a computer to obtain a MAC CE from a network, wherein the MAC CE is configured to indicate any one of a plurality of state transition actions for a secondary cell, obtain a first logical channel identifier (LCID) value indicating that the MAC CE is a dormant state activation/deactivation MAC CE based on a one octet format or obtaining a second LCID value indicating that the MAC CE is the dormant state activation/deactivation MAC CE based on a four octet format, and identify the MAC CE corresponding to the secondary cell based on the one octet format or the four octet format.

In one example, a method for wireless communication is disclosed. The method may be performed by a scheduled entity (e.g., a user equipment (UE)). The method includes receiving a radio resource control (RRC) connection reconfiguration message, the RRC connection reconfiguration message including an indication to add a secondary cell into a secondary cell activated state or into a secondary cell dormant state, and transitioning directly to the secondary cell activated state or the secondary cell dormant state based on the indication.

In one example, an apparatus for wireless communication is disclosed. The apparatus may include at least one processor and a transceiver communicatively coupled to the at least one processor. The apparatus may further include a memory communicatively coupled to the at least one processor. The at least one processor may be configured to receive an RRC connection reconfiguration message, the RRC connection reconfiguration message including an indication to add a secondary cell into a secondary cell activated state or into a secondary cell dormant state, and transition directly to the secondary cell activated state or the secondary cell dormant state based on the indication.

In one example, an apparatus for wireless communication is disclosed. The apparatus may include means for receiving an RRC connection reconfiguration message, the RRC connection reconfiguration message including an indication to add a secondary cell into a secondary cell activated state or into a secondary cell dormant state, and means for transitioning directly to the secondary cell activated state or the secondary cell dormant state based on the indication.

In one example, a non-transitory computer-readable medium storing computer-executable code is disclosed. The computer-executable code may include code for causing a computer to receive an RRC connection reconfiguration message, the RRC connection reconfiguration message including an indication to add a secondary cell into a secondary cell activated state or into a secondary cell dormant state, and transition directly to the secondary cell activated state or the secondary cell dormant state based on the indication.

In one example, a method for wireless communication is disclosed. The method may be performed by a scheduled entity (e.g., a user equipment (UE)). The method includes receiving an RRC connection reconfiguration message, the RRC connection reconfiguration message including an indication to release a secondary cell, and releasing the secondary cell from the secondary cell dormant state.

In one example, an apparatus for wireless communication is disclosed. The apparatus may include at least one processor and a transceiver communicatively coupled to the at least one processor. The apparatus may further include a memory communicatively coupled to the at least one processor. The at least one processor may be configured to receive an RRC connection reconfiguration message, the RRC connection reconfiguration message including an indication to release a secondary cell. The at least one processor may be further configured to release the secondary cell from the secondary cell dormant state.

In one example, an apparatus for wireless communication is disclosed. The apparatus may include means for receiving an RRC connection reconfiguration message, the RRC connection reconfiguration message including an indication to release a secondary cell, and means for releasing the secondary cell from the secondary cell dormant state.

In one example, a non-transitory computer-readable medium storing computer-executable code is disclosed. The computer-executable code may include code for causing a computer to receive an RRC connection reconfiguration message, the RRC connection reconfiguration message including an indication to release a secondary cell. The computer-executable code may further include code for causing the computer to release the secondary cell from the secondary cell dormant state.

In one example, a method for wireless communication is disclosed. The method may be performed by a scheduled entity (e.g., a user equipment (UE)). The method includes configuring a secondary cell deactivation timer, and transitioning to a secondary cell deactivated state from a secondary cell dormant state upon expiration of the secondary cell deactivation timer.

In one example, an apparatus for wireless communication is disclosed. The apparatus may include at least one processor and a transceiver communicatively coupled to the at least one processor. The apparatus may further include a memory communicatively coupled to the at least one processor. The at least one processor may be configured to configure a secondary cell deactivation timer, and transition to a secondary cell deactivated state from a secondary cell dormant state upon expiration of the secondary cell deactivation timer.

In one example, an apparatus for wireless communication is disclosed. The apparatus may include means for configuring a secondary cell deactivation timer, and means for transitioning to a secondary cell deactivated state from a secondary cell dormant state upon expiration of the secondary cell deactivation timer.

In one example, a non-transitory computer-readable medium storing computer-executable code is disclosed. The computer-executable code may include code for causing a computer to configure a secondary cell deactivation timer, and transition to a secondary cell deactivated state from a secondary cell dormant state upon expiration of the secondary cell deactivation timer.

In one example, a method for wireless communication is disclosed. The method may be performed by a scheduled entity (e.g., a user equipment (UE)). The method includes configuring a secondary cell inactivity timer for a secondary cell, wherein the secondary cell inactivity timer controls a transition to a secondary cell dormant state from a secondary cell activated state, and transitioning to the secondary cell dormant state from the secondary cell activated state upon expiration of the secondary cell inactivity timer.

In one example, an apparatus for wireless communication is disclosed. The apparatus may include at least one processor and a transceiver communicatively coupled to the at least one processor. The apparatus may further include a memory communicatively coupled to the at least one processor. The at least one processor may be configured to configure a secondary cell inactivity timer for a secondary cell, wherein the secondary cell inactivity timer controls a transition to a secondary cell dormant state from a secondary cell activated state, and transition to the secondary cell dormant state from the secondary cell activated state upon expiration of the secondary cell inactivity timer.

In one example, an apparatus for wireless communication is disclosed. The apparatus may include means for configuring a secondary cell inactivity timer for a secondary cell, wherein the secondary cell inactivity timer controls a transition to a secondary cell dormant state from a secondary cell activated state, and means for transitioning to the secondary cell dormant state from the secondary cell activated state upon expiration of the secondary cell inactivity timer.

In one example, a non-transitory computer-readable medium storing computer-executable code is disclosed. The computer-executable code may include code for causing a computer to configure a secondary cell inactivity timer for a secondary cell, wherein the secondary cell inactivity timer controls a transition to a secondary cell dormant state from a secondary cell activated state, and transition to the secondary cell dormant state from the secondary cell activated state upon expiration of the secondary cell inactivity timer.

In one example, a method for wireless communication is disclosed. The method may be performed by a scheduled entity (e.g., a user equipment (UE)). The method includes obtaining a MAC CE from a network, transitioning to a secondary cell fast activation state from either a secondary cell deactivated state or a secondary cell activated state based on at least the MAC CE, and operating at least in the secondary cell fast activation state. In some aspects, the method further includes detecting an expiration of a secondary cell deactivation timer or a handover of a secondary cell, transitioning to a secondary cell deactivated state in response to the detection or the handover, and operating in the secondary cell deactivated state. In some aspects, the method further includes obtaining an RRC handover signal while operating in the secondary cell fast activation state, and continuing to operate in the secondary cell activated state based on the RRC handover signal. In some aspects, the method further includes obtaining an RRC handover signal while operating in the secondary cell fast activation state, and transitioning to the secondary cell activated state based on the RRC handover signal. In some aspects, the method further includes obtaining an RRC connection reconfiguration with an indication to release a secondary cell, releasing the secondary cell based on the RRC connection reconfiguration, and transitioning to an RRC connected state with respect to a primary cell.

In one example, a method for wireless communication is disclosed. The method may be performed by a scheduled entity (e.g., a user equipment (UE)). The method includes detecting an expiration of a reduced power inactivity timer associated with a secondary cell while operating in a secondary cell activated state, transitioning to a secondary cell fast activation state in response to the detection, and operating in the secondary cell fast activation state.

In one example, a method for wireless communication is disclosed. The method may be performed by a scheduled entity (e.g., a user equipment (UE)). The method includes operating in an RRC connected state with respect to a primary cell, detecting an addition of a secondary cell, transitioning directly to a secondary cell fast activation state in response to the detection, and operating at least in the secondary cell fast activation state.

In one example, a method for wireless communication is disclosed. The method may be performed by a scheduled entity (e.g., a user equipment (UE)). The method includes obtaining at least a first MAC CE and a second MAC CE from a network, wherein the first MAC CE controls a transition to/from a fast activation state of a secondary cell, and wherein the second MAC CE controls activation and deactivation of the secondary cell, transitioning to the fast activation state from either a secondary cell deactivated state or a secondary cell activated state based on the first MAC CE independent of the second MAC CE, and operating at least in the fast activation state.

In one example, a method for wireless communication is disclosed. The method may be performed by a scheduled entity (e.g., a user equipment (UE)). The method includes obtaining at least a first MAC CE and a second MAC CE from a network, wherein the first MAC CE controls a transition to/from a fast activation state of a secondary cell, and wherein the second MAC CE controls activation and deactivation of the secondary cell, transitioning to either a secondary cell deactivated state or a secondary cell activated state from the fast activation state based on the second MAC CE, wherein the first MAC CE indicates to transition out of the fast activation state, and operating in the secondary cell deactivated state or the secondary cell activated state.

In one example, a method for wireless communication is disclosed. The method may be performed by a scheduled entity (e.g., a user equipment (UE)). The method includes obtaining at least a first MAC CE and a second MAC CE from a network, wherein the first MAC CE controls a transition to/from a fast activation state of a secondary cell, and wherein the second MAC CE controls activation and deactivation of the secondary cell, transitioning to a secondary cell activated state from a secondary cell deactivated state based on the second MAC CE, or transitioning to the secondary cell deactivated state from the secondary cell activated state based on the second MAC CE, wherein the first MAC CE indicates to transition out of the fast activation state, and operating in the secondary cell activated state or the secondary cell deactivated state.

In one example, a method for wireless communication is disclosed. The method may be performed by a scheduled entity (e.g., a user equipment (UE)). The method includes obtaining a MAC CE from a network, transitioning to a secondary cell fast activation state from a secondary cell activated state, or transitioning to the secondary cell activated state from the secondary cell fast activation state, based on at least the MAC CE, and operating in the secondary cell fast activation state or the secondary cell activated state.

In one example, a method for wireless communication is disclosed. The method may be performed by a scheduled entity (e.g., a user equipment (UE)). The method includes obtaining an RRC handover signal while operating in the secondary cell fast activation state, and continuing to operate in the secondary cell fast activation state based on the RRC handover signal.

In one example, a method for wireless communication is disclosed. The method may be performed by a scheduled entity (e.g., a user equipment (UE)). The method includes obtaining an RRC handover signal while operating in the secondary cell fast activation state, and transitioning to the secondary cell activated state based on the RRC handover signal.

In one example, a method for wireless communication is disclosed. The method may be performed by a scheduled entity (e.g., a user equipment (UE)). The method includes obtaining an RRC connection reconfiguration with an indication to release a secondary cell, releasing the secondary cell based on the RRC connection reconfiguration, and transitioning to an RRC connected state with respect to a primary cell.

In one example, a method for wireless communication is disclosed. The method may be performed by a scheduled entity (e.g., a user equipment (UE)). The method includes operating in a secondary cell activated state, obtaining at least a first MAC CE and a second MAC CE from a network, wherein the first MAC CE controls a transition to/from a fast activation state of a secondary cell, and wherein the second MAC CE controls activation and deactivation of the secondary cell, continuing to operate in the secondary cell activated state when the first MAC CE indicates to transition out of the fast activation state and when the second MAC CE indicates to enter the secondary cell activated state, and transitioning to the fast activation state when the first MAC CE indicates to transition to the fast activation state and when the second MAC CE indicates to transition to the secondary cell activated state.

In one example, a method for wireless communication is disclosed. The method may be performed by a scheduled entity (e.g., a user equipment (UE)). The method includes operating in a fast activation state of a secondary cell, obtaining at least a first MAC CE and a second MAC CE from a network, wherein the first MAC CE controls a transition to/from the fast activation state of the secondary cell, and wherein the second MAC CE controls activation and deactivation of the secondary cell, transitioning to a secondary cell activated state when the first MAC CE indicates to transition out of the fast activation state, wherein the second MAC CE is ignored, and operating in the secondary cell activated state.

In one example, a method for wireless communication is disclosed. The method may be performed by a scheduled entity (e.g., a user equipment (UE)). The method includes obtaining at least a first MAC CE and a second MAC CE from a network, wherein the first MAC CE controls a transition to/from a fast activation state of a secondary cell, and wherein the second MAC CE controls activation and deactivation of the secondary cell, transitioning to a secondary cell activated state from a secondary cell deactivated state when the second MAC CE indicates to transition to the secondary cell activated state, or transitioning to the secondary cell deactivated state from the secondary cell activated state when the second MAC CE indicates to transition out of the secondary cell activated state, wherein the first MAC CE is ignored, and operating in the secondary cell activated state or the secondary cell deactivated state.

In one example, a method for wireless communication is disclosed. The method may be performed by a scheduled entity (e.g., a user equipment (UE)). The method includes obtaining a MAC CE from a network, transitioning to a secondary cell fast activation state from a secondary cell activated state based on at least the MAC CE, and operating in the secondary cell fast activation state. In some aspects, the method further includes obtaining an RRC handover signal while operating in the secondary cell fast activation state, and continuing to operate in the secondary cell fast activation state based on the RRC handover signal. In some aspects, the method further includes obtaining an RRC handover signal while operating in the secondary cell fast activation state, and transitioning to the secondary cell activated state based on the RRC handover signal. In some aspects, the method further includes obtaining a radio resource control (RRC) connection reconfiguration with an indication to release a secondary cell, releasing the secondary cell based on the RRC connection reconfiguration, and transitioning to an RRC connected state with respect to a primary cell.

In one example, a method for wireless communication is disclosed. The method may be performed by a scheduled entity (e.g., a user equipment (UE)). The method includes operating in a secondary cell activated state, obtaining at least a first MAC CE and a second MAC CE from a network, wherein the first MAC CE controls a transition to/from a fast activation state of a secondary cell, and wherein the second MAC CE controls activation and deactivation of the secondary cell, and transitioning to the fast activation state when the first MAC CE indicates to transition to the fast activation state and when the second MAC CE indicates to transition to the secondary cell activated state.

In one example, a method for wireless communication is disclosed. The method may be performed by a scheduled entity (e.g., a user equipment (UE)). The method includes operating in a fast activation state of a secondary cell, obtaining at least a first MAC CE and a second MAC CE from a network, wherein the first MAC CE controls a transition to/from a fast activation state of a secondary cell, and wherein the second MAC CE controls activation and deactivation of the secondary cell, transitioning to the secondary cell activated state when the first MAC CE indicates to transition out of the fast activation state and when the second MAC CE indicates to transition to the secondary cell activated state, transitioning to a secondary cell deactivated state when the first MAC CE indicates to transition out of the fast activation state and when the second MAC CE indicates to transition out of the secondary cell activated state, and operating in the secondary cell activated state or the secondary cell deactivated state.

In one example, a method for wireless communication is disclosed. The method may be performed by a scheduled entity (e.g., a user equipment (UE)). The method includes operating in a deactivated state of a secondary cell, obtaining at least a first MAC CE and a second MAC CE from a network, wherein the first MAC CE controls a transition to/from a fast activation state of a secondary cell, and wherein the second MAC CE controls activation and deactivation of the secondary cell, transitioning to a secondary cell activated state based on the second MAC CE, wherein the first MAC CE is ignored, and operating in the secondary cell activated state.

In one example, a method for wireless communication is disclosed. The method may be performed by a scheduled entity (e.g., a user equipment (UE)). The method includes operating in a secondary cell activated state, obtaining at least a first MAC CE and a second MAC CE from a network, wherein the first MAC CE controls a transition to/from a fast activation state of a secondary cell, and wherein the second MAC CE controls activation and deactivation of the secondary cell, transitioning to the fast activation state of the secondary cell when the first MAC CE indicates to transition to the fast activation state and when the second MAC CE indicates to transition to the secondary cell activated state, transitioning to a secondary cell deactivated state when the first MAC CE indicates to transition out of the fast activation state and when the second MAC CE indicates to transition out of the secondary cell activated state, and operating in the fast activation state or the secondary cell deactivated state.

In one example, an apparatus for wireless communication is disclosed. The apparatus includes at least one processor and a transceiver communicatively coupled to the at least one processor. The apparatus further includes a memory communicatively coupled to the at least one processor. The at least one processor is configured to obtain a MAC CE from a network, transition to a secondary cell fast activation state from either a secondary cell deactivated state or a secondary cell activated state based on at least the MAC CE, and operate at least in the secondary cell fast activation state. In some aspects, the at least on processor is further configured to detect an expiration of a secondary cell deactivation timer or a handover of a secondary cell, transition to a secondary cell deactivated state in response to the detection or the handover, and operate in the secondary cell deactivated state. In some aspects, the at least on processor is further configured to obtain an RRC handover signal while operating in the secondary cell fast activation state, and continue to operate in the secondary cell activated state based on the RRC handover signal. In some aspects, the at least on processor is further configured to obtain an RRC handover signal while operating in the secondary cell fast activation state, and transition to the secondary cell activated state based on the RRC handover signal. In some aspects, the at least on processor is further configured to obtain an RRC connection reconfiguration with an indication to release a secondary cell, release the secondary cell based on the RRC connection reconfiguration, and transition to an RRC connected state with respect to a primary cell.

In one example, an apparatus for wireless communication is disclosed. The apparatus includes at least one processor and a transceiver communicatively coupled to the at least one processor. The apparatus further includes a memory communicatively coupled to the at least one processor. The at least one processor is configured to detect an expiration of a reduced power inactivity timer associated with a secondary cell while operating in a secondary cell activated state, transition to a secondary cell fast activation state in response to the detection, and operate in the secondary cell fast activation state.

In one example, an apparatus for wireless communication is disclosed. The apparatus includes at least one processor and a transceiver communicatively coupled to the at least one processor. The apparatus further includes a memory communicatively coupled to the at least one processor. The at least one processor is configured to operate in an RRC connected state with respect to a primary cell, detect an addition of a secondary cell, transition directly to a secondary cell fast activation state in response to the detection, and operate at least in the secondary cell fast activation state.

In one example, an apparatus for wireless communication is disclosed. The apparatus includes at least one processor and a transceiver communicatively coupled to the at least one processor. The apparatus further includes a memory communicatively coupled to the at least one processor. The at least one processor is configured to obtain at least a first MAC CE and a second MAC CE from a network, wherein the first MAC CE controls a transition to/from a fast activation state of a secondary cell, and wherein the second MAC CE controls activation and deactivation of the secondary cell, transition to the fast activation state from either a secondary cell deactivated state or a secondary cell activated state based on the first MAC CE independent of the second MAC CE, and operate at least in the fast activation state.

In one example, an apparatus for wireless communication is disclosed. The apparatus includes at least one processor and a transceiver communicatively coupled to the at least one processor. The apparatus further includes a memory communicatively coupled to the at least one processor. The at least one processor is configured to obtain at least a first MAC CE and a second MAC CE from a network, wherein the first MAC CE controls a transition to/from a fast activation state of a secondary cell, and wherein the second MAC CE controls activation and deactivation of the secondary cell, transition to either a secondary cell deactivated state or a secondary cell activated state from the fast activation state based on the second MAC CE, wherein the first MAC CE indicates to transition out of the fast activation state, and operate in the secondary cell deactivated state or the secondary cell activated state.

In one example, an apparatus for wireless communication is disclosed. The apparatus includes at least one processor and a transceiver communicatively coupled to the at least one processor. The apparatus further includes a memory communicatively coupled to the at least one processor. The at least one processor is configured to obtain at least a first MAC CE and a second MAC CE from a network, wherein the first MAC CE controls a transition to/from a fast activation state of a secondary cell, and wherein the second MAC CE controls activation and deactivation of the secondary cell, transition to a secondary cell activated state from a secondary cell deactivated state based on the second MAC CE, or transition to the secondary cell deactivated state from the secondary cell activated state based on the second MAC CE, wherein the first MAC CE indicates to transition out of the fast activation state, and operate in the secondary cell activated state or the secondary cell deactivated state.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The aspects described herein may be applied to wireless communication networks, such as 5G networks. The 5G networks may, for example, provide for aggregation of sub-6 GHz carriers, above-6 GHz carriers, mmWave carriers, etc., all controlled by a single integrated MAC layer. Such aggregation of carriers may be referred to as carrier aggregation (CA).

In some aspects of the disclosure, the wireless communication networks may include a multi-RAT radio access network (MR-AN). To implement an MR-AN, for example, a single radio access network may provide one or more cells for each of a plurality of RATs, and may support inter- and intra-RAT mobility and aggregation.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
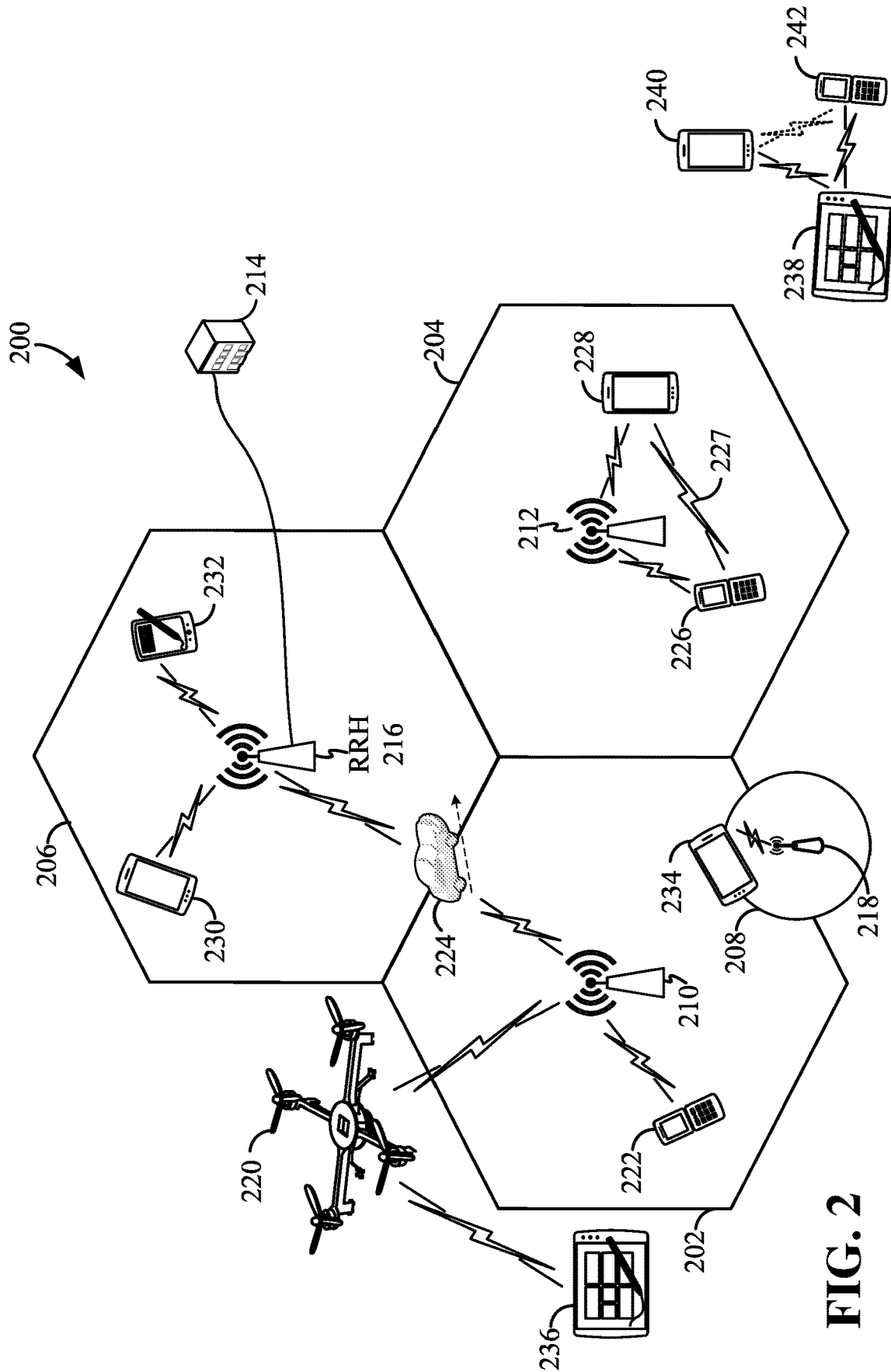
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may in some examples include a request signal, such as a request-to-send (RTS), a source transmit signal (STS), and/or a direction selection signal (DSS). The request signal may provide for a scheduled entity 204 to request a duration of time to keep a sidelink channel available for a sidelink signal. Sidelink control information 216 may further include a response signal, such as a clear-to-send (CTS) and/or a destination receive signal (DRS). The response signal may provide for the scheduled entity 204 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 214.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
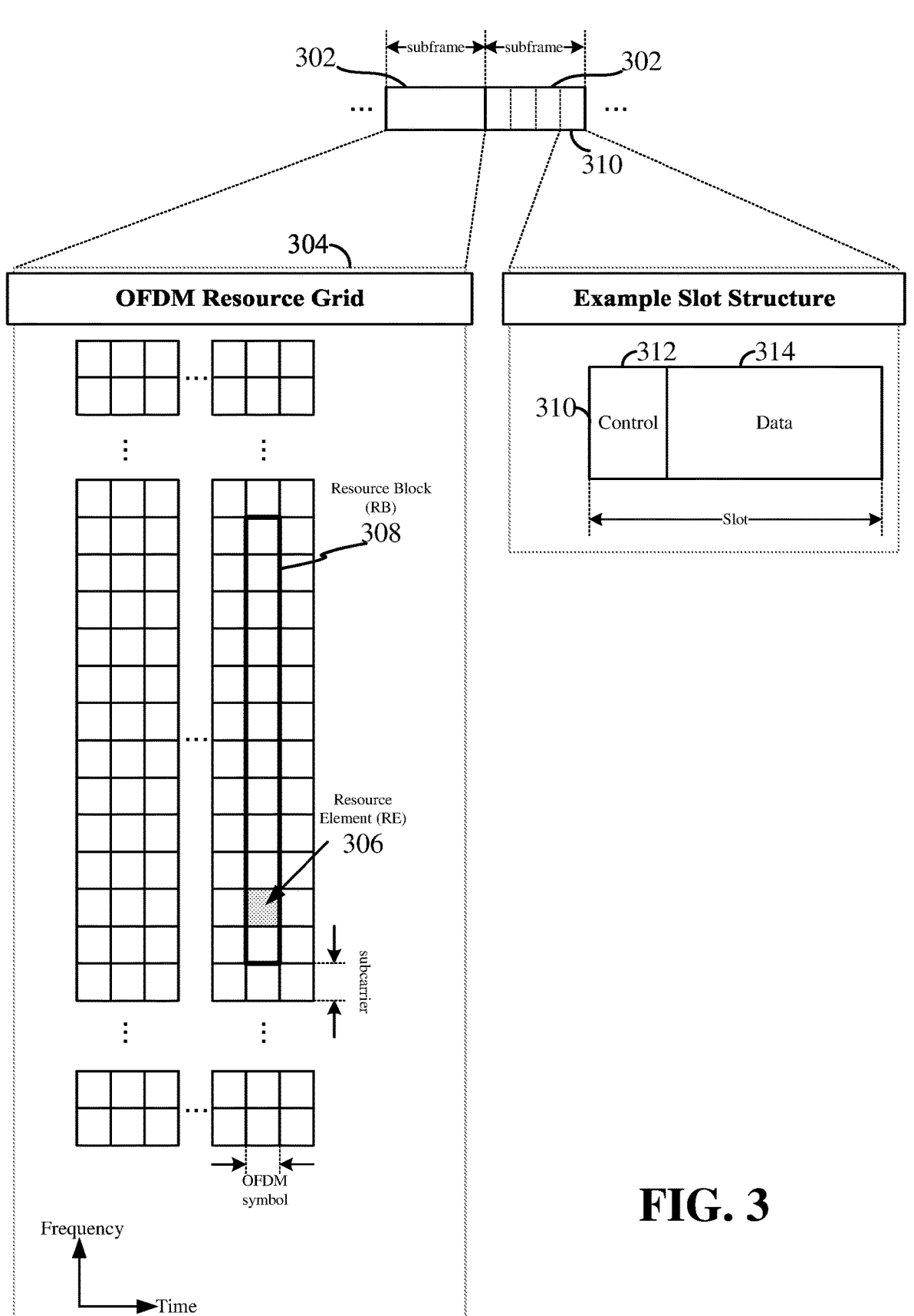
FIG. 3 is a schematic illustration of an organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell, including but not limited to power control commands, scheduling information, a grant, and/or an assignment of REs for DL and UL transmissions.

In an UL transmission, the transmitting device (e.g., the scheduled entity 106) may utilize one or more REs 306 to carry UL control information 118 originating from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
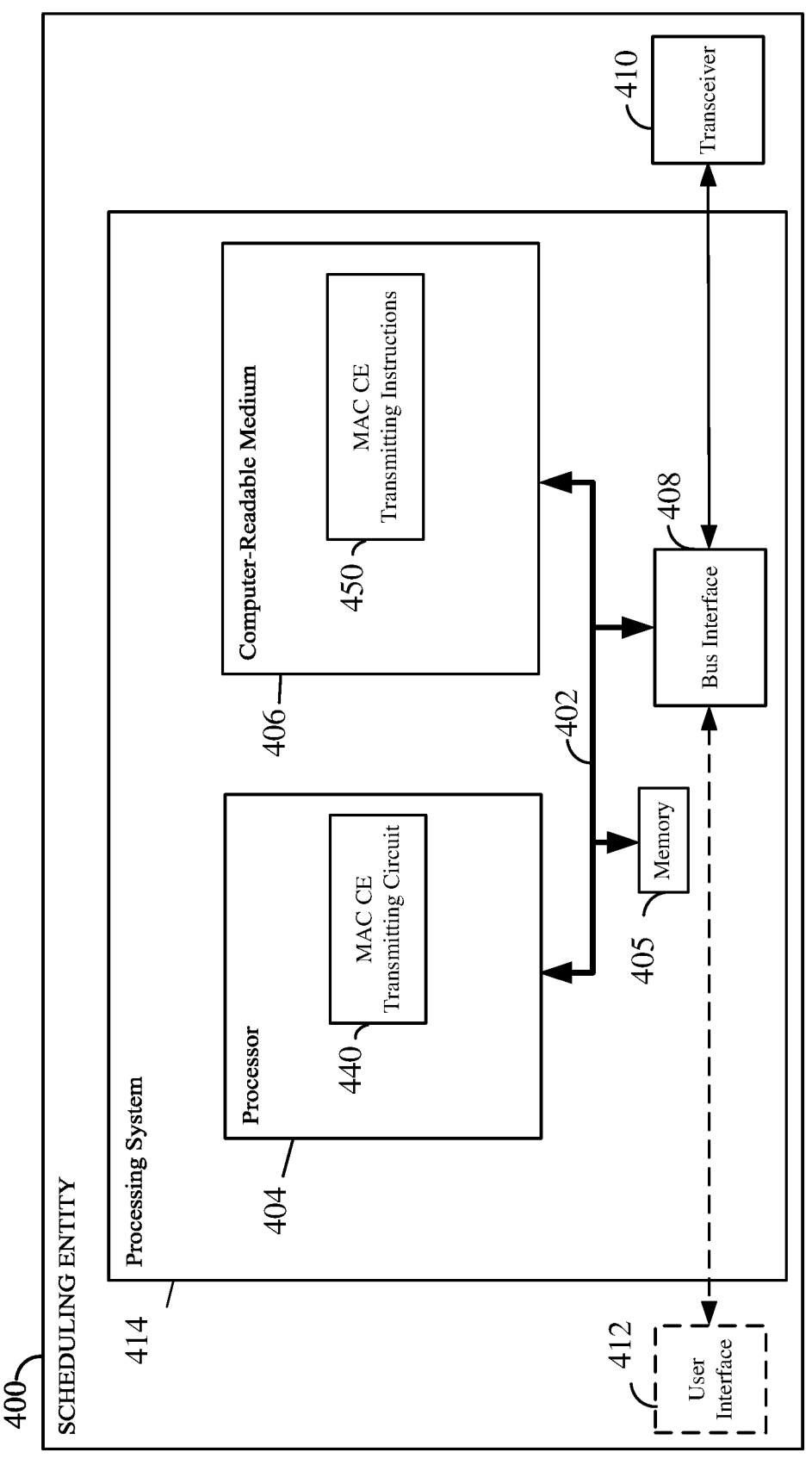
FIG. 4 is a block diagram conceptually illustrating an example of a hardware implementation for a scheduling entity according to some aspects of the disclosure.

FIG. 4 is a block diagram illustrating an example of a hardware implementation for a scheduling entity 400 employing a processing system 414. For example, the scheduling entity 400 may be a base station as illustrated in any one or more of FIGS. 1, 2, and/or 3.

The scheduling entity 400 may be implemented with a processing system 414 that includes one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 400 may be configured to perform any one or more of the functions described herein. That is, the processor 404, as utilized in a scheduling entity 400, may be used to implement any one or more of the processes and procedures described herein.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a communication interface or means for communicating with various other apparatus over a transmission medium. Depending upon the nature of the apparatus, a user interface 412 (e.g., keypad, display, speaker, microphone, joystick) may also be provided. Of course, such a user interface 412 is optional, and may be omitted in some examples, such as a base station.

In some aspects of the disclosure, the processor 404 may include MAC CE transmitting circuitry 440 configured for various functions, including, for example, transmitting a MAC CE to a scheduled entity. In some aspects, the MAC CE may be configured to indicate any one of a plurality of state transition actions for a secondary cell. In some aspects, the MAC CE may be configured to indicate any one of a plurality of state transition actions for a secondary cell independent of a current operating state of the secondary cell.

The processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software.

One or more processors 404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EE-PROM), a register, a removable disk, and any other suitable medium for storing software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 406 may include MAC CE transmitting software 450 configured for various functions, including, for example, transmitting a MAC CE to a scheduled entity. In some aspects, the MAC CE may be configured to indicate any one of a plurality of state transition actions for a secondary cell. In some aspects, the MAC CE may be configured to indicate any one of a plurality of state transition actions for a secondary cell independent of a current operating state of the secondary cell.

Figure 5:
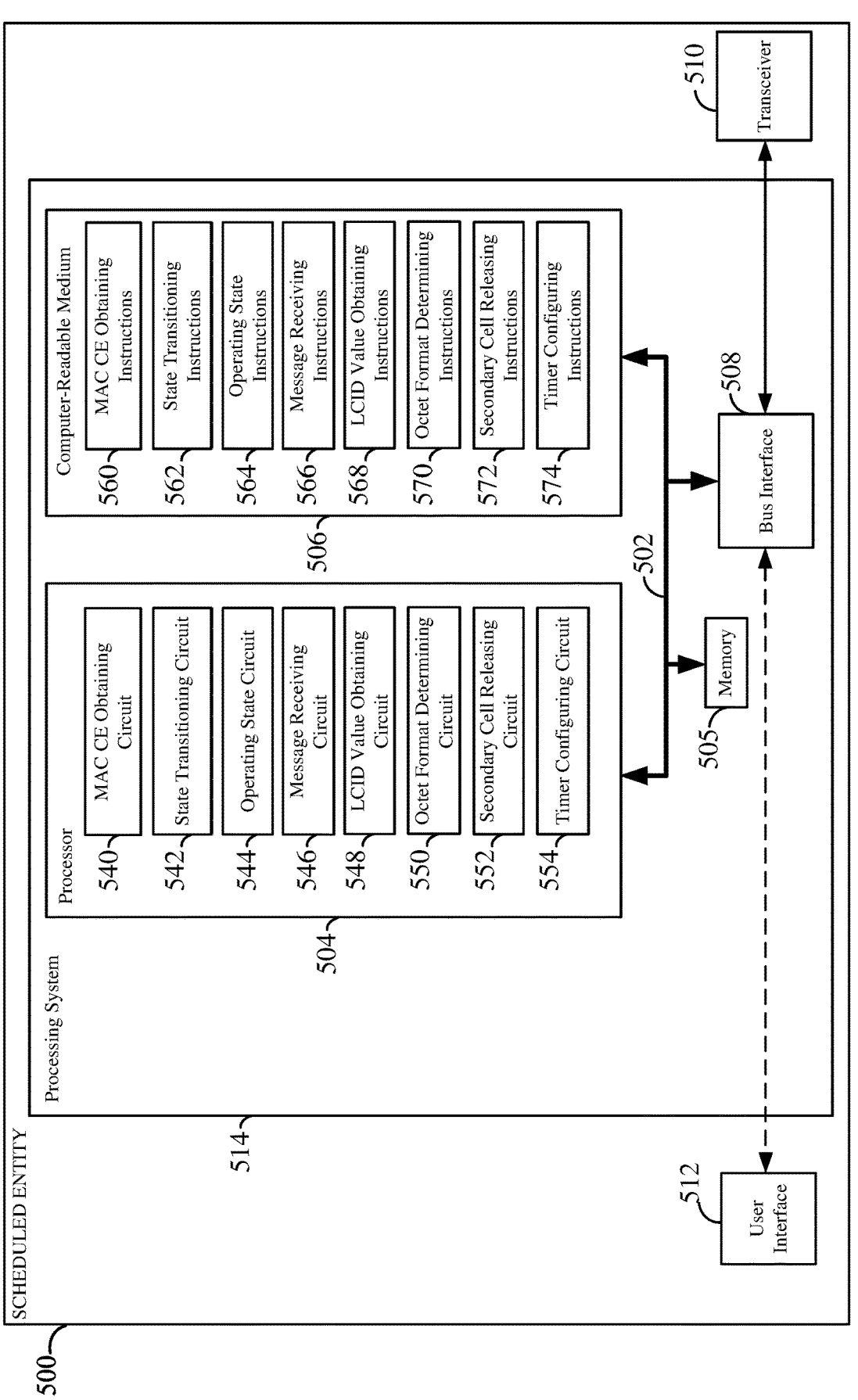
FIG. 5 is a block diagram conceptually illustrating an example of a hardware implementation for a scheduled entity according to some aspects of the disclosure.

FIG. 5 is a conceptual diagram illustrating an example of a hardware implementation for an exemplary scheduled entity 500 employing a processing system 514. In accordance with various aspects of the disclosure, an element, or any portion of an element, or any combination of elements may be implemented with a processing system 514 that includes one or more processors 504. For example, the scheduled entity 500 may be a user equipment (UE) as illustrated in any one or more of FIGS. 1 and/or 2.

The processing system 514 may be substantially the same as the processing system 414 illustrated in FIG. 4, including a bus interface 508, a bus 502, memory 505, a processor 504, and a computer-readable medium 506. Furthermore, the scheduled entity 500 may include a user interface 512 and a transceiver 510 substantially similar to those described above in FIG. 4. That is, the processor 504, as utilized in a scheduled entity 500, may be used to implement any one or more of the processes described below and illustrated in FIGS. 23-42.

In some aspects of the disclosure, the processor 504 may include MAC CE obtaining circuitry 540 configured for various functions, including, for example, obtaining a MAC CE from a network. In some aspects, the MAC CE may be configured to indicate any one of a plurality of state transition actions for a secondary cell. In some aspects, the MAC CE may be configured to indicate any one of a plurality of state transition actions for a secondary cell independent of a current operating state of the secondary cell. In some aspects of the disclosure, the MAC CE may be configured to control activation and deactivation of a secondary cell. In some aspects of the disclosure, the MAC CE obtaining circuitry 540 may be configured for various functions, including, for example, obtaining a second MAC CE from the network in a subframe. In some aspects of the disclosure, the MAC CE obtaining circuitry 540 may be configured for various functions, including, for example, obtaining a first MAC CE and a second MAC CE from a network. The first and second MAC CEs may be configured to indicate one of a plurality of state transition actions for a secondary cell. The first MAC CE may be configured to control a transition to (or from) a secondary cell dormant state and the second MAC CE may be configured to control activation and deactivation of the secondary cell. For example, the MAC CE obtaining circuitry 540 may be configured to implement one or more of the functions described below in relation to FIGS. 23-25, 28-38, including, e.g., blocks 2302, 2402, 2502, 2802, 2902, 3002, 3102, 3202, 3302, 3402, 3502, 3602, 3702 and/or 3802.

In some aspects of the disclosure, the processor 504 may include state transitioning circuitry 542 configured for various functions, including, for example, transitioning to a secondary cell fast activation state (also referred to as a secondary cell dormant state) when a state transition action indicated by the MAC CE includes a transition to the secondary cell fast activation state. It should be noted that the terms secondary cell fast activation state and secondary cell dormant state are used interchangeably in the present disclosure. In some aspects of the disclosure, the state transitioning circuitry 542 may be configured for various functions, including, for example, transitioning to a secondary cell fast activation state (also referred to as a secondary cell dormant state) from a secondary cell activated state when a state transition action indicated by the MAC CE includes a transition to the secondary cell fast activation state. In some aspects of the disclosure, the state transitioning circuitry 542 may be configured for various functions, including, for example, transitioning to a secondary cell activated state from a secondary cell fast activation state when a state transition action indicated by the MAC CE includes a transition to the secondary cell activated state. In some aspects of the disclosure, the state transitioning circuitry 542 may be configured for various functions, including, for example, transitioning to a secondary cell fast activation state from a secondary cell activated state, or transitioning to the secondary cell activated state from the secondary cell fast activation state, based on at least the MAC CE. In some aspects of the disclosure, the state transitioning circuitry 542 may be configured for various functions, including, for example, transitioning to a secondary cell fast activation state from a secondary cell activated state based on at least the MAC CE.

In some aspects of the disclosure, the state transitioning circuitry 542 may be configured for various functions, including, for example, transitioning to the secondary cell dormant state from either a secondary cell activated state or a secondary cell deactivated state when the first MAC CE includes an indication to transition to the secondary cell dormant state and the second MAC CE includes an indication to transition to the secondary cell activated state or the secondary cell deactivated state. In some aspects of the disclosure, the state transitioning circuitry 542 may be configured for various functions, including, for example, transitioning to a secondary cell fast activation state from either a secondary cell deactivated state or a secondary cell activated state based on at least the MAC CE.

In some aspects of the disclosure, the state transitioning circuitry 542 may be configured for various functions, including, for example, transitioning to a secondary cell activated state from the secondary cell dormant state when a first MAC CE excludes an indication to transition to the secondary cell dormant state and a second MAC CE includes an indication to transition to the secondary cell activated state. In some aspects of the disclosure, the state transitioning circuitry 542 may be configured for various functions, including, for example, transitioning to a secondary cell deactivated state from the secondary cell dormant state when the first MAC CE excludes an indication to transition to the secondary cell dormant state and the second MAC CE includes an indication to transition to the secondary cell deactivated state. In some aspects of the disclosure, the state transitioning circuitry 542 may be configured for various functions, including, for example, transitioning to the secondary cell deactivated state from either the secondary cell activated state or the secondary cell fast activation state when the state transition action indicated by the MAC CE includes a transition to the secondary cell deactivated state.

In some aspects of the disclosure, the state transitioning circuitry 542 may be configured for various functions, including, for example, transitioning to a secondary cell activated state from either a secondary cell deactivated state or a secondary cell fast activation state when a state transition action indicated by the MAC CE includes a transition to the secondary cell activated state. In some aspects of the disclosure, the state transitioning circuitry 542 may be configured for various functions, including, for example, transitioning to a secondary cell activated state from a secondary cell deactivated state when the first MAC CE excludes an indication to transition to the secondary cell dormant state and the second MAC CE includes an indication to transition to the secondary cell activated state. In some aspects of the disclosure, the state transitioning circuitry 542 may be configured for various functions, including, for example, transitioning to the secondary cell deactivated state from the secondary cell activated state when the first MAC CE excludes an indication to transition to the secondary cell dormant state and the second MAC CE includes an indication to transition to the secondary cell deactivated state. In some aspects of the disclosure, the state transitioning circuitry 542 may be configured for various functions, including, for example, transitioning to the fast activation state from either a secondary cell deactivated state or a secondary cell activated state based on the first MAC CE independent of the second MAC CE. In some aspects of the disclosure, the state transitioning circuitry 542 may be configured for various functions, including, for example, transitioning to either a secondary cell deactivated state or a secondary cell activated state from the fast activation state based on the second MAC CE, wherein the first MAC CE indicates to transition out of the fast activation state. In some aspects of the disclosure, the state transitioning circuitry 542 may be configured for various functions, including, for example, transitioning to a secondary cell activated state from a secondary cell deactivated state based on the second MAC CE, or transitioning to the secondary cell deactivated state from the secondary cell activated state based on the second MAC CE, wherein the first MAC CE indicates to transition out of the fast activation state.

In some aspects of the disclosure, the state transitioning circuitry 542 may be configured for various functions, including, for example, transitioning to the secondary cell activated state from the secondary cell fast activation state when the state transition action indicated by the MAC CE includes a transition to the secondary cell activated state. In some aspects of the disclosure, the state transitioning circuitry 542 may be configured for various functions, including, for example, transitioning to the secondary cell activated state from the secondary cell deactivated state when the state transition action indicated by the MAC CE includes a transition to the secondary cell activated state.

In some aspects of the disclosure, the state transitioning circuitry 542 may be configured for various functions, including, for example, transitioning to the secondary cell deactivated state from either the secondary cell activated state or the secondary cell fast activation state when the state transition action indicated by the MAC CE includes a transition to the secondary cell deactivated state. In some aspects of the disclosure, the state transitioning circuitry 542 may be configured for various functions, including, for example, transitioning to a secondary cell deactivated state from a secondary cell activated state when a state transition action indicated by the MAC CE includes a transition to the secondary cell deactivated state. In some aspects of the disclosure, the state transitioning circuitry 542 may be configured for various functions, including, for example, transitioning to a secondary cell deactivated state from a secondary cell dormant state when the MAC CE includes an indication to transition to a secondary cell deactivated state.

In some aspects of the disclosure, the state transitioning circuitry 542 may be configured for various functions, including, for example, transitioning to the secondary cell deactivated state from the secondary cell fast activation state (also referred to as a secondary cell dormant state) when the state transition action indicated by the MAC CE includes a transition to the secondary cell deactivated state.

In some aspects of the disclosure, the state transitioning circuitry 542 may be configured for various functions, including, for example, transitioning to a secondary cell deactivated state from a secondary cell dormant state upon expiration of the secondary cell deactivation timer. In some aspects of the disclosure, the state transitioning circuitry 542 may be configured for various functions, including, for example, transitioning to the secondary cell dormant state from the secondary cell activated state upon expiration of the secondary cell inactivity timer.

In some aspects of the disclosure, the state transitioning circuitry 542 may be configured for various functions, including, for example, transitioning directly to the secondary cell activated state or the secondary cell dormant state based on an indication to add a secondary cell into a secondary cell activated state or into a secondary cell dormant state.

For example, the state transitioning circuitry 542 may be configured to implement one or more of the functions described below in relation to FIGS. 23-37, 39, 41, and 42, including, e.g., blocks 2304, 2404, 2406, 2504, 2604, 2706, 2804, 2904, 3004, 3104, 3204, 3304, 3404, 3504, 3604, 3606, 3704, 3706, 3904, 4104 and/or 4206.

In some aspects of the disclosure, the processor 504 may include operating state circuitry 544 configured for various functions, including, for example, operating in the secondary cell fast activation state (also referred to as the secondary cell dormant state). In some aspects of the disclosure, the operating state circuitry 544 may be configured for various functions, including, for example, operating in the secondary cell activated state based on the transition to the secondary cell activated state or operating in the secondary cell deactivated state based on the transition to the secondary cell deactivated state. In some aspects of the disclosure, the operating state circuitry 544 may be configured for various functions, including, for example, operating in the secondary cell deactivated state. In some aspects of the disclosure, the operating state circuitry 544 may be configured for various functions, including, for example, operating in the secondary cell activated state. In some aspects of the disclosure, the operating state circuitry 544 may be configured for various functions, including, for example, operating in the secondary cell fast activation state (also referred to as the secondary cell dormant state).

In some aspects of the disclosure, the operating state circuitry 544 may be configured for various functions, including, for example, operating in the secondary cell fast activation state (also referred to as the secondary cell dormant state) based on the transition to the secondary cell fast activation state or operating in the secondary cell activated state based on the transition to the secondary cell activated state. In some aspects of the disclosure, the operating state circuitry 544 may be configured for various functions, including, for example, operating in an RRC connected state with respect to a primary cell. For example, the operating state circuitry 544 may be configured to implement one or more of the functions described below in relation to FIGS. 23-37, including, e.g., blocks 2306, 2408, 2506, 2606, 2702, 2708, 2806, 2906, 3006, 3106, 3206, 3306, 3406, 3506, 3608, and/or 3708.

In some aspects of the disclosure, the processor 504 may include a message receiving circuitry 546 configured for various functions, including, for example, receiving an RRC connection reconfiguration message. In some aspects, the RRC connection reconfiguration message may include an indication to add a secondary cell into a secondary cell activated state or into a secondary cell dormant state. In other aspects, the RRC connection reconfiguration message may include an indication to release a secondary cell. For example, the message receiving circuitry 546 may be configured to implement one or more of the functions described below in relation to FIGS. 39 and 40, including, e.g., blocks 3902 and 4002.

In some aspects of the disclosure, the processor 504 may include LCID value obtaining circuitry 548 configured for various functions, including, for example, obtaining an LCID value indicating that the MAC CE is a fast activation/deactivation MAC CE, wherein the fast activation/deactivation MAC CE supports a two octet format or an eight octet format. In some aspects of the disclosure, the LCID value obtaining circuitry 548 may be configured for various functions, including, for example, obtaining a first LCID value indicating that the MAC CE is a dormant state activation/deactivation MAC CE based on a one octet format or obtaining a second LCID value indicating that the MAC CE is the dormant state activation/deactivation MAC CE based on a four octet format. For example, the LCID value obtaining circuitry 548 may be configured to implement one or more of the functions described below in relation to FIG. 38, including, e.g., block 3804.

In some aspects of the disclosure, the processor 504 may include octet format determining circuitry 550 configured for various functions, including, for example, determining whether the two octet format or the eight octet format is to be used based on a value of a preselected bit in the MAC CE. In some aspects, the octet format determining circuitry 550 configured for various functions, including, for example, identifying the MAC CE corresponding to the secondary cell based on the one octet format or the four octet format. For example, the octet format determining circuitry 550 may be configured to implement one or more of the functions described below in relation to FIG. 38, including, e.g., block 3806.

In some aspects of the disclosure, the processor 504 may include secondary cell releasing circuitry 552 configured for various functions, including, for example, releasing a secondary cell from the secondary cell dormant state. For example, the secondary cell releasing circuitry 552 may be configured to implement one or more of the functions described below in relation to FIG. 40, including, e.g., block 4004.

In some aspects of the disclosure, the processor 504 may include timer configuring circuitry 554 configured for various functions, including, for example, configuring a secondary cell deactivation timer and/or configuring a secondary cell inactivity timer for a secondary cell. In some aspects, the term configuring as used with respect to the timers disclosed herein may include setting of the timer and/or beginning the timer. For example, the secondary cell inactivity timer may control a transition to a secondary cell dormant state from a secondary cell activated state. In some aspects, the timer configuring circuitry 554 may be configured for various functions, including, for example, prioritizing the secondary cell inactivity timer over at least one other timer configured for the secondary cell. For example, the timer configuring circuitry 554 may be configured to implement one or more of the functions described below in relation to FIGS. 41 and 42, including, e.g., blocks 4102, 4202, and 4204.

In one or more examples, the computer-readable storage medium 506 may include MAC CE obtaining software 560 configured for various functions, including, for example, obtaining a MAC CE from a network. In some aspects, the MAC CE may be configured to indicate any one of a plurality of state transition actions for a secondary cell. In some aspects, the MAC CE may be configured to indicate any one of a plurality of state transition actions for a secondary cell independent of a current operating state of the secondary cell. In some examples, the MAC CE obtaining software 560 may be configured for various functions, including, for example, obtaining a second MAC CE from the network in a subframe. In some examples, the MAC CE obtaining software 560 may be configured for various functions, including, for example, obtaining a first MAC CE and a second MAC CE from a network. The first and second MAC CEs may be configured to indicate one of a plurality of state transition actions for a secondary cell. For example, the first MAC CE may be configured to control a transition to (or from) a secondary cell dormant state and the second MAC CE may be configured to control activation and deactivation of the secondary cell. For example, the MAC CE obtaining software 560 may be configured to implement one or more of the functions described below in relation to FIGS. 23-25, 28-38, including, e.g., blocks 2302, 2402, 2502, 2802, 2902, 3002, 3102, 3202, 3302, 3402, 3502, 3602, 3702 and/or 3802.

In one or more examples, the computer-readable storage medium 506 may include state transitioning software 562 configured for various functions, including, for example, transitioning to a secondary cell fast activation state (also referred to as a secondary cell dormant state) when a state transition action indicated by the MAC CE includes a transition to the secondary cell fast activation state. In some aspects of the disclosure, the state transitioning software 562 may be configured for various functions, including, for example, transitioning to a secondary cell fast activation state (also referred to as a secondary cell dormant state) from a secondary cell activated state when a state transition action indicated by the MAC CE includes a transition to the secondary cell fast activation state. In some aspects of the disclosure, the state transitioning software 562 may be configured for various functions, including, for example, transitioning to a secondary cell activated state from a secondary cell fast activation state when a state transition action indicated by the MAC CE includes a transition to the secondary cell activated state. In some aspects of the disclosure, the state transitioning software 562 may be configured for various functions, including, for example, transitioning to a secondary cell fast activation state from a secondary cell activated state, or transitioning to the secondary cell activated state from the secondary cell fast activation state, based on at least the MAC CE. In some aspects of the disclosure, the state transitioning software 562 may be configured for various functions, including, for example, transitioning to a secondary cell fast activation state from a secondary cell activated state based on at least the MAC CE.

In some aspects of the disclosure, the state transitioning software 562 may be configured for various functions, including, for example, transitioning to the secondary cell dormant state from either a secondary cell activated state or a secondary cell deactivated state when the first MAC CE includes an indication to transition to the secondary cell dormant state and the second MAC CE includes an indication to transition to the secondary cell activated state or the secondary cell deactivated state. In some aspects of the disclosure, the state transitioning software 562 may be configured for various functions, including, for example, transitioning to a secondary cell fast activation state from either a secondary cell deactivated state or a secondary cell activated state based on at least the MAC CE.

In some aspects of the disclosure, the state transitioning software 562 may be configured for various functions, including, for example, transitioning to a secondary cell activated state from the secondary cell dormant state when the first MAC CE excludes an indication to transition to the secondary cell dormant state and the second MAC CE includes an indication to transition to the secondary cell activated state. In some aspects of the disclosure, the state transitioning software 562 may be configured for various functions, including, for example, transitioning to a secondary cell deactivated state from the secondary cell dormant state when the first MAC CE excludes an indication to transition to the secondary cell dormant state and the second MAC CE includes an indication to transition to the secondary cell deactivated state. In some aspects of the disclosure, the state transitioning software 562 may be configured for various functions, including, for example, transitioning to the secondary cell deactivated state from either the secondary cell activated state or the secondary cell fast activation state when the state transition action indicated by the MAC CE includes a transition to the secondary cell deactivated state.

In some aspects of the disclosure, the state transitioning software 562 may be configured for various functions, including, for example, transitioning to a secondary cell activated state from either a secondary cell deactivated state or a secondary cell fast activation state when a state transition action indicated by the MAC CE includes a transition to the secondary cell activated state. In some aspects of the disclosure, the state transitioning software 562 may be configured for various functions, including, for example, transitioning to a secondary cell activated state from a secondary cell deactivated state when the first MAC CE excludes an indication to transition to the secondary cell dormant state and the second MAC CE includes an indication to transition to the secondary cell activated state. In some aspects of the disclosure, the state transitioning software 562 may be configured for various functions, including, for example, transitioning to the secondary cell deactivated state from the secondary cell activated state when the first MAC CE excludes an indication to transition to the secondary cell dormant state and the second MAC CE includes an indication to transition to the secondary cell deactivated state. In some aspects of the disclosure, the state transitioning software 562 may be configured for various functions, including, for example, transitioning to the fast activation state from either a secondary cell deactivated state or a secondary cell activated state based on the first MAC CE independent of the second MAC CE. In some aspects of the disclosure, the state transitioning software 562 may be configured for various functions, including, for example, transitioning to either a secondary cell deactivated state or a secondary cell activated state from the fast activation state based on the second MAC CE, wherein the first MAC CE indicates to transition out of the fast activation state. In some aspects of the disclosure, the state transitioning software 562 may be configured for various functions, including, for example, transitioning to a secondary cell activated state from a secondary cell deactivated state based on the second MAC CE, or transitioning to the secondary cell deactivated state from the secondary cell activated state based on the second MAC CE, wherein the first MAC CE indicates to transition out of the fast activation state.

In some aspects of the disclosure, the state transitioning software 562 may be configured for various functions, including, for example, transitioning to the secondary cell activated state from the secondary cell fast activation state when the state transition action indicated by the MAC CE includes a transition to the secondary cell activated state. In some aspects of the disclosure, the state transitioning software 562 may be configured for various functions, including, for example, transitioning to the secondary cell activated state from the secondary cell deactivated state when the state transition action indicated by the MAC CE includes a transition to the secondary cell activated state.

In some aspects of the disclosure, the state transitioning software 562 may be configured for various functions, including, for example, transitioning to the secondary cell deactivated state from either the secondary cell activated state or the secondary cell fast activation state when the state transition action indicated by the MAC CE includes a transition to the secondary cell deactivated state. In some aspects of the disclosure, the state transitioning software 562 may be configured for various functions, including, for example, transitioning to a secondary cell deactivated state from a secondary cell activated state when a state transition action indicated by the MAC CE includes a transition to the secondary cell deactivated state. In some aspects of the disclosure, the state transitioning software 562 may be configured for various functions, including, for example, transitioning to a secondary cell deactivated state from a secondary cell dormant state when the MAC CE includes an indication to transition to a secondary cell deactivated state.

In some aspects of the disclosure, the state transitioning software 562 may be configured for various functions, including, for example, transitioning to the secondary cell deactivated state from the secondary cell fast activation state (also referred to as a secondary cell dormant state) when the state transition action indicated by the MAC CE includes a transition to the secondary cell deactivated state.

In some aspects of the disclosure, the state transitioning software 562 may be configured for various functions, including, for example, transitioning to a secondary cell deactivated state from a secondary cell dormant state upon expiration of the secondary cell deactivation timer. In some aspects of the disclosure, the state transitioning software 562 may be configured for various functions, including, for example, transitioning to the secondary cell dormant state from the secondary cell activated state upon expiration of the secondary cell inactivity timer.

In some aspects of the disclosure, the state transitioning software 562 may be configured for various functions, including, for example, transitioning directly to the secondary cell activated state or the secondary cell dormant state based on an indication to add a secondary cell into a secondary cell activated state or into a secondary cell dormant state.

For example, the state transitioning software 562 may be configured to implement one or more of the functions described below in relation to FIGS. 23-37, 39, 41, and 42, including, e.g., blocks 2304, 2404, 2406, 2504, 2604, 2704, 2706, 2804, 2904, 3004, 3104, 3204, 3304, 3404, 3504, 3604, 3606, 3704, 3706, 3904, 4104 and/or 4206.

In one or more examples, the computer-readable storage medium 506 may include operating state software 564 configured for various functions, including, for example, operating in the secondary cell fast activation state (also referred to as the secondary cell dormant state). In some aspects of the disclosure, the operating state software 564 may be configured for various functions, including, for example, operating in the secondary cell activated state based on the transition to the secondary cell activated state or operating in the secondary cell deactivated state based on the transition to the secondary cell deactivated state. In some aspects of the disclosure, the operating state software 564 may be configured for various functions, including, for example, operating in the secondary cell deactivated state. In some aspects of the disclosure, the operating state software 564 may be configured for various functions, including, for example, operating in the secondary cell activated state. In some aspects of the disclosure, the operating state software 564 may be configured for various functions, including, for example, operating in the secondary cell fast activation state.

In some aspects of the disclosure, the operating state software 564 may be configured for various functions, including, for example, operating in the secondary cell fast activation state (also referred to as the secondary cell dormant state) based on the transition to the secondary cell fast activation state or operating in the secondary cell activated state based on the transition to the secondary cell activated state. For example, the operating state software 564 may be configured to implement one or more of the functions described below in relation to FIGS. 23-37, including, e.g., blocks 2306, 2408, 2506, 2606, 2708, 2806, 2906, 3006, 3106, 3206, 3306, 3406, 3506, 3608, and/or 3708.

In some aspects of the disclosure, the message receiving software 566 may be configured for various functions, including, for example, receiving an RRC connection reconfiguration message. In some aspects, the RRC connection reconfiguration message may include an indication to add a secondary cell into a secondary cell activated state or into a secondary cell dormant state. In other aspects, the RRC connection reconfiguration message may include an indication to release a secondary cell. For example, the message receiving software 566 may be configured to implement one or more of the functions described below in relation to FIGS. 39 and 40, including, e.g., blocks 3902 and 4002.

In one or more examples, the computer-readable storage medium 506 may include LCID value obtaining software 568 configured for various functions, including, for example, obtaining an LCID value indicating that the MAC CE is a fast activation/deactivation MAC CE, wherein the fast activation/deactivation MAC CE supports a two octet format or an eight octet format. In some aspects of the disclosure, the LCID value obtaining software 568 may be configured for various functions, including, for example, obtaining a first LCID value indicating that the MAC CE is a dormant state activation/deactivation MAC CE based on a one octet format or obtaining a second LCID value indicating that the MAC CE is the dormant state activation/deactivation MAC CE based on a four octet format. For example, the LCID value obtaining software 568 may be configured to implement one or more of the functions described below in relation to FIG. 38, including, e.g., block 3804.

In one or more examples, the computer-readable storage medium 506 may include octet format determining software 570 configured for various functions, including, for example, determining whether the two octet format or the eight octet format is to be used based on a value of a preselected bit in the MAC CE. In some aspects, the octet format determining software 570 configured for various functions, including, for example, identifying the MAC CE corresponding to the secondary cell based on the one octet format or the four octet format. For example, the octet format determining software 570 may be configured to implement one or more of the functions described below in relation to FIG. 38, including, e.g., block 3806.

In some aspects of the disclosure, the processor 504 may include secondary cell releasing software 572 configured for various functions, including, for example, releasing a secondary cell from the secondary cell dormant state. For example, the secondary cell releasing software 572 may be configured to implement one or more of the functions described below in relation to FIG. 40, including, e.g., block 4004.

In some aspects of the disclosure, the processor 504 may include timer configuring software 574 configured for various functions, including, for example, configuring a secondary cell deactivation timer and/or configuring a secondary cell inactivity timer for a secondary cell. For example, the secondary cell inactivity timer may control a transition to a secondary cell dormant state from a secondary cell activated state. In some aspects, the timer configuring software 574 may be configured for various functions, including, for example, prioritizing the secondary cell inactivity timer over at least one other timer configured for the secondary cell. For example, the timer configuring software 574 may be configured to implement one or more of the functions described below in relation to FIGS. 41 and 42, including, e.g., blocks 4102, 4202, and 4204.

The present disclosure generally relates to techniques for controlling secondary cell (SCell) state transitions. The SCell state transitions may include a new state of an SCell, such as an SCell fast activation state (also herein referred to as an SCell dormant state, a fast activation state, or a new SCell state). For example, the SCell fast activation state may reduce or optimize power consumption of a UE (e.g., the scheduled entity 500 in FIG. 5) and may reduce SCell activation latency in a wireless communication system employing Long Term Evolution (LTE) carrier aggregation. Carrier aggregation permits the use of more than one carrier in order to increase overall transmission bandwidth. To perform carrier aggregation, a UE may, in coordination with a network entity (e.g., eNB), initially select a primary cell (PCell) and then receive an allocation of one or more secondary cells (SCell) after evaluation by the network that such cells can also serve the UE. The techniques for controlling SCell state transitions are also described herein from the perspective of the UE. For example, to ensure optimal operation, a UE may need to be made aware of the state transitions of an SCell so that the UE can transition its operating state according to the state transitions of the SCell.

In conventional communication systems, an SCell may be in an SCell deactivated state or an SCell activated state (also referred to as activated mode). In accordance with the aspects described herein, SCells may be implemented with the SCell fast activation state in addition to the legacy SCell states (e.g., the SCell deactivated state and the SCell activated state). In some aspects of the disclosure, as described in detail herein, transitions between the SCell fast activation state and the legacy SCell states may be based on a medium access control (MAC) control element (CE) procedure. It should be understood that the aspects described herein may be applied to Long Term Evolution (LTE) networks, 5G NR networks, and other suitable communication networks.

Figure 6:
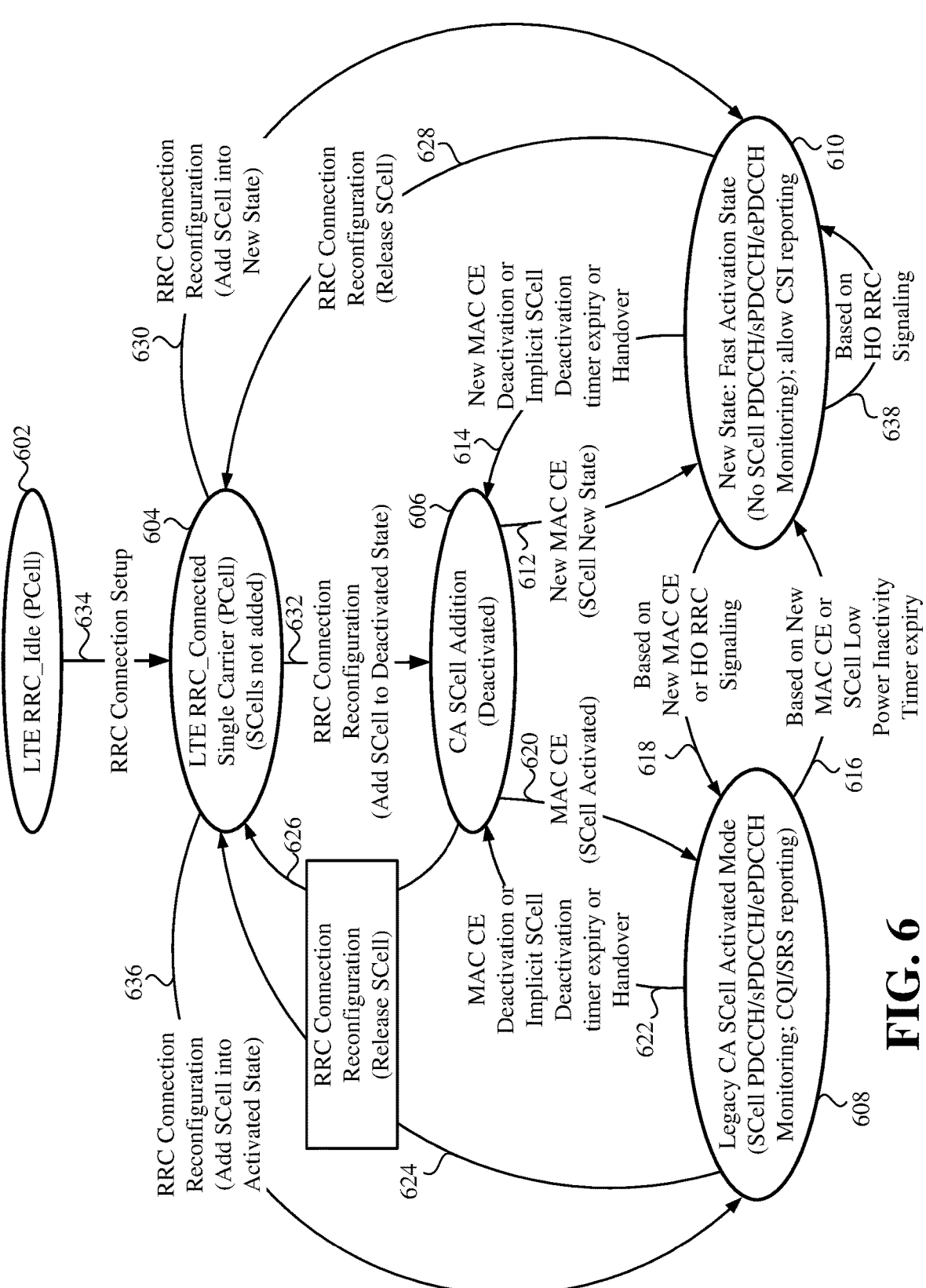
FIG. 6 is an example state transition diagram for a primary cell (PCell) and a secondary cell (SCell) in accordance with some aspects of the disclosure.

FIG. 6 is a first example state transition diagram for a PCell and an SCell in accordance with some aspects of the disclosure. In some aspects, the states and the state transitions described with reference to FIG. 6 may be from the perspective of a UE. For example, in some aspects of the disclosure, the states and the state transitions described with reference to FIG. 6 may represent the corresponding operating sates and state transitions of the UE (e.g., the scheduled entity 500 in FIG. 5).

In the state 602, the UE may be in the radio resource control (RRC) idle mode (also referred to as LTE RRC_Idle mode) with respect to a primary cell (PCell). The UE may transition 634 to the state 604 and operate in an RRC connected mode (also referred to as LTE RRC_Connected) after an RRC Connection Setup procedure. For example, in the state 604, only a single carrier is available to the UE via the PCell since no SCells have been added at this state. At the state 606, an SCell is added for carrier aggregation. The transition 632 to the state 606 may include an RRC Connection Reconfiguration procedure. It should be noted that the added SCell remains deactivated at the state 606. In the state 608, the SCell is in a legacy carrier aggregation (CA) activated mode. For example, in the state 608, the UE may monitor the PDCCH, the secondary PDCCH (sPDCCH), the enhanced PDCCH (ePDCCH), and/or may report channel quality indicator (CQI)/sounding reference signal (SRS). In the new state 610, the SCell is in the SCell fast activation state. In some aspects of the disclosure, in the state 610, the UE may not monitor (e.g., refrain from monitoring) the PDCCH, the secondary PDCCH (sPDCCH), the enhanced PDCCH (ePDCCH) of the SCell and/or may not perform active PDSCH/PUSCH data transfer. In some aspects of the disclosure, in the state 610, the UE may report channel quality indicator (CQI)/sounding reference signal (SRS).

In FIG. 6, state transitions 620, 622, 624, 632, 634, and 636 are legacy state transitions. For example, these state transitions may be signalled to a UE using legacy signalling (e.g., using conventional signalling protocols). State transitions 612, 614, 616 and 618 are new transitions due to the SCell fast activation state 610. In accordance with some aspects of the disclosure, the state transitions 612, 614, 616 and 618 may be defined using a new MAC CE. In an aspect of the disclosure, with reference to the state transition 618, the SCell may be moved directly from the SCell fast activation state 610 to the legacy SCell activated state 608 (e.g., the SCell activated mode) after handover (HO) based on an HO RRC signalling indication. In an aspect of the disclosure, with reference to the state transition 628, upon receiving an RRC Connection Reconfiguration message with an SCell release indication, the SCell may be released from the SCell fast activation state 610. In an aspect of the disclosure, with reference to the state transition 630, upon the addition of an SCell, the added SCell may be allowed to transition directly from state 604 to the SCell fast activation state 610 based on a new RRC information element (IE) indication. In an aspect of the disclosure, with reference to the state transition 638, based on RRC handover (HO) signalling, the SCell may continue to stay in the SCell fast activation state 610 after HO as well.

Legacy SCell state transitions and legacy MAC CE behavior will now be described. The activation/deactivation mechanism for SCells may be based on the combination of a MAC CE and deactivation timers. The MAC CE carries a bitmap for the activation and deactivation of SCells: a bit set to '1' denotes activation of the corresponding SCell, while a bit set to '0' denotes deactivation. With the bitmap, SCells may be activated and deactivated individually, and a single activation/deactivation command may activate/deactivate a subset of the SCells. One deactivation timer may be maintained per SCell, but one common value is configured per UE by radio resource control (RRC).

FIG. 7 illustrates an example format 700 of a legacy SCell activation/deactivation MAC CE of one octet. As shown in FIG. 7, the example format 700 has a fixed size and includes seven C-fields (e.g., the fields $C_1$ through $C_7$ in FIG. 7) and one reserved field (also referred to herein as an R-field). The seven C-fields may represent the previously described bitmap carried in the MAC CE, and each C-field may correspond to a particular SCell.

Figure 8:
FIG. 8 illustrates an example format of a legacy SCell activation/deactivation MAC CE of four octets.

FIG. 8 illustrates an example format 800 of a legacy SCell activation/deactivation MAC control element of four octets. As shown in FIG. 8, the example format 800 has a fixed size and includes 31 C-fields (e.g., the fields $C_1$ through $C_{31}$ in FIG. 8) and one R-field. The 31 C-fields may represent the previously described bitmap carried in the MAC CE, and each C-field may correspond to a particular SCell.

FIG. 9 illustrates a table 900 including a list of example logical channel identifier (LCID) values. For example, the LCID values in FIG. 9 may be for a downlink (DL) shared channel. In some aspects of the disclosure, one or more new LCID values, such as the new LCID values 902, 904, may be implemented to represent one or more corresponding new MAC CEs for controlling state transitions involving the previously described new state (e.g., SCell fast activation state 610 in FIG. 6). In some aspects of the disclosure, the format of such new MAC CEs may be similar to a legacy MAC CE format, such as the example format 700 of a legacy SCell activation/deactivation MAC control element of one octet shown in FIG. 7 or the example format 800 of a legacy SCell activation/deactivation MAC control element of four octets shown in FIG. 8. In some aspects of the disclosure, the fast activation/deactivation MAC CE of one octet may be identified by a MAC PDU sub header with a new LCID value (e.g., the new LCID value 904 in FIG. 9). For example, the fast activation/deactivation MAC CE may have a fixed size and may consist of a single octet containing seven C-fields and one R-field.

In some aspects of the disclosure, the fast activation/deactivation MAC CE of four octets may be identified by a MAC PDU sub header with a new LCID value (e.g., the new LCID value 904 in FIG. 9). For example, the fast activation/deactivation MAC CE may have a fixed size and may consist of four octets containing 31 C-fields and one R-field. In some aspects of the disclosure, if there is an SCell configured with SCellIndex i, the value of the $C_i$ field may indicate the fast activation/deactivation transition of the SCell with SCellIndex i. Otherwise, the MAC entity may ignore the value of the $C_i$ field. For example, the $C_i$ field may be set to '1' to indicate that the SCell with SCellIndex i transitions to the SCell fast activation state, or may be set to '0' to indicate that the SCell with SCellIndex i transitions out of the SCell fast activation state. For example, the reserved bit R may be set to '0'. In one aspect of the disclosure, for the case with no serving cell with a serving cell index (ServCellIndex) larger than 7, the fast activation/deactivation MAC CE of one octet may be applied, otherwise the fast activation/deactivation MAC CE of four octets may be applied.

In some aspects of the disclosure, the fast activation/deactivation MAC CE of one octet or four octets may be identified by a MAC PDU sub header with a single new LCID value (e.g., the new LCID value 904 in FIG. 9). In such aspects, for example, the reserved bit R (e.g., in the R-field previously described with reference to FIGS. 7 and 8) of a new SCell activation/deactivation MAC control element may be set to '0' to indicate the one octet format (e.g., the example format 700) or may be set to '1' to indicate the four-octet format (e.g., the example format 800).

SCell State Transitions to the New State from a Legacy State

Figure 10:
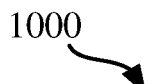
FIG. 10 illustrates a table indicating new MAC CE values and legacy MAC CE values for controlling the state transitions of an SCell in accordance with various aspects of the disclosure.

FIG. 10 illustrates a table 1000 indicating exemplary new MAC CE values and legacy MAC CE values for controlling the state transitions of an SCell in accordance with various aspects of the disclosure. It should be noted that the state transitions 1002, 1004, 1006, and 1008, and the corresponding new MAC CE values and legacy MAC CE values, involve transitions from a legacy state of an SCell to the new state (e.g., the previously described SCell fast activation state). The values in table 1000 serve to show one example implementation to facilitate understanding of the aspects described herein. Therefore, it should be understood that one or more of the values (e.g., the actual values of the bits) in table 1000 may be configured differently in other aspects. It should be further noted that the state transitions may be based on the initial state from which the transition is to occur, in addition to the values in one or more MAC CEs (e.g., the value in a new MAC CE and/or the value in a legacy MAC CE). For example, state transitions 1002 and 1006 are different because the state transition 1002 may initiate from a deactivated state whereas state transition 1006 may initiate from a legacy activated state, even though the values in the MAC CEs are the same for these both transitions.

In some aspects of the disclosure, if a UE receives a new MAC CE that includes a $C_i$ field (e.g., a $C_i$ field corresponding to a particular SCell) set to '1', the UE may transition from a legacy state to the new state. In a first example state transition (e.g., state transition 1002 or state transition 1004), if the SCell (and the UE) is in a legacy deactivated state (also herein referred to as a legacy SCell deactivated state) and the UE receives a new MAC CE with the $C_i$ field (e.g., the $C_i$ field corresponding to the SCell) set to '1', the UE may transition to the SCell fast activation state. In a second example state transition (e.g., state transition 1006 or state transition 1008), if the SCell (and the UE) is in a legacy activated state and the UE receives a new MAC CE with the $C_i$ field set to '1', the UE may transition to the SCell fast activation state. If a UE receives only one MAC CE (e.g., either a new MAC CE or a legacy MAC CE), the UE may act based on the received MAC CE.

If a UE receives both a legacy MAC CE and a new MAC CE in the same subframe (e.g., for the same SCell) and the new MAC CE is set to '1', then the new MAC CE may take precedence over the legacy MAC CE. For example, in a scenario where a UE receives both a legacy MAC CE and a new MAC CE in the same subframe, the $C_i$ field in the legacy MAC CE may be set to '0', but the $C_i$ field in the new MAC CE may be set to '1'. In such a scenario, the SCell corresponding to the $C_i$ field may transition to the new state (e.g., the SCell fast activation state). Accordingly, the UE may ignore the $C_i$ field in the legacy MAC CE. If a UE is operating in a legacy state and both a legacy MAC CE and a new MAC CE are received in the same sub-frame, then to enable legacy state transitions (e.g., transitions 620, 622 in FIG. 6), the new MAC CE value may be set to '0' and the legacy MAC CE value may be set to '0' or '1' based on the previously described legacy SCell state transition definition (e.g., a bit set to '1' denotes activation of the corresponding SCell, while a bit set to '0' denotes deactivation). It should be understood that the notation "--" in FIG. 10 indicates that a value is absent or not received, and the notation "X" indicates that a value may be '0' or '1'.

In some aspects of the disclosure, if the UE receives a new MAC CE with a $C_i$ field in the new MAC CE set to '0' and if the UE does not receive a legacy MAC CE, the UE may recognize this as an invalid condition and may maintain its current state. In other aspects of the disclosure, if the UE is in a legacy SCell activated state (e.g., the state 608), and if the UE receives a new MAC CE with a $C_i$ field in the new MAC CE set to '0' and does not receive a legacy MAC CE, the UE may transition to the legacy SCell deactivated state.

SCell State Transitions from the New State to a Legacy State

Figure 11:
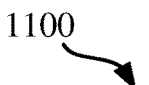
FIG. 11 illustrates a table indicating new MAC CE values and legacy MAC CE values for controlling the state transitions of an SCell in accordance with various aspects of the disclosure.

FIG. 11 illustrates a table 1100 indicating new MAC CE values and legacy MAC CE values for controlling the state transitions of an SCell in accordance with various aspects of the disclosure. It should be noted that the state transitions 1102 and 1104, and the corresponding new MAC CE values and legacy MAC CE values, involve transitions from the new state (e.g., the SCell fast activation state) of an SCell to a legacy state of the SCell. Therefore, a UE operating in the new state (e.g., the SCell fast activation state) may transition to a legacy state depending on both a legacy MAC CE value and a new MAC CE value. In one example, with reference to FIG. 6, a UE may currently be in the SCell fast activation state 610. The UE may transition from the SCell fast activation state 610 to the legacy SCell activated state 608 (e.g., the legacy carrier aggregation (CA) activated mode) when the $C_i$ field corresponding to the SCell in the new MAC CE is set to '0' and the $C_i$ field corresponding to the SCell in the legacy MAC CE is set to '1'. In another example, again with reference to FIG. 6, a UE may currently be in the SCell fast activation state 610. The UE may transition from the SCell fast activation state 610 to the legacy SCell deactivated state 606 when the $C_i$ field corresponding to the SCell in the new MAC CE is set to '0' and the $C_i$ field corresponding to the SCell in the legacy MAC CE is set to '0'. In accordance with some aspects of the disclosure, this approach may require only one new MAC CE to be signaled from the network to handle all possible new SCell state transitions, in addition to the signaling of a legacy MAC CE.

In one aspect of the disclosure, as previously described, a UE may transition from the new state to the legacy deactivated state via the legacy MAC CE deactivation method. In another aspect of the disclosure, a UE may transition from the new state to the legacy deactivated state as a result of an SCell deactivation timer expiry for a given SCell. In one example, the SCell deactivation timer may be a legacy timer. In another example, the SCell deactivation timer may be a new timer configured with a timer value that is the same or larger than legacy timer values. In another aspect of the disclosure, an UE may transition from the new state to the legacy deactivated state due to handover.

In one aspect of the disclosure, with reference to FIG. 6, a UE may transition from the legacy SCell activated state 608 (e.g. the SCell PDCCH Monitoring State of the SCell Activated State) to the new state 610 in response to an expiration of an inactivity timer (e.g., "Low Power Inactivity Timer Expiry") specific to the SCell. The Low Power Inactivity Timer may be a function of a connected mode discontinuous reception (CDRX) inactivity timer or a newly defined timer. This is new timer behavior. The new transition 616 may be prioritized by defining a shorter Low Power Inactivity Timer compared to a legacy SCell inactivity timer, in which case the legacy transition 622 due to SCell inactivity timer expiry may not occur. In one aspect of the disclosure, with reference to FIG. 6, a UE may transition from the legacy SCell activated state 608 (e.g. the SCell PDCCH Monitoring State of the SCell Activated State) to the SCell fast activation state 610 in response to a new MAC CE trigger received on a PCell or an SCell.

Figure 12:
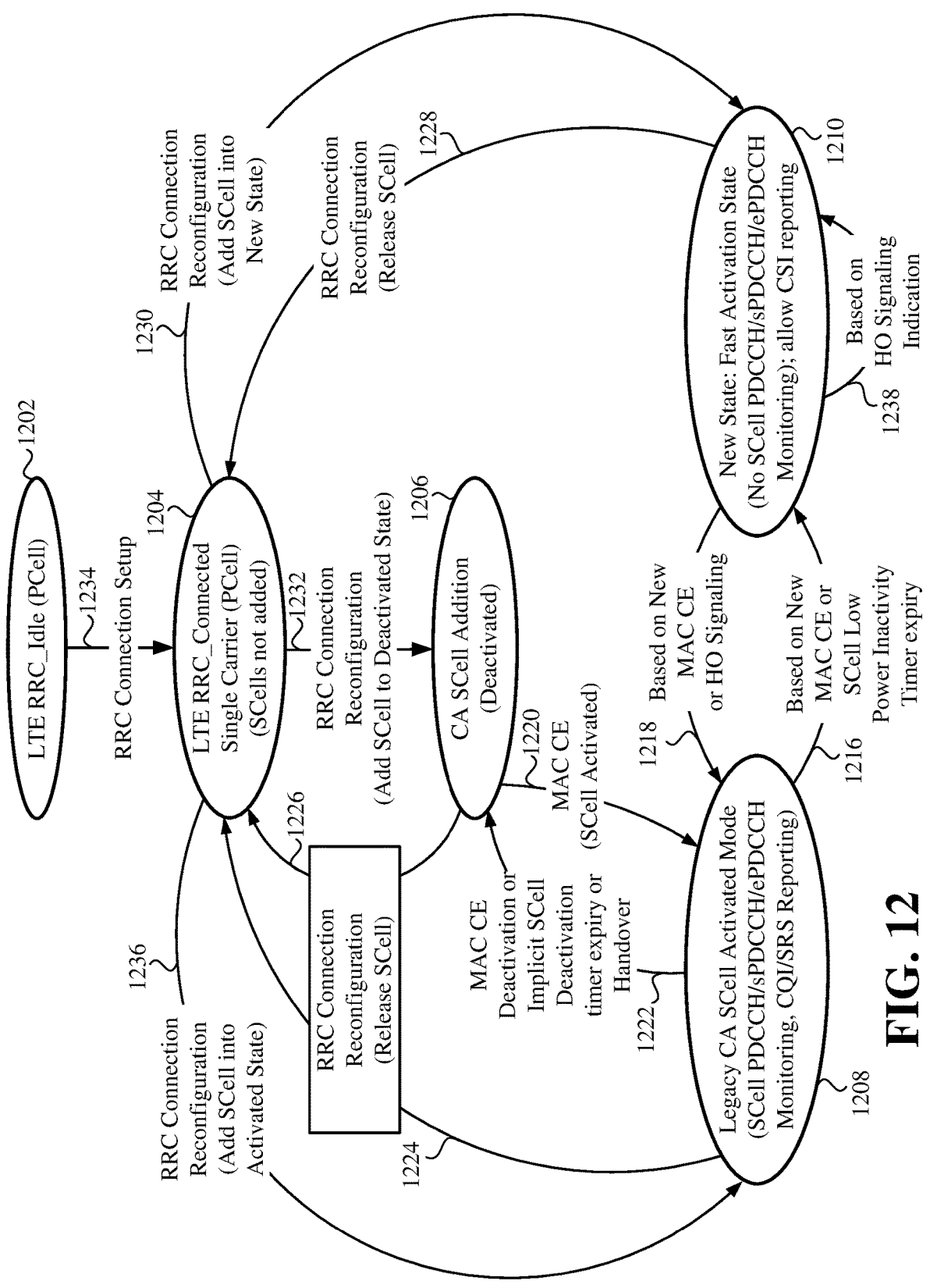
FIG. 12 is an example state transition diagram for a PCell and an SCell in accordance with some aspects of the disclosure.

FIG. 12 is a second example state transition diagram for a PCell and an SCell in accordance with some aspects of the disclosure. In some aspects, the states and the state transitions described with reference to FIG. 12 may be from the perspective of a UE. For example, in some aspects of the disclosure, the states and the state transitions described with reference to FIG. 12 may represent the corresponding operating sates and state transitions of the UE. In some aspects of the disclosure, the states 1202, 1204, 1206, 1208, and 1210 shown in FIG. 12 respectively correspond to the previously described states 602, 604, 606, 608, and 610 shown in FIG. 6. In such aspects, the state transitions 1216, 1220, 1222, 1224, 1226, 1228, 1230, 1232, 1234, and 1236 shown in FIG. 12 respectively correspond to the state transitions 616, 620, 622, 624, 626, 628, 630, 632, 634, and 636 shown in FIG. 6. It should be noted that in the example configuration of FIG. 12, there is no state transition from the state 1206 to the new state 1210 (also referred to as the SCell fast activation state 1210), and there is no state transition from the new state 1210 to the state 1206.

State transitions 1216, 1218, and 1238 are new transitions due to the SCell fast activation state 1210. In accordance with some aspects of the disclosure, the state transitions 1216 and 1218 may be defined using a new MAC CE. In an aspect of the disclosure, with reference to the state transition 1218, the SCell may be moved directly from the SCell fast activation state 1210 to the state 1208 (e.g., the SCell activated mode) in response to a handover (HO) indication (e.g., in response to receiving a handover signal or in response to receiving an RRC signalling indication). In an aspect of the disclosure, with reference to the state transition 1228, upon receiving an RRC Connection Reconfiguration message with an SCell release indication, the SCell may be released from the SCell fast activation state 1210. In an aspect of the disclosure, with reference to the state transition 1230, upon the addition of the SCell, the SCell may be allowed to transition directly from state 1204 to the SCell fast activation state 1210 based on a new RRC information element (IE) indication. In an aspect of the disclosure, with reference to the state transition 1238, based on handover signalling, the SCell may continue to stay in SCell fast activation state 610 after handover as well.

As previously described with reference to FIG. 6, if there is an SCell configured with SCellIndex i, the value of the $C_i$ field may indicate the fast activation/deactivation transition of the SCell with SCellIndex i. Otherwise, the MAC entity may ignore the value of the $C_i$ field. For example, in FIG. 12, the $C_i$ field may be set to '1' to indicate that the SCell with SCellIndex i transitions to the SCell fast activation state, or may be set to '0' to indicate that the SCell with SCellIndex i transitions out of the SCell fast activation state. For example, the reserved bit R may be set to '0'. In one aspect of the disclosure, for the case with no serving cell with a ServCellIndex larger than 7, the Fast Activation/Deactivation MAC CE of one octet may be applied, otherwise the Fast Activation/Deactivation MAC CE of four octets may be applied.

Figure 13:
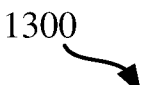
FIG. 13 illustrates a table indicating new MAC CE values and legacy MAC CE values for controlling the state transitions of an SCell in accordance with various aspects of the disclosure.

FIG. 13 illustrates a table 1300 indicating new MAC CE values and legacy MAC CE values for controlling the state transitions of an SCell in accordance with various aspects of the disclosure. It should be noted that the state transitions 1302 and 1304, and the corresponding new MAC CE values and legacy MAC CE values, involve transitions from a legacy state of an SCell to the new state (e.g., the SCell fast activation state). It should further be noted that the state transitions 1306 and 1308, and the corresponding new MAC CE values and legacy MAC CE values, involve transitions from the new state (e.g., the SCell fast activation state) of an SCell to a legacy state. It should be understood that the notation "--" in FIG. 13 indicates that a value is absent or not received, and the notation "X" indicates that a value may be '0' or '1'.

A new MAC CE based state transition (e.g., state transition 1216) from a legacy state (e.g., the legacy activated state 1208) to the new state (e.g., the SCell fast activation state 1210) will now be described. In an aspect of the disclosure, if a UE receives a new MAC CE that includes a $C_i$ field (e.g., a $C_i$ field corresponding to a particular SCell) set to '1', the UE may transition from the legacy activated state 1208 to the new state (e.g., the SCell fast activation state 1210). A new MAC CE based state transition (e.g., state transition 1218) from the new state (e.g., the SCell fast activation state 1210) to the legacy activated state 1208 will now be described. In an aspect of the disclosure, if a UE receives a new MAC CE that includes a $C_i$ field (e.g., a $C_i$ field corresponding to a particular SCell) set to '0', the UE may transition from the new state (e.g., the SCell fast activation state 1210) to the legacy activated state 1208.

In one aspect of the disclosure, if an SCell is in a legacy deactivated state (e.g., the state 1206) and if a UE receives both a legacy MAC CE and a new MAC CE, then the legacy MAC CE is used for state transition and the new MAC CE is ignored. In another aspect of the disclosure, if an SCell is in the legacy deactivated state 1206 and if a UE receives both a legacy MAC CE and a new MAC CE, the SCell (and the UE) may transition to the new fast activation state 1210 when the legacy MAC CE is set to '1' and the new MAC CE is also set to '1'. In another aspect of the disclosure, an SCell may be in the legacy activated state 1208 and a UE may receive both a legacy MAC CE and a new MAC CE. In this aspect, the SCell (and the UE) may stay in the same legacy activated state 1208 when the legacy MAC CE is set to '1' and the new MAC CE is set to '0'. As such, in this aspect, no "transition" has occurred. Further in this aspect, the SCell (and the UE) may transition to the new state 1210 when both the legacy MAC CE and the new MAC CE are both set to '1'. Further in this aspect, the SCell (and the UE) may transition to the legacy deactivated state 1206 when the legacy MAC CE is set to '0', independent of the value of the new MAC CE. In one aspect of the disclosure, if the SCell (and the UE) is in SCell fast activation state 1210 and if the UE receives both a legacy MAC CE and a new MAC CE, then only the new MAC CE is used for state transition and the legacy MAC CE is ignored.

In one aspect of the disclosure, with reference to FIG. 12, an SCell may transition from the legacy activated state 1208 (e.g. the SCell PDCCH Monitoring State of the SCell Activated State) to a new state (e.g., the SCell fast activation state 1210) in response to an expiration of an inactivity timer (e.g., "Low Power Inactivity Timer Expiry") specific to the SCell. The Low Power Inactivity Timer may be a function of a connected mode discontinuous reception (CDRX) inactivity timer or a newly defined timer. This is new timer behavior. In some aspects of the disclosure, the transition

1216 may be prioritized by defining a shorter Low Power Inactivity Timer compared to a legacy SCell inactivity timer, in which case the legacy transition 1222 due to SCell inactivity timer expiry may not occur. In one aspect of the disclosure, with reference to FIG. 12, an SCell may transition from the legacy activated state 1208 (e.g. the SCell PDCCH Monitoring State of the SCell Activated State) to the SCell fast activation state 1210 in response to a new MAC CE trigger received on PCell or SCell.

Figure 14:
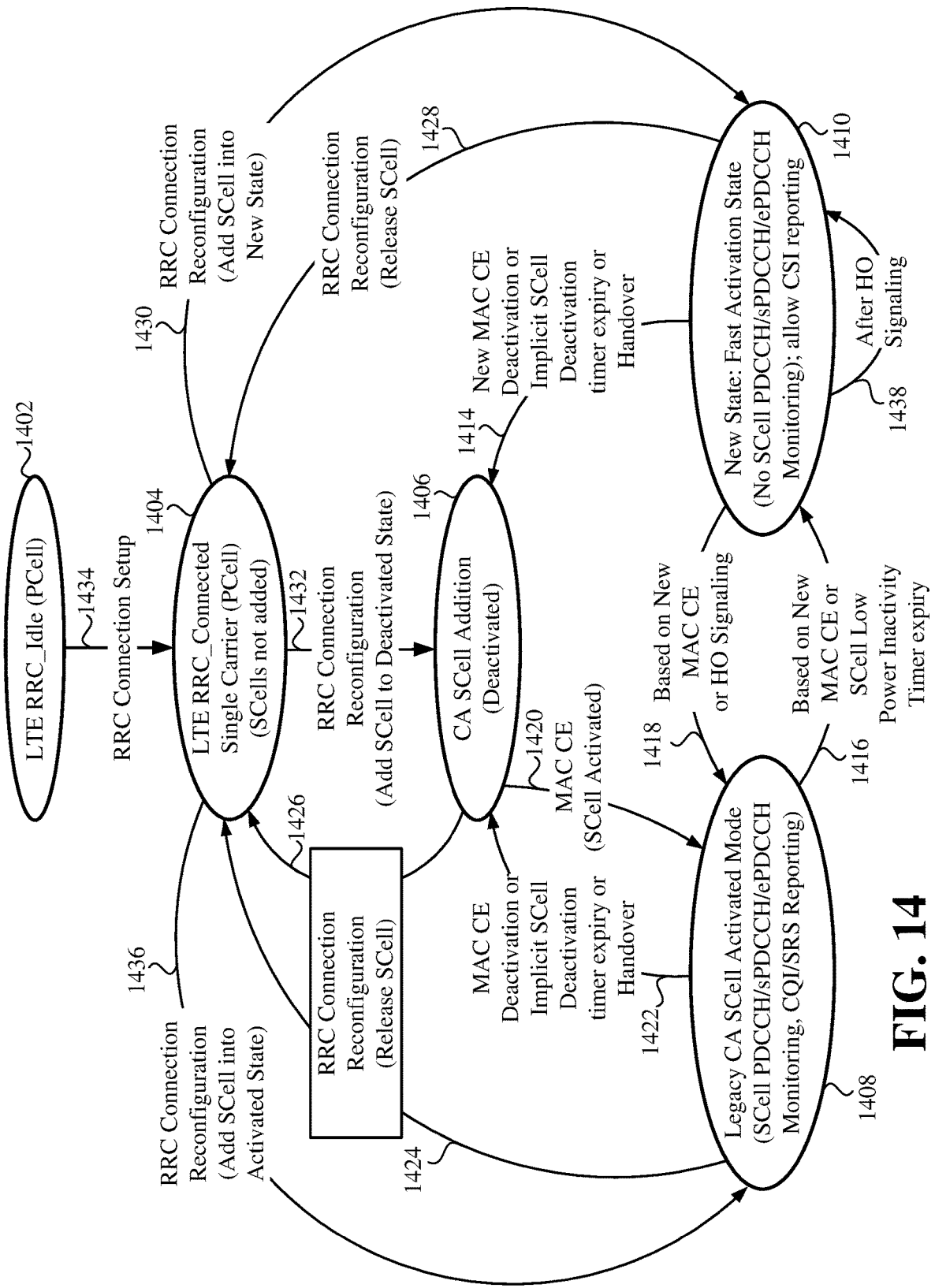
FIG. 14 is an example state transition diagram for a PCell and an SCell in accordance with some aspects of the disclosure.

FIG. 14 is a third example state transition diagram for a PCell and an SCell in accordance with some aspects of the disclosure. In some aspects of the disclosure, the states 1402, 1404, 1406, 1408, and 1410 shown in FIG. 14 respectively correspond to the previously described states 602, 604, 606, 608, and 610 shown in FIG. 6. In such aspects, the state transitions 1414, 1416, 1420, 1422, 1424, 1426, 1428, 1430, 1432, 1434, and 1436 shown in FIG. 14 respectively correspond to the state transitions 614, 616, 620, 622, 624, 626, 628, 630, 632, 634, and 636 shown in FIG. 6. It should be noted that in the example configuration of FIG. 14, there is no state transition from the legacy deactivated state 1406 to the new state 1410 (also referred to as the SCell fast activation state 1410).

State transitions 1414, 1416, 1418, 1428, and 1438 are new transitions due to the new state 1410. In accordance with some aspects of the disclosure, the state transitions 1414, 1416, and 1418 may be defined using a new MAC CE. In an aspect of the disclosure, with reference to the state transition 1418, the SCell may be moved directly from the SCell fast activation state 1410 to the legacy activated state 1408 (e.g., the activated mode) in response to a handover (HO) indication (e.g., in response to receiving a handover signal or in response to receiving an RRC signalling indication). In an aspect of the disclosure, with reference to the state transition 1428, when the UE receives an RRC Connection Reconfiguration message with an SCell release indication, the SCell may be released from the SCell fast activation state 1410. In an aspect of the disclosure, with reference to the state transition 1430, upon the addition of the SCell, the SCell may be allowed to transition directly from state 1404 to the SCell fast activation state 1410 based on an RRC new information element (IE) indication. In an aspect of the disclosure, with reference to the state transition 1438, based on handover signalling, the SCell (and the UE) may continue to stay in the SCell fast activation state 1410 after handover as well.

As previously described with reference to FIG. 6, if there is an SCell configured with SCellIndex i, the value of the $C_i$ field may indicate the fast activation/deactivation transition of the SCell with SCellIndex i. Otherwise, the MAC entity may ignore the value of the $C_i$ field. For example, in FIG. 14, the $C_i$ field may be set to '1' to indicate that the SCell with SCellIndex i transitions to the SCell fast activation state, or may be set to '0' to indicate that the SCell with SCellIndex i transitions out of the SCell fast activation state. For example, the reserved bit R may be set to '0'. In one aspect of the disclosure, for the case with no serving cell with a ServCellIndex larger than 7, the Fast Activation/Deactivation MAC control element of one octet may be applied, otherwise the Fast Activation/Deactivation MAC control element of four octets may be applied.

Figure 15:
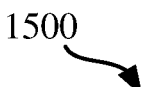
FIG. 15 illustrates a table indicating new MAC CE values and legacy MAC CE values for controlling the state transitions of an SCell in accordance with various aspects of the disclosure.

FIG. 15 illustrates a table 1500 indicating new MAC CE values and legacy MAC CE values for controlling the state transitions of an SCell in accordance with various aspects of the disclosure. It should be noted that the state transitions 1502 and 1504, and the corresponding new MAC CE values and legacy MAC CE values, involve transitions from a legacy activated state (e.g., the legacy activated state 1408) of an SCell to the new state (e.g., the SCell fast activation state 1410). It should further be noted that the state transitions 1506 and 1508, and the corresponding new MAC CE values and legacy MAC CE values, involve transitions from the new state of an SCell to a legacy state of the SCell. It should be understood that the notation "--" in FIG. 15 indicates that a value is absent or not received, and the notation "X" indicates that a value may be '0' or '1'.

A new MAC CE based state transition (e.g., state transition 1416) from a legacy state (e.g., the legacy activated state 1408) to the new state (e.g., the SCell fast activation state 1410) will now be described. In an aspect of the disclosure, if a UE receives a new MAC CE that includes a $C_i$ field (e.g., a $C_i$ field corresponding to a particular SCell) set to '1', the UE may transition from the legacy active state 1408 to the SCell fast activation state 1410. A new MAC CE based state transition (e.g., state transition 1418) from the new state (e.g., the SCell fast activation state 1410) to a legacy state (e.g., the legacy activated state 1408) will now be described. In an aspect of the disclosure, if a UE receives a new MAC CE that includes a $C_i$ field (e.g., a $C_i$ field corresponding to a particular SCell) set to '0', the UE may transition from the SCell fast activation state 1410 to the legacy activated state 1408.

In one aspect of the disclosure, if an SCell is in a legacy deactivated state (e.g., the state 1406) and if a UE receives both a legacy MAC CE and a new MAC CE, then only the legacy MAC CE is used for state transition and the new MAC CE is ignored. In another aspect of the disclosure, an SCell may be in a legacy activated state (e.g., the state 1408) and a UE may receive both a legacy MAC CE and a new MAC CE. In this aspect, the UE may transition to the SCell fast activation state 1410 when both the legacy MAC CE and the new MAC CE are set to '1'. The UE may transition to the legacy deactivated state 1406 when both the legacy MAC CE and the new MAC CE are set to '0'.

An SCell in the new state (e.g., the SCell fast activation state) may transition to a legacy state depending on the values of both legacy MAC CE values and new MAC CE values. In one example, with reference to FIG. 14, an SCell (and a UE) may currently be in the SCell fast activation state 1410. In such example, the UE may receive both a legacy MAC CE and a new MAC CE, and may transition from the SCell fast activation state 1410 to the legacy activated state 1408 (e.g., the legacy carrier aggregation (CA) activated mode) when the $C_i$ field corresponding to the SCell in the new MAC CE is set to '0' and the $C_i$ field corresponding to the SCell in the legacy MAC CE is set to '1'. In another example, again with reference to FIG. 14, an SCell (and a UE) may currently be in the SCell fast activation state 1410. The UE may receive both a legacy MAC CE and a new MAC CE, and may transition from the SCell fast activation state 1410 to the legacy deactivated state 1406 when the $C_i$ field corresponding to the SCell in the new MAC CE is set to '0' and the $C_i$ field corresponding to the SCell in the legacy MAC CE is set to '0'. In accordance with some aspects of the disclosure, this approach may require only one new MAC CE to be signaled to handle all possible new state transitions, in addition to the signaling of a legacy MAC CE.

In one aspect of the disclosure, with reference to FIG. 14, an SCell may transition from the legacy activated state 1408 (e.g. the SCell PDCCH Monitoring State of the SCell Activated State) to a new state (e.g., the SCell fast activation state 1410) in response to an expiration of an inactivity timer (e.g., "Low Power Inactivity Timer Expiry") specific to the SCell. The Low Power Inactivity Timer may be a function of a connected mode discontinuous reception (CDRX) inactivity timer or a newly defined timer. This is new timer behavior. In some aspects of the disclosure, the transition 1416 may be prioritized by defining a shorter Low Power Inactivity Timer compared to a legacy SCell inactivity timer, in which case the legacy transition 1422 due to SCell inactivity timer expiry may not occur. In one aspect of the disclosure, with reference to FIG. 14, an SCell may transition from the legacy activated state 1408 (e.g. the SCell PDCCH Monitoring State of the SCell Activated State) to the SCell fast activation state 1410 in response to a new MAC CE trigger received on PCell or SCell.

State Transitions Using Two Bits in New MAC CE Values

FIG. 16 illustrates an example format 1600 of a new SCell activation/deactivation MAC CE of two octets. As shown in FIG. 16, the example format 1600 has a fixed size and includes 14 C-fields and two R-fields. The 14 C-fields may represent a bitmap carried in the new MAC CE, where each pair of C-fields having the same index $C_i$ (also referred to herein as a $C_iC_i$ value or a $C_iC_i$ value for a new MAC CE) may correspond to a particular SCell. For example, the pair of C-fields 1602 having the same C-field index $C_1$ may correspond to one SCell, the pair of C-fields 1604 having the same C-field index $C_2$ may correspond to another SCell, and so on. Therefore, the example format 1600 allocates two bits for each SCell. In some aspects of the disclosure, a $C_iC_i$ value as described herein may be a 2-bit value that is carried in a pair of C-fields (e.g., the pair of C-fields 1602) having the same C-field index. For example, with reference to FIG. 16, when a $C_iC_i$ value of '00' is to be indicated to an SCell corresponding to the index $C_7$, the $C_7$ field 1606 and the $C_7$ field 1608 may include the value '0'.

FIG. 17 illustrates an example format 1700 of a new SCell activation/deactivation MAC CE of eight octets. As shown in FIG. 17, the example format 1700 has a fixed size and includes 62 C-fields and two R-fields. The 62 C-fields may represent a bitmap carried in the new MAC CE, where each pair of C-fields having the same index $C_i$ may correspond to a particular SCell. For example, the pair of C-fields 1702 having the same C-field index $C_1$ may correspond to one SCell, the pair of C-fields 1704 having the same C-field index $C_2$ may correspond to another SCell, and so on. Therefore, the example format 1700 allocates two bits for each SCell.

FIG. 18 illustrates a table 1800 including a list of example logical channel identifier (LCID) values. For example, the LCID values in FIG. 18 may be for a downlink (DL) shared channel. In some aspects of the disclosure, one or more new LCID values, such as the new LCID value 1802, may be implemented to represent one or more corresponding new MAC CEs for controlling state transitions involving the previously described new state (e.g., SCell fast activation state 610 in FIG. 6). In some aspects of the disclosure, the format of such a new MAC CE may be similar to the example format 1600 of a new SCell activation/deactivation MAC CE of two octets shown in FIG. 16 or the example format 1700 of a new SCell activation/deactivation MAC control element of eight octets shown in FIG. 17. In some aspects of the disclosure, the Fast Activation/Deactivation MAC CE of two octets or eight octets may be identified by a MAC PDU sub header with a single new LCID value (e.g., the new LCID value 1802 in FIG. 18). In such aspects, for example, $R_1$ (e.g., $R_1$ of the two R-fields previously described with reference to FIGS. 16 and 17) of a new SCell activation/deactivation MAC control element may be set to '0' to indicate the two-octet format (e.g., the example format 1600) or may be set to '1' to indicate the eight-octet format (e.g., the example format 1700). In some aspects of the disclosure, $R_2$ may be reserved. In other aspects of the disclosure, $R_2$ may be used to indicate the two-octet format or the eight-octet format, while $R_1$ is reserved. Therefore, in some aspects of the disclosure, one of $R_1$ and $R_2$ may be implemented as an extension bit (also referred to as an E-bit) for indicating the two-octet format or the eight-octet format, and the other of $R_1$ and $R_2$ may be a reserved bit.

Figure 19:
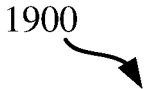
FIG. 19 illustrates a table indicating exemplary new MAC CE values and their corresponding state transition actions in accordance with various aspects of the disclosure.

The previously described new MAC CE implementing 2-bits for each SCell (e.g., the example format 1600 or the example format 1700) may have a higher priority than a legacy MAC CE when both the new MAC CE implementing 2-bits for each SCell and a legacy MAC CE are received in the same subframe (e.g., in the same MAC transport block). The new MAC CE implementing 2-bits for each SCell may minimize the need for a legacy MAC CE in the same subframe as well as eliminate the need for simultaneous MAC CEs in the same subframe. In some aspects of the disclosure, the new MAC CE implementing 2-bits for each SCell may be used independently for any of the possible state transitions, without backward compatibility issues. In some aspects of the disclosure, a legacy MAC CE may also be used without the new MAC CE implementing 2-bits for each SCell in the same subframe. If both a legacy MAC CE and the new MAC CE implementing 2-bits for each SCell is received, then new MAC-CE may take precedence. In some aspects of the disclosure, the new MAC CE implementing 2-bits for each SCell may enable multiple SCells in different states to transition from their current states to different states. The new MAC CE implementing 2-bits for each SCell may enable a state transmission of an SCell without needing both a new MAC CE and a legacy MAC CE in the same subframe to perform the state transition. In some aspects of the disclosure, the new MAC CE implementing 2-bits for each SCell may simplify the number of use cases (e.g., implementation and validation) significantly. With respect to deployment, the new MAC CE implementing 2-bits for each SCell may be conveniently incorporated into existing systems without requiring significant modifications, which may facilitate adoption of the new MAC CE implementing 2-bits for each SCell during commercialization. It should be noted that backward compatibility with legacy MAC CEs may still be maintained FIG. 19 illustrates a table 1900 indicating exemplary $C_iC_i$ values for a new MAC CE (e.g., for a new MAC CE implementing 2-bits for each SCell) and their corresponding state transition actions in accordance with various aspects of the disclosure. As shown in the example of FIG. 19, the $C_iC_i$ value '00' in row 1902 of table 1900 may indicate no change in state of an SCell (e.g., no transition to another state, or maintain the current state), the $C_iC_i$ value '01' in row 1904 of table 1900 may indicate a transition to the new state of an SCell (e.g., the SCell fast activation state), the $C_iC_i$ value '10' in row 1906 of table 1900 may indicate a transition to the legacy activated state of an SCell, and the $C_iC_i$ value '11' in row 1908 of table 1900 may indicate a transition to the legacy deactivated state of an SCell. For example, the state transition action "New State" corresponding to the $C_iC_i$ value '01' (e.g., in row 1902 of the table 1900), may involve a transition from a legacy state of an SCell to the new state (e.g., the SCell fast activation state) of the SCell. Therefore, a UE operating in the legacy state may transition to the new state (e.g., the SCell fast activation state) when the $C_iC_i$ value '01'. It should be understood that the 2-bit values used to indicate each state transition action in the table 1900 may be different in other aspects of the disclosure.

Figure 20:
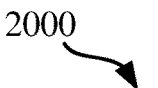
FIG. 20 illustrates a table indicating exemplary new MAC CE values and legacy MAC CE values for controlling the state transitions of an SCell in accordance with various aspects of the disclosure.
Figure 21:
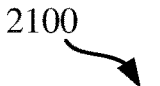
FIG. 21 illustrates a table indicating exemplary new MAC CE values and legacy MAC CE values for controlling the state transitions of an SCell in accordance with various aspects of the disclosure.
Figure 22:
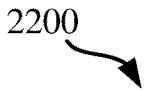
FIG. 22 illustrates a table indicating exemplary new MAC CE values and legacy MAC CE values for controlling the state transitions of an SCell in accordance with various aspects of the disclosure.

Control of SCell State Transitions in the First Example State Transition Diagram (e.g., in FIG. 6) Using Two Bits in New MAC CE Values SCell state transitions to the new state from a legacy state when using two bits for each SCell in a new MAC CE will now be described with reference to FIGS. 6 and 20. FIG. 20 illustrates a table 2000 including exemplary 2-bit values (e.g., $C_iC_i$ values) for a new MAC CE for controlling the state transitions of an SCell, and including legacy MAC CE values for controlling the state transitions of the SCell, in accordance with various aspects of the disclosure. For example, the term "source state" (as indicated in FIGS. 20-22) may refer to an initial or current state of an SCell and the term "target state" (as indicated in FIGS. 20-22) may refer to the state that the SCell may transition to (or a state which is maintained by the SCell when the source state and the target state are the same). It should be noted that the state transitions in rows 2004 and 2010 of the table 2000, and the corresponding 2-bit values (e.g., $C_iC_i$ values) for the new MAC CE and the value of the legacy MAC CE, involve transitions (e.g., the transitions 612, 616 in FIG. 6) from a legacy state of an SCell to the new state (e.g., the previously described SCell fast activation state). The values in table 2000 serve to show one example implementation to facilitate understanding of the aspects described herein. Therefore, it should be understood that one or more of the values (e.g., the actual values of the bits) in table 2000 may be configured differently in other aspects. It should be understood that the notation "X" in FIG. 20 indicates that a value may be '0' or '1', or that the value is absent or not received.

The state transition actions associated with the 2-bit values (e.g., $C_iC_i$ values) in the new MAC CE in table 2000 may be determined from the exemplary $C_iC_i$ values for the new MAC CE described in FIG. 19. For example, with reference to row 2004 in the table 2000, a state transition (e.g., transition 612 in FIG. 6) from the deactivated state of an SCell to the new state of the SCell may be initiated when the two bits (in the new MAC CE) allocated for that SCell are set to indicate the value '01' (e.g., where the $C_iC_i$ value '01' is defined in table 1900 to mean transition to the new state). It should be further noted that the state transitions indicated in table 2000 may be achieved independent of a value in a legacy MAC CE.

In some aspects of the disclosure, if a UE receives a new MAC CE that includes a $C_iC_i$ value (e.g., the value from the two $C_i$ fields corresponding to a particular SCell) set to '01', the UE may transition from a legacy state to the new state. In a first example state transition (e.g., as indicated in row 2004 of table 2000), if the SCell (and the UE) is in a legacy deactivated state (also herein referred to as a legacy SCell deactivated state) and the UE receives a new MAC CE with a $C_iC_i$ value (e.g., the value from the two $C_i$ fields corresponding to the SCell) set to '01', the UE may transition to the SCell fast activation state. In a second example state transition (e.g., as indicated in row 2010 of table 2000), if the SCell (and the UE) is in a legacy activated state and the UE receives a new MAC CE with a $C_iC_i$ value set to '01', the UE may transition (e.g., transition 616 in FIG. 6) to the SCell fast activation state. In some of the aspects described herein, if a UE receives only one MAC CE (e.g., either a new MAC CE implementing two bits or a legacy MAC CE), the UE may act based on the received MAC CE. If a UE receives both a legacy MAC CE and a new MAC CE in the same subframe (e.g., for the same SCell), the new MAC CE may take precedence over the legacy MAC CE. Accordingly, in a scenario where a UE receives both a legacy MAC CE and a new MAC CE in the same subframe, the UE may ignore the $C_i$ field in the legacy MAC CE.

SCell state transitions from the new state to a legacy state when using two bits in new MAC CE values will now be described with reference to FIGS. 6 and 20. It should be noted that the state transitions in rows 2014 and 2016 of the table 2000, and the corresponding 2-bit values (e.g., $C_iC_i$ values) for the new MAC CE and the value of the legacy MAC CE, involve transitions from the new state (e.g., the previously described SCell fast activation state) to a legacy state. For example, with reference to row 2014 in the table 2000, a state transition (e.g., transition 618 in FIG. 6) from the new state of an SCell to the legacy activated state of the SCell may be initiated when the two bits (in the new MAC CE) allocated for that SCell are set to indicate the value '10' (e.g., where the $C_iC_i$ value '10' is defined in table 1900 to mean transition to the legacy activated state). As another example, with reference to row 2016 in the table 2000, a state transition (e.g., transition 614 in FIG. 6) from the new state of an SCell to the legacy deactivated state of the SCell may be initiated when the two bits (in the new MAC CE) allocated for that SCell are set to indicate the value '11' (e.g., where the $C_iC_i$ value '11' is defined in table 1900 to mean transition to the legacy deactivated state).

In some aspects of the disclosure, if a UE receives a new MAC CE that includes a $C_iC_i$ value (e.g., the value from the two $C_i$ fields corresponding to a particular SCell) set to '10', the UE may transition from the new state to the legacy activated state. In a first example state transition (e.g., as indicated in row 2014 of table 2000), if the SCell (and the UE) is in the new state and the UE receives a new MAC CE with a $C_iC_i$ value (e.g., the value from the two $C_i$ fields corresponding to the SCell) set to '10', the UE may transition to the legacy activated state. In a second example state transition (e.g., as indicated in row 2016 of table 2000), if the SCell (and the UE) is in the new state and the UE receives a new MAC CE with a $C_iC_i$ value set to indicate the value '11', the UE may transition (e.g., transition 614 in FIG. 6) to the legacy deactivated state.

SCell state transitions from one legacy state to another legacy state when using two bits in new MAC CE values will now be described. With reference to the table 2000 in FIG. 20, it should be noted that the state transitions in rows 2002 and 2008, and the corresponding 2-bit values (e.g., $C_iC_i$ values) for the new MAC CE and the value of the legacy MAC CE, involve transitions from one legacy state of an SCell to another legacy state of the SCell. For example, with reference to row 2002 in the table 2000, a state transition (e.g., transition 620 in FIG. 6) from the legacy deactivated state of an SCell to the legacy activated state of the SCell may be initiated when the two bits (in the new MAC CE) allocated for that SCell are set to indicate the value '10' (e.g., where the $C_iC_i$ value '10' is defined in table 1900 to mean transition to the legacy activated state). As another example, with reference to row 2008 in the table 2000, a state transition (e.g., transition 622 in FIG. 6) from the legacy activated state of an SCell to the legacy deactivated state of the SCell may be initiated when the two bits (in the new MAC CE) allocated for that SCell are set to indicate the value '11' (e.g., where the $C_iC_i$ value '11' is defined in table 1900 to mean transition to the legacy deactivated state). Therefore, in some aspects of the disclosure, if a UE receives a new MAC CE that includes a $C_iC_i$ value (e.g., the value from the two $C_i$ fields corresponding to a particular SCell) set to '10', the UE may transition from the legacy deactivated state to the legacy activated state. Accordingly, in some aspects of the disclosure, if a UE receives a new MAC CE that includes a $C_iC_i$ value (e.g., the value from the two $C_i$ fields corresponding to a particular SCell) set to '11', the UE may transition from the legacy activated state to the deactivated state.

In some aspects of the disclosure, the two bits in the new MAC CE value may be set to maintain the current state of an SCell. With reference to the table 2000 in FIG. 20, it should be noted that the state transitions in rows 2006, 2012, and 2018, and the corresponding new MAC CE values are configured to cause an SCell to maintain its current state. For example, with reference to row 2018 in the table 2000, an SCell currently in the new state may remain in the new state when the two bits (in the new MAC CE) allocated for that SCell are set to indicate the value '00' (e.g., where the $C_iC_i$ value '00' is defined in table 1900 to mean no change in state). Therefore, in some aspects of the disclosure, if a UE receives a new MAC CE that includes a $C_iC_i$ value (e.g., the value from the two $C_i$ fields corresponding to a particular SCell) set to '00', the UE may not transition to another state (e.g., the UE may maintain its current state).

Control of SCell State Transitions in the Second Example State Transition Diagram (e.g., in FIG. 12) Using Two Bits in New MAC CE Values SCell state transitions to the new state from a legacy state when using two bits in new MAC CE values will now be described with reference to FIGS. 12 and 21. FIG. 21 illustrates a table 2100 indicating exemplary 2-bit values (e.g., $C_iC_i$ values) for a new MAC CE for controlling the state transitions of an SCell, and including a legacy MAC CE value for controlling the state transitions of the SCell, in accordance with various aspects of the disclosure. It should be noted that the state transition in row 2108 of the table 2100, and the corresponding 2-bit value (e.g., $C_iC_i$ values) for the new MAC CE values and the legacy MAC CE value, involve a transition (e.g., the transition 1216 in FIG. 12) from a legacy activated state of an SCell to the new state (e.g., the previously described SCell fast activation state). The values in table 2100 serve to show one example implementation to facilitate understanding of the aspects described herein. Therefore, it should be understood that one or more of the values (e.g., the actual values of the bits) in table 2100 may be configured differently in other aspects.

The state transition actions associated with the 2-bit values (e.g., $C_iC_i$ values) in the new MAC CE in table 2100 may be determined from the exemplary $C_iC_i$ values for the new MAC CE described in FIG. 19. For example, with reference to row 2108 in the table 2100, a state transition (e.g., transition 1216 in FIG. 12) from the legacy activated state of an SCell to the new state of the SCell may be initiated when the two bits (in the new MAC CE) allocated for that SCell are set to indicate the value '01' (e.g., where the where the $C_iC_i$ value '01' is defined in table 1900 to mean transition to the new state). It should be further noted that the state transitions indicated in table 2100 may be achieved independent of a value in a legacy MAC CE. It should be understood that the notation "X" in FIG. 21 indicates that a value may be '0' or '1', or that the value is absent or not received.

In some aspects of the disclosure, if a UE receives a new MAC CE that includes a $C_iC_i$ value (e.g., the value from the two $C_i$ fields corresponding to a particular SCell) set to '01', the UE may transition from the legacy activated state to the new state. In an example state transition (e.g., as indicated in row 2108 of table 2100), if the SCell (and the UE) is in a legacy activated state and the UE receives a new MAC CE that includes a $C_iC_i$ value (e.g., the value from the two $C_i$ fields corresponding to a particular SCell) set to '01', the UE may transition (e.g., transition 1216 in FIG. 12) to the SCell fast activation state. In some of the aspects described herein, if a UE receives only one MAC CE (e.g., either a new MAC CE implementing two bits or a legacy MAC CE), the UE may act based on the received MAC CE. If a UE receives both a legacy MAC CE and a new MAC CE in the same subframe (e.g., for the same SCell), the new MAC CE may take precedence over the legacy MAC CE. Accordingly, in a scenario where a UE receives both a legacy MAC CE and a new MAC CE in the same subframe, the UE may ignore the $C_i$ field in the legacy MAC CE.

SCell state transitions from the new state to a legacy state when using two bits in a new MAC CE will now be described with reference to FIGS. 12 and 21. It should be noted that the state transition in row 2112 of the table 2100, and the corresponding 2-bit value (e.g., $C_iC_i$ value) for the new MAC CE and the value of the legacy MAC CE, involve a transition from the new state (e.g., the previously described SCell fast activation state) to a legacy state. For example, with reference to row 2112 in the table 2100, a state transition (e.g., transition 1218 in FIG. 12) from the new state of an SCell to the legacy activated state of the SCell may be initiated when the two bits (in the new MAC CE) allocated for that SCell are set to indicate the value '10' (e.g., where the $C_iC_i$ value '10' is defined in table 1900 to mean transition to the legacy activated state).

In some aspects of the disclosure, if a UE receives a new MAC CE that includes a $C_iC_i$ value (e.g., the value from the two $C_i$ fields corresponding to a particular SCell) set to '10', the UE may transition from the new state to the legacy activated state. In a first example state transition (e.g., as indicated in row 2014 of table 2100), if the SCell (and the UE) is in the new state and the UE receives a new MAC CE with a $C_iC_i$ value (e.g., the value from the two $C_i$ fields corresponding to a particular SCell) set to '10', the UE may transition to the legacy activated state.

SCell state transitions from one legacy state to another legacy state when using two bits in new MAC CE values will now be described. With reference to the table 2100 in FIG. 21, it should be noted that the state transitions in rows 2102 and 2106, and the corresponding 2-bit values (e.g., $C_iC_i$ values) for the new MAC CE and the values of the legacy MAC CE, involve transitions from a one legacy state of an SCell to another legacy state of the SCell. For example, with reference to row 2102 in the table 2100, a state transition (e.g., transition 1220 in FIG. 12) from the legacy deactivated state of an SCell to the legacy activated state of the SCell may be initiated when the two bits (in the new MAC CE) allocated for that SCell are set to indicate the value '10' (e.g., where the $C_iC_i$ value '10' is defined in table 1900 to mean transition to the legacy activated state). As another example, with reference to row 2106 in the table 2100, a state transition (e.g., transition 1222 in FIG. 12) from the legacy activated state of an SCell to the legacy deactivated state of the SCell may be initiated when the two bits (in the new MAC CE) allocated for that SCell are set to indicate the value '11' (e.g., where the $C_iC_i$ value '11' is defined in table 1900 to mean transition to the legacy deactivated state).

Therefore, in some aspects of the disclosure, if a UE receives a new MAC CE that includes $C_iC_i$ value (e.g., the value from the two $C_i$ fields corresponding to a particular SCell) set to '10', the UE may transition from the legacy deactivated state to the legacy activated state. Accordingly, in some aspects of the disclosure, if a UE receives a new MAC CE that includes a $C_iC_i$ value (e.g., the value from the two $C_i$ fields corresponding to a particular SCell) set to '11', the UE may transition from the legacy activated state to the legacy deactivated state.

In some aspects of the disclosure, the two bits in the new MAC CE may be set to maintain the current state of an SCell. With reference to the table 2100 in FIG. 21, it should be noted that the state transitions in rows 2104, 2110, and 2114, and the corresponding 2-bit values (e.g., $C_iC_i$ values) for the new MAC CE are configured to cause an SCell to maintain its current state. For example, with reference to row 2114 in the table 2100, an SCell currently in the new state may remain in the new state when the two bits (in the new MAC CE) allocated for that SCell are set to indicate the value '00' (e.g., where the $C_iC_i$ value '00' is defined in table 1900 to mean no change in state). Therefore, in some aspects of the disclosure, if a UE receives a new MAC CE that includes a $C_iC_i$ value (e.g., the value from the two $C_i$ fields corresponding to a particular SCell) set to '00', the UE may not transition to another state (e.g., the UE may maintain its current state).

Control of SCell State Transitions in the Third Example State Transition Diagram (e.g., in FIG. 14) Using Two Bits in New MAC CE Values SCell state transitions to the new state from a legacy state when using two bits in new MAC CE values will now be described with reference to FIGS. 14 and 22. FIG. 22 illustrates a table 2200 indicating including exemplary 2-bit values (e.g., $C_iC_i$ values) for a new MAC CE for controlling the state transitions of an SCell, and including legacy MAC CE values for controlling the state transitions of the SCell, in accordance with various aspects of the disclosure. It should be noted that the state transition in row 2208 of the table 2200, and the corresponding 2-bit value (e.g., $C_iC_i$ value) for the new MAC CE and the value of the legacy MAC CE, involve transitions (e.g., the transitions 1416 in FIG. 14) from a legacy activated state of an SCell to the new state (e.g., the previously described SCell fast activation state). It should be understood that the notation "X" in FIG. 22 indicates that a value may be '0' or '1', or that the value is absent or not received.

The values in table 2200 serve to show one example implementation to facilitate understanding of the aspects described herein. Therefore, it should be understood that one or more of the values (e.g., the actual values of the bits) in table 2200 may be configured differently in other aspects. The state transition actions associated with the two bit values in the new MAC CE in table 2200 may be determined from the exemplary $C_iC_i$ values for the new MAC CE values described in FIG. 19. For example, with reference to row 2208 in the table 2200, a state transition (e.g., transition 1416 in FIG. 14) from the legacy activated state of an SCell to the new state of the SCell may be initiated when the two bits (in the new MAC CE) allocated for that SCell are set to indicate the value '01' (e.g., where the $C_iC_i$ value '01' is defined in table 1900 to mean transition to the new state). It should be further noted that the state transitions indicated in table 2200 may be achieved independent of a value in a legacy MAC CE.

In some aspects of the disclosure, if the SCell (and the UE) is in the legacy activated state and the UE receives a new MAC CE that includes a $C_iC_i$ value (e.g., the value from the two $C_i$ fields corresponding to a particular SCell) set to '01', the UE may transition (e.g., transition 1416 in FIG. 14) to the SCell fast activation state. In some of the aspects described herein, if a UE receives only one MAC CE (e.g., either a new MAC CE implementing two bits or a legacy MAC CE), the UE may act based on the received MAC CE.

If a UE receives both a legacy MAC CE and a new MAC CE in the same subframe (e.g., for the same SCell), the new MAC CE may take precedence over the legacy MAC CE. Accordingly, in a scenario where a UE receives both a legacy MAC CE and a new MAC CE in the same subframe, the UE may ignore the $C_i$ field in the legacy MAC CE.

SCell state transitions from the new state to a legacy state when using two bits in new MAC CE values will now be described with reference to FIGS. 14 and 22. It should be noted that the state transitions in rows 2212 and 2214 of the table 2200, and the corresponding 2-bit values (e.g., $C_iC_i$ values) for the new MAC CE and the value of the legacy MAC CE, involve transitions from the new state (e.g., the previously described SCell fast activation state) to a legacy state. For example, with reference to row 2212 in the table 2200, a state transition (e.g., transition 1418 in FIG. 14) from the new state of an SCell to the legacy activated state of the SCell may be initiated when the two bits (in the new MAC CE) allocated for that SCell are set to indicate the value '10' (e.g., where the $C_iC_i$ value '10' is defined in table 1900 to mean transition to the legacy activated state). As another example, with reference to row 2214 in the table 2200, a state transition (e.g., transition 1414 in FIG. 14) from the new state of an SCell to the legacy deactivated state of the SCell may be initiated when the two bits (in the new MAC CE) allocated for that SCell are set to indicate the value '11' (e.g., where the $C_iC_i$ value '11' is defined in table 1900 to mean transition to the legacy deactivated state).

In some aspects of the disclosure, if a UE receives a new MAC CE that includes a $C_iC_i$ value (e.g., the value from the two $C_i$ fields corresponding to a particular SCell) set to '10', the UE may transition from the new state to the legacy activated state. In a first example state transition (e.g., as indicated in row 2212 of table 2200), if the SCell (and the UE) is in the new state and the UE receives a new MAC CE with a $C_iC_i$ value (e.g., the value from the two $C_i$ fields corresponding to a particular SCell) set to '10', the UE may transition to the legacy activated state. In a second example state transition (e.g., as indicated in row 2214 of table 2200), if the SCell (and the UE) is in the new state and the UE receives a new MAC CE with a $C_iC_i$ value (e.g., the value from the two $C_i$ fields corresponding to a particular SCell) set to '11', the UE may transition (e.g., transition 1414 in FIG. 14) to the legacy deactivated state.

SCell state transitions from one legacy state to another legacy state when using two bits in new MAC CE values will now be described. With reference to the table 2200 in FIG. 22, it should be noted that the state transitions in rows 2202 and 2206, and the corresponding 2-bit values (e.g., $C_iC_i$ values) for the new MAC CE and the value of the legacy MAC CE, involve transitions from a one legacy state of an SCell to another legacy state of the SCell. For example, with reference to row 2202 in the table 2200, a state transition (e.g., transition 1420 in FIG. 14) from the legacy deactivated state of an SCell to the legacy activated state of the SCell may be initiated when the two bits (in the new MAC CE) allocated for that SCell are set to indicate the value '10' (e.g., where the $C_iC_i$ value '10' is defined in table 1900 to mean transition to the legacy activated state). As another example, with reference to row 2206 in the table 2200, a state transition (e.g., transition 1422 in FIG. 14) from the legacy activated state of an SCell to the legacy deactivated state of the SCell may be initiated when the two bits (in the new MAC CE) allocated for that SCell are set to indicate the value '11' (e.g., where the $C_iC_i$ value '11' is defined in table 1900 to mean transition to the legacy deactivated state). Therefore, in some aspects of the disclosure, if a UE receives a new MAC CE that includes a $C_iC_i$ value (e.g., the value from the two $C_i$ fields corresponding to a particular SCell) set to '10', the UE may transition from the legacy deactivated state to the legacy activated state. Accordingly, in some aspects of the disclosure, if a UE receives a new MAC CE that includes a $C_iC_i$ value (e.g., the value from the two $C_i$ fields corresponding to a particular SCell) set to '11', the UE may transition from the legacy activated state to the legacy deactivated state.

In some aspects of the disclosure, the two bits in the new MAC CE value may be set to maintain the current state of an SCell. With reference to the table 2200 in FIG. 22, it should be noted that the state transitions in rows 2204, 2210, and 2216, and the corresponding 2-bit values (e.g., $C_iC_i$ values) for the new MAC CE are configured to cause an SCell to maintain its current state. For example, with reference to row 2216 in the table 2200, an SCell currently in the new state may remain in the new state when the two bits (in the new MAC CE) allocated for that SCell are set to indicate the value '00' (e.g., where the $C_iC_i$ value '00' is defined in table 1900 to mean no change in state). Therefore, in some aspects of the disclosure, if a UE receives a new MAC CE that includes a $C_iC_i$ value (e.g., the value from the two $C_i$ fields corresponding to a particular SCell) set to '00', the UE may not transition to another state (e.g., the UE may maintain its current state).

In some aspects of the disclosure, the $C_iC_i$ value (e.g., the $C_iC_i$ value '00' in FIG. 19) in the new MAC CE indicating no change in state may allow control over the state transitions of two or more different SCells in one transmission (e.g., a single new MAC CE). For example, a first SCell may be in the new state and a second SCell may be in the legacy deactivated state. The new MAC CE may implement the $C_iC_i$ value indicating no change in state for the first SCell in order to transition the second SCell to the legacy activated state (without transitioning the first SCell to another state). Therefore, the new MAC CE described herein avoids the need to stagger state transition operations among SCells based on their current operating states as required with legacy MAC CEs, because the control over state transitions of SCells provided by the new MAC CE is independent of legacy MAC CEs.

FIG. 23 is a flow chart illustrating an exemplary process 2300 for transitioning to a secondary cell fast activation state in accordance with some aspects of the present disclosure. As described below, some or all illustrated features may be omitted in a particular implementation within the scope of the present disclosure, and some illustrated features may not be required for implementation of all embodiments. In some examples, the process 2300 may be carried out by the scheduled entity 500 (e.g., a UE) illustrated in FIG. 5. In some examples, the process 2300 may be carried out by any suitable apparatus or means for carrying out the functions or algorithm described below.

At block 2302, the scheduled entity may obtain a medium access control (MAC) control element (CE) from a network, wherein the MAC CE is configured to indicate any one of a plurality of state transition actions for a secondary cell. For example, the MAC CE may be the previously described new MAC CE (e.g., the new SCell activation/deactivation MAC CE of two octets based on the example format 1600 or the new SCell activation/deactivation MAC CE of eight octets based on the example format 1700). For example, the plurality of state transition actions for a secondary cell may be the state transition actions described with reference to FIG. 19.

At block 2304, the scheduled entity may transition to a secondary cell fast activation state when a state transition action indicated by the MAC CE includes a transition to the secondary cell fast activation state. For example, the state transition action indicated by the MAC CE may be indicated with the $C_iC_i$ value '01'.

At block 2306, the scheduled entity may operate in the secondary cell fast activation state.

FIG. 24 is a flow chart illustrating an exemplary process 2400 for transitioning the operating state of a secondary cell in accordance with some aspects of the present disclosure. As described below, some or all illustrated features may be omitted in a particular implementation within the scope of the present disclosure, and some illustrated features may not be required for implementation of all embodiments. In some examples, the process 2400 may be carried out by the scheduled entity 500 (e.g., a UE) illustrated in FIG. 5. In some examples, the process 2400 may be carried out by any suitable apparatus or means for carrying out the functions or algorithm described below.

At block 2402, the scheduled entity may obtain a medium access control (MAC) control element (CE) from a network, wherein the MAC CE is configured to indicate any one of a plurality of state transition actions for a secondary cell. For example, the MAC CE may be the previously described new MAC CE (e.g., the new SCell activation/deactivation MAC CE of two octets based on the example format 1600 or the new SCell activation/deactivation MAC CE of eight octets based on the example format 1700). For example, the plurality of state transition actions for a secondary cell may be the state transition actions described with reference to FIG. 19.

At block 2404, the scheduled entity may transition to a secondary cell activated state (e.g., the legacy activated state) from either a secondary cell deactivated state (e.g., the legacy deactivated state) or a secondary cell fast activation state when a state transition action indicated by the MAC CE includes a transition to the secondary cell activated state.

At block 2406, the scheduled entity may transition to the secondary cell deactivated state from either the secondary cell activated state or the secondary cell fast activation state when the state transition action indicated by the MAC CE includes a transition to the secondary cell deactivated state.

At block 2408, the scheduled entity may operate in the secondary cell activated state based on the transition to the secondary cell activated state or may operate in the secondary cell deactivated state based on the transition to the secondary cell deactivated state.

FIG. 25 is a flow chart illustrating an exemplary process 2500 for transitioning to a secondary cell fast activation state in accordance with some aspects of the present disclosure. As described below, some or all illustrated features may be omitted in a particular implementation within the scope of the present disclosure, and some illustrated features may not be required for implementation of all embodiments. In some examples, the process 2500 may be carried out by the scheduled entity 500 (e.g., a UE) illustrated in FIG. 5. In some examples, the process 2500 may be carried out by any suitable apparatus or means for carrying out the functions or algorithm described below.

At block 2502, the scheduled entity may obtain a medium access control (MAC) control element (CE) from a network. At block 2504, the scheduled entity may transition to a secondary cell fast activation state from either a secondary cell deactivated state or a secondary cell activated state based on the MAC CE. In one aspect of the disclosure, the MAC CE may be a new MAC CE as described herein and may be configured to control a fast activation state of a secondary cell. At block 2506, the scheduled entity may operate at least in the secondary cell fast activation state.

FIG. 26 is a flow chart illustrating an exemplary process 2600 for transitioning to a secondary cell fast activation state in accordance with some aspects of the present disclosure. As described below, some or all illustrated features may be omitted in a particular implementation within the scope of the present disclosure, and some illustrated features may not be required for implementation of all embodiments. In some examples, the process 2600 may be carried out by the scheduled entity 500 (e.g., a UE) illustrated in FIG. 5. In some examples, the process 2600 may be carried out by any suitable apparatus or means for carrying out the functions or algorithm described below.

At block 2602, the scheduled entity may detect an expiration of a reduced power inactivity timer associated with a secondary cell while operating in a secondary cell activated state. At block 2604, the scheduled entity may transition to a secondary cell fast activation state in response to the detection. At block 2606, the scheduled entity may operate at least in the secondary cell fast activation state.

FIG. 27 is a flow chart illustrating an exemplary process 2700 for transitioning to a secondary cell fast activation state in accordance with some aspects of the present disclosure. As described below, some or all illustrated features may be omitted in a particular implementation within the scope of the present disclosure, and some illustrated features may not be required for implementation of all embodiments. In some examples, the process 2700 may be carried out by the scheduled entity 500 (e.g., a UE) illustrated in FIG. 5. In some examples, the process 2700 may be carried out by any suitable apparatus or means for carrying out the functions or algorithm described below.

At block 2702, the scheduled entity may operate in a radio resource control (RRC) connected state with respect to a primary cell. At block 2704, the scheduled entity may detect an addition of a secondary cell. At block 2706, the scheduled entity may transition directly to a secondary cell fast activation state in response to the detection. At block 2708, the scheduled entity may operate at least in the secondary cell fast activation state.

FIG. 28 is a flow chart illustrating an exemplary process 2800 for transitioning to a secondary cell fast activation state in accordance with some aspects of the present disclosure. As described below, some or all illustrated features may be omitted in a particular implementation within the scope of the present disclosure, and some illustrated features may not be required for implementation of all embodiments. In some examples, the process 2800 may be carried out by the scheduled entity 500 (e.g., a UE) illustrated in FIG. 5. In some examples, the process 2800 may be carried out by any suitable apparatus or means for carrying out the functions or algorithm described below.

At block 2802, the scheduled entity may obtain at least a first medium access control (MAC) control element (CE) and a second MAC CE from a network, wherein the first MAC CE controls a transition to/from a fast activation state of a secondary cell, and wherein the second MAC CE controls activation and deactivation of the secondary cell. At block 2804, the scheduled entity may transition to the fast activation state from either a secondary cell deactivated state or a secondary cell activated state based on the first MAC CE independent of the second MAC CE. At block 2806, the scheduled entity may operate at least in the secondary cell fast activation state.

FIG. 29 is a flow chart illustrating an exemplary process 2900 for transitioning to a secondary cell fast activation state in accordance with some aspects of the present disclosure. As described below, some or all illustrated features may be omitted in a particular implementation within the scope of the present disclosure, and some illustrated features may not be required for implementation of all embodiments. In some examples, the process 2900 may be carried out by the scheduled entity 500 (e.g., a UE) illustrated in FIG. 5. In some examples, the process 2900 may be carried out by any suitable apparatus or means for carrying out the functions or algorithm described below.

At block 2902, the scheduled entity may obtain at least a first medium access control (MAC) control element (CE) and a second MAC CE from a network, wherein the first MAC CE controls a transition to/from a fast activation state of a secondary cell, and wherein the second MAC CE controls activation and deactivation of the secondary cell. At block 2904, the scheduled entity may transition to either a secondary cell deactivated state or a secondary cell activated state from the fast activation state based on the second MAC CE, wherein the first MAC CE indicates to transition out of the fast activation state. At block 2906, the scheduled entity may operate in the secondary cell deactivated state or the secondary cell activated state.

FIG. 30 is a flow chart illustrating an exemplary process 3000 for transitioning to a secondary cell fast activation state in accordance with some aspects of the present disclosure. As described below, some or all illustrated features may be omitted in a particular implementation within the scope of the present disclosure, and some illustrated features may not be required for implementation of all embodiments. In some examples, the process 3000 may be carried out by the scheduled entity 500 (e.g., a UE) illustrated in FIG. 5. In some examples, the process 3000 may be carried out by any suitable apparatus or means for carrying out the functions or algorithm described below.

At block 3002, the scheduled entity may obtain at least a first medium access control (MAC) control element (CE) and a second MAC CE from a network, wherein the first MAC CE controls a transition to/from a fast activation state of a secondary cell, and wherein the second MAC CE controls activation and deactivation of the secondary cell. At block 3004, the scheduled entity may transition to a secondary cell activated state from a secondary cell deactivated state based on the second MAC CE, or transition to the secondary cell deactivated state from the secondary cell activated state based on the second MAC CE, wherein the first MAC CE indicates to transition out of the fast activation state. At block 3006, the scheduled entity may operate in the secondary cell activated state or the secondary cell deactivated state.

FIG. 31 is a flow chart illustrating an exemplary process 3100 in accordance with some aspects of the present disclosure. As described below, some or all illustrated features may be omitted in a particular implementation within the scope of the present disclosure, and some illustrated features may not be required for implementation of all embodiments. In some examples, the process 3100 may be carried out by the scheduled entity 500 (e.g., a UE) illustrated in FIG. 5. In some examples, the process 3100 may be carried out by any suitable apparatus or means for carrying out the functions or algorithm described below.

At block 3102, the scheduled entity may obtain a medium access control (MAC) control element (CE) from a network. In one aspect of the disclosure, the MAC CE may be a new MAC CE as described herein and may be configured to control a transition to/from a fast activation state of a secondary cell. At block 3104, the scheduled entity may transition to a secondary cell fast activation state from a secondary cell activated state, or transition to the secondary cell activated state from the secondary cell fast activation state, based on at least the MAC CE. At block 3106, the scheduled entity may operate in the secondary cell fast activation state or the secondary cell activated state.

FIG. 32 is a flow chart illustrating an exemplary process 3200 for transitioning to a secondary cell fast activation state in accordance with some aspects of the present disclosure. As described below, some or all illustrated features may be omitted in a particular implementation within the scope of the present disclosure, and some illustrated features may not be required for implementation of all embodiments. In some examples, the process 3200 may be carried out by the scheduled entity 500 (e.g., a UE) illustrated in FIG. 5. In some examples, the process 3200 may be carried out by any suitable apparatus or means for carrying out the functions or algorithm described below.

At block 3202, the scheduled entity may obtain a medium access control (MAC) control element (CE) from a network. In one aspect of the disclosure, the MAC CE may be a new MAC CE as described herein and may be configured to control a transition to/from a fast activation state of a secondary cell. At block 3204, the scheduled entity may transition to a secondary cell fast activation state from a secondary cell activated state based on at least the MAC CE. At block 3206, the scheduled entity may operate in the secondary cell fast activation state.

FIG. 33 is a flow chart illustrating an exemplary process 3300 for transitioning to a secondary cell dormant state in accordance with some aspects of the present disclosure. As described below, some or all illustrated features may be omitted in a particular implementation within the scope of the present disclosure, and some illustrated features may not be required for implementation of all embodiments. In some examples, the process 3300 may be carried out by the scheduled entity 500 (e.g., a UE) illustrated in FIG. 5. In some examples, the process 3300 may be carried out by any suitable apparatus or means for carrying out the functions or algorithm described below.

At block 3302, the scheduled entity may obtain a medium access control (MAC) control element (CE) from a network, wherein the MAC CE is configured to indicate any one of a plurality of state transition actions for a secondary cell. In some aspects, the MAC CE includes a one-bit value corresponding to the secondary cell, wherein the one-bit value indicates the transition to the secondary cell dormant state. For example, the MAC CE may be the previously described new MAC CE (e.g., the new SCell activation/deactivation MAC CE of two octets based on the example format 1600 or the new SCell activation/deactivation MAC CE of eight octets based on the example format 1700). For example, the plurality of state transition actions for a secondary cell may be the state transition actions described with reference to FIG. 19.

At block 3304, the scheduled entity may transition to a secondary cell dormant state when a state transition action indicated by the MAC CE includes a transition to the secondary cell dormant state. For example, the scheduled entity may transition to the secondary cell dormant state from either a secondary cell deactivated state or a secondary cell activated state. For example, the state transition action indicated by the MAC CE may be indicated with the $C_iC_i$ value '01'.

At block 3306, the scheduled entity may operate in the secondary cell dormant state. In some aspects, the scheduled entity refrains from monitoring at least one downlink control channel when operating in the secondary cell dormant state. In some aspects, the scheduled entity refrains from transferring data between the scheduled entity and the network when operating in the secondary cell dormant state.

FIG. 34 is a flow chart illustrating an exemplary process 3400 for a scheduled entity in accordance with some aspects of the present disclosure. As described below, some or all illustrated features may be omitted in a particular implementation within the scope of the present disclosure, and some illustrated features may not be required for implementation of all embodiments. In some examples, the process 3400 may be carried out by the scheduled entity 500 (e.g., a UE) illustrated in FIG. 5. In some examples, the process 3400 may be carried out by any suitable apparatus or means for carrying out the functions or algorithm described below.

At block 3402, the scheduled entity may obtain a medium access control (MAC) control element (CE) from a network, wherein the MAC CE is configured to control activation and deactivation of a secondary cell. For example, the MAC CE may be a legacy MAC CE as described herein.

At block 3404, the scheduled entity may transition to a secondary cell deactivated state from a secondary cell dormant state when the MAC CE includes an indication to transition to a secondary cell deactivated state.

At block 3406, the scheduled entity may operate in the secondary cell deactivated state.

FIG. 35 is a flow chart illustrating an exemplary process 3500 for transitioning the operating state of a secondary cell in accordance with some aspects of the present disclosure. As described below, some or all illustrated features may be omitted in a particular implementation within the scope of the present disclosure, and some illustrated features may not be required for implementation of all embodiments. In some examples, the process 3500 may be carried out by the scheduled entity 500 (e.g., a UE) illustrated in FIG. 5. In some examples, the process 3500 may be carried out by any suitable apparatus or means for carrying out the functions or algorithm described below.

At block 3502, the scheduled entity may obtain a first medium access control (MAC) control element (CE) and a second MAC CE from a network, wherein the first and second MAC CEs are configured to indicate one of a plurality of state transition actions for a secondary cell, wherein the first MAC CE is configured to control a transition to a secondary cell dormant state and the second MAC CE is configured to control activation and deactivation of the secondary cell. For example, the first MAC CE may be a new MAC CE as described herein and the second MAC CE may be a legacy MAC CE as described herein. For example, the plurality of state transition actions for a secondary cell may be the state transition actions described with reference to FIG. 19.

At block 3504, the scheduled entity may transition to the secondary cell dormant state from either a secondary cell activated state or a secondary cell deactivated state when the first MAC CE includes an indication to transition to the secondary cell dormant state and the second MAC CE includes an indication to transition to the secondary cell activated state or the secondary cell deactivated state.

At block 3506, the scheduled entity may operate in the secondary cell dormant state.

FIG. 36 is a flow chart illustrating an exemplary process 3600 for transitioning the operating state of a secondary cell in accordance with some aspects of the present disclosure.

As described below, some or all illustrated features may be omitted in a particular implementation within the scope of the present disclosure, and some illustrated features may not be required for implementation of all embodiments. In some examples, the process 3600 may be carried out by the scheduled entity 500 (e.g., a UE) illustrated in FIG. 5. In some examples, the process 3600 may be carried out by any suitable apparatus or means for carrying out the functions or algorithm described below.

At block 3602, the scheduled entity may obtain a first medium access control (MAC) control element (CE) and a second MAC CE from a network, wherein the first and second MAC CEs are configured to indicate one of a plurality of state transition actions for a secondary cell, wherein the first MAC CE is configured to control a transition to a secondary cell dormant state and the second MAC CE is configured to control activation and deactivation of the secondary cell. For example, the first MAC CE may be a new MAC CE as described herein and the second MAC CE may be a legacy MAC CE as described herein.

At block 3604, the scheduled entity may transition to a secondary cell activated state from the secondary cell dormant state when the first MAC CE excludes an indication to transition to the secondary cell dormant state and the second MAC CE includes an indication to transition to the secondary cell activated state.

At block 3606, the scheduled entity may transition to a secondary cell deactivated state from the secondary cell dormant state when the first MAC CE excludes an indication to transition to the secondary cell dormant state and the second MAC CE includes an indication to transition to the secondary cell deactivated state.

At block 3608, the scheduled entity may operate in the secondary cell activated state based on the transition to the secondary cell activated state or may operate in the secondary cell deactivated state based on the transition to the secondary cell deactivated state.

FIG. 37 is a flow chart illustrating an exemplary process 3700 for transitioning the operating state of a secondary cell in accordance with some aspects of the present disclosure. As described below, some or all illustrated features may be omitted in a particular implementation within the scope of the present disclosure, and some illustrated features may not be required for implementation of all embodiments. In some examples, the process 3700 may be carried out by the scheduled entity 500 (e.g., a UE) illustrated in FIG. 5. In some examples, the process 3700 may be carried out by any suitable apparatus or means for carrying out the functions or algorithm described below. It should be understood that the blocks indicated with dashed lines in FIG. 37 represent optional blocks.

At block 3702, the scheduled entity may obtain a first medium access control (MAC) control element (CE) and a second MAC CE from a network, wherein the first and second MAC CEs are configured to indicate one of a plurality of state transition actions for a secondary cell, wherein the first MAC CE is configured to control a transition to a secondary cell dormant state and the second MAC CE is configured to control activation and deactivation of the secondary cell. For example, the first MAC CE may be a new MAC CE as described herein and the second MAC CE may be a legacy MAC CE as described herein.

At block 3704, the scheduled entity may transition to a secondary cell activated state from a secondary cell deactivated state when the first MAC CE excludes an indication to transition to the secondary cell dormant state and the second MAC CE includes an indication to transition to the secondary cell activated state.

At block 3706, the scheduled entity may transition to the secondary cell deactivated state from the secondary cell activated state when the first MAC CE excludes an indication to transition to the secondary cell dormant state and the second MAC CE includes an indication to transition to the secondary cell deactivated state.

At block 3708, the scheduled entity may operate in the secondary cell activated state based on the transition to the secondary cell activated state or operate in the secondary cell deactivated state based on the transition to the secondary cell deactivated state.

FIG. 38 is a flow chart illustrating an exemplary process 3800 for transitioning the operating state of a secondary cell in accordance with some aspects of the present disclosure. As described below, some or all illustrated features may be omitted in a particular implementation within the scope of the present disclosure, and some illustrated features may not be required for implementation of all embodiments. In some examples, the process 3800 may be carried out by the scheduled entity 500 (e.g., a UE) illustrated in FIG. 5. In some examples, the process 3800 may be carried out by any suitable apparatus or means for carrying out the functions or algorithm described below.

At block 3802, the scheduled entity may obtain a medium access control (MAC) control element (CE) from a network, wherein the MAC CE is configured to indicate any one of a plurality of state transition actions for a secondary cell.

At block 3804, the scheduled entity may obtain a first logical channel identifier (LCID) value indicating that the MAC CE is a dormant state activation/deactivation MAC CE based on a one octet format or may obtain a second LCID value indicating that the MAC CE is the dormant state activation/deactivation MAC CE based on a four octet format.

At block 3806, the scheduled entity may identify the MAC CE corresponding to the secondary cell based on the one octet format or the four octet format.

FIG. 39 is a flow chart illustrating an exemplary process 3900 for transitioning the operating state of a secondary cell in accordance with some aspects of the present disclosure. As described below, some or all illustrated features may be omitted in a particular implementation within the scope of the present disclosure, and some illustrated features may not be required for implementation of all embodiments. In some examples, the process 3900 may be carried out by the scheduled entity 500 (e.g., a UE) illustrated in FIG. 5. In some examples, the process 3900 may be carried out by any suitable apparatus or means for carrying out the functions or algorithm described below.

At block 3902, the scheduled entity may receive a radio resource control (RRC) connection reconfiguration message, the RRC connection reconfiguration message including an indication to add a secondary cell into a secondary cell activated state or into a secondary cell dormant state.

At block 3904, the scheduled entity may transition directly to the secondary cell activated state or the secondary cell dormant state based on the indication.

FIG. 40 is a flow chart illustrating an exemplary process 4100 for transitioning the operating state of a secondary cell in accordance with some aspects of the present disclosure. As described below, some or all illustrated features may be omitted in a particular implementation within the scope of the present disclosure, and some illustrated features may not be required for implementation of all embodiments. In some examples, the process 4100 may be carried out by the scheduled entity 500 (e.g., a UE) illustrated in FIG. 5. In some examples, the process 4100 may be carried out by any suitable apparatus or means for carrying out the functions or algorithm described below.

At block 4002, the scheduled entity may receive a radio resource control (RRC) connection reconfiguration message, the RRC connection reconfiguration message including an indication to release a secondary cell.

At block 4004, the scheduled entity may release the secondary cell from the secondary cell dormant state. For example, the scheduled entity may release the secondary cell from the secondary cell dormant state in response to the RRC connection reconfiguration message including the indication to release the secondary cell.

FIG. 41 is a flow chart illustrating an exemplary process 4100 for transitioning the operating state of a secondary cell in accordance with some aspects of the present disclosure. As described below, some or all illustrated features may be omitted in a particular implementation within the scope of the present disclosure, and some illustrated features may not be required for implementation of all embodiments. In some examples, the process 4100 may be carried out by the scheduled entity 500 (e.g., a UE) illustrated in FIG. 5. In some examples, the process 4100 may be carried out by any suitable apparatus or means for carrying out the functions or algorithm described below.

At block 4102, the scheduled entity may configure a secondary cell deactivation timer.

At block 4104, the scheduled entity may transition to a secondary cell deactivated state from a secondary cell dormant state upon expiration of the secondary cell deactivation timer.

FIG. 42 is a flow chart illustrating an exemplary process 4200 for transitioning the operating state of a secondary cell in accordance with some aspects of the present disclosure. As described below, some or all illustrated features may be omitted in a particular implementation within the scope of the present disclosure, and some illustrated features may not be required for implementation of all embodiments. In some examples, the process 4200 may be carried out by the scheduled entity 500 (e.g., a UE) illustrated in FIG. 5. In some examples, the process 4200 may be carried out by any suitable apparatus or means for carrying out the functions or algorithm described below. It should be understood that the blocks indicated with dashed lines in FIG. 33 represent optional blocks.

At block 4202, the scheduled entity may configure a secondary cell inactivity timer for a secondary cell, wherein the secondary cell inactivity timer controls a transition to a secondary cell dormant state from a secondary cell activated state.

At block 4204, the scheduled entity may prioritize the secondary cell inactivity timer over at least one other timer configured for the secondary cell.

At block 4206, the scheduled entity may transition to the secondary cell dormant state from the secondary cell activated state upon expiration of the secondary cell inactivity timer.

In one configuration, the apparatus 500 for wireless communication includes means for obtaining a MAC CE from a network. The MAC CE may be configured to indicate any one of a plurality of state transition actions for a secondary cell.

The apparatus 500 for wireless communication may further include means for transitioning to a secondary cell dormant state when a state transition action indicated by the MAC CE includes a transition to the secondary cell dormant state, means for transitioning to a secondary cell deactivated state from a secondary cell dormant state when the MAC CE includes an indication to transition to a secondary cell deactivated state, means for transitioning to the secondary cell dormant state from either a secondary cell activated state or a secondary cell deactivated state when the first MAC CE includes an indication to transition to the secondary cell dormant state and the second MAC CE includes an indication to transition to the secondary cell activated state or the secondary cell deactivated state, means for transitioning to a secondary cell activated state from the secondary cell dormant state when the first MAC CE excludes an indication to transition to the secondary cell dormant state and the second MAC CE includes an indication to transition to the secondary cell activated state, means for transitioning to a secondary cell deactivated state from the secondary cell dormant state when the first MAC CE excludes an indication to transition to the secondary cell dormant state and the second MAC CE includes an indication to transition to the secondary cell deactivated state, means for transitioning to a secondary cell activated state from a secondary cell deactivated state when the first MAC CE excludes an indication to transition to the secondary cell dormant state and the second MAC CE includes an indication to transition to the secondary cell activated state, means for transitioning to the secondary cell deactivated state from the secondary cell activated state when the first MAC CE excludes an indication to transition to the secondary cell dormant state and the second MAC CE includes an indication to transition to the secondary cell deactivated state, means for transitioning directly to the secondary cell activated state or the secondary cell dormant state based on the indication, means for transitioning to a secondary cell deactivated state from a secondary cell dormant state upon expiration of the secondary cell deactivation timer, and/or means for transitioning to the secondary cell dormant state from the secondary cell activated state upon expiration of the secondary cell inactivity timer The apparatus 500 for wireless communication may further include means for transitioning to a secondary cell fast activation state (also referred to as a secondary cell dormant state) when a state transition action indicated by the MAC CE includes a transition to the secondary cell fast activation state. The apparatus 500 for wireless communication may further include means for transitioning to a secondary cell activated state from either a secondary cell deactivated state or a secondary cell fast activation state when a state transition action indicated by the MAC CE includes a transition to the secondary cell activated state. The apparatus 500 for wireless communication may further include means for transitioning to the secondary cell deactivated state from either the secondary cell activated state or the secondary cell fast activation state when the state transition action indicated by the MAC CE includes a transition to the secondary cell deactivated state.

The apparatus 500 for wireless communication may further include means for transitioning to a secondary cell fast activation state from a secondary cell activated state when a state transition action indicated by the MAC CE includes a transition to the secondary cell fast activation state. The apparatus 500 for wireless communication may further include means for transitioning to the secondary cell activated state from the secondary cell fast activation state when the state transition action indicated by the MAC CE includes a transition to the secondary cell activated state. The apparatus 500 for wireless communication may further include means for transitioning to a secondary cell deactivated state from a secondary cell activated state when a state transition action indicated by the MAC CE includes a transition to the secondary cell deactivated state.

The apparatus 500 for wireless communication may further include means for transitioning to a secondary cell deactivated state from a secondary cell activated state when a state transition action indicated by the MAC CE includes a transition to the secondary cell deactivated state. The apparatus 500 for wireless communication may further include means for transitioning to a secondary cell fast activation state from a secondary cell activated state when a state transition action indicated by the MAC CE includes a transition to the secondary cell fast activation state. The apparatus 500 for wireless communication may further include means for transitioning to a secondary cell activated state from a secondary cell fast activation state when a state transition action indicated by the MAC CE includes a transition to the secondary cell activated state.

The apparatus 500 for wireless communication may further include means for transitioning to the secondary cell deactivated state from the secondary cell fast activation state when the state transition action indicated by the MAC CE includes a transition to the secondary cell deactivated state. The apparatus 500 for wireless communication may further include means for obtaining the second MAC CE from the network in the subframe. The apparatus 500 for wireless communication may further include means for discarding the second MAC CE.

The apparatus 500 for wireless communication may further include means for operating in the secondary cell fast activation state (also referred to as the secondary cell dormant state). The apparatus 500 for wireless communication may further include means for operating in the secondary cell activated state based on the transition to the secondary cell activated state or operating in the secondary cell deactivated state based on the transition to the secondary cell deactivated state. The apparatus 500 for wireless communication may further include means for operating in the secondary cell fast activation state based on the transition to the secondary cell fast activation state or operating in the secondary cell activated state based on the transition to the secondary cell activated state.

The apparatus 500 for wireless communication may further include means for operating in the secondary cell deactivated state based on the transition to the secondary cell deactivated state or operating in the secondary cell activated state based on the transition to the secondary cell activated state. The apparatus 500 for wireless communication may further include means for operating in the secondary cell activated state based on the transition to the secondary cell activated state or operating in the secondary cell deactivated state based on the transition to the secondary cell deactivated state.

The apparatus 500 for wireless communication may further include means for operating in the secondary cell activated state based on the transition to the secondary cell activated state or operating in the secondary cell deactivated state based on the transition to the secondary cell deactivated state.

The apparatus 500 for wireless communication may further include means for obtaining an LCID value indicating that the MAC CE is a Fast Activation/Deactivation MAC CE, wherein the Fast Activation/Deactivation MAC CE supports a two octet format or an eight octet format. The apparatus 500 for wireless communication may further include mean for determining whether the two octet format or the eight octet format is to be used based on a value of a preselected bit in the MAC CE. The apparatus 500 for wireless communication may further include means for obtaining a first LCID value indicating that the MAC CE is a dormant state activation/deactivation MAC CE based on a one octet format or obtaining a second LCID value indicating that the MAC CE is the dormant state activation/deactivation MAC CE based on a four octet format.

The apparatus 500 for wireless communication may further include means for identifying the MAC CE corresponding to the secondary cell based on the one octet format or the four octet format.

The apparatus 500 for wireless communication may further include means for receiving an RRC connection reconfiguration message. The apparatus 500 for wireless communication may further include means for configuring a secondary cell deactivation timer. The apparatus 500 for wireless communication may further include means for configuring a secondary cell inactivity timer for a secondary cell, wherein the secondary cell inactivity timer controls a transition to a secondary cell dormant state from a secondary cell activated state. The apparatus 500 for wireless communication may further include means for prioritizing the secondary cell inactivity timer over at least one other timer configured for the secondary cell. The apparatus 500 for wireless communication may further include means for releasing the secondary cell from the secondary cell dormant state.

In one aspect, the aforementioned means may be the processor 504 shown in FIG. 5 configured to perform the functions recited by the aforementioned means. In another aspect, the aforementioned means may be a circuit or any apparatus configured to perform the functions recited by the aforementioned means.

Of course, in the above examples, the circuitry included in the processor 504 is merely provided as an example, and other means for carrying out the described functions may be included within various aspects of the present disclosure, including but not limited to the instructions stored in the computer-readable storage medium 506, or any other suitable apparatus or means described in any one of the FIGS. 1 and/or 2, and utilizing, for example, the processes and/or algorithms described herein in relation to FIGS. 23-42.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. As used herein, the term "obtaining" may include one or more actions including, but not limited to, receiving and/or fetching. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-42 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-42 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An apparatus for wireless communication, comprising: one or more processors; and one or more memories coupled to the one or more processors, the one or more processors being configured to:

obtain a first medium access control (MAC) control element (CE) and a second MAC CE from a network in a same subframe, the first MAC CE and the second MAC CE being configured to indicate one of a plurality of state transition actions for a secondary cell, the first MAC CE being configured to control a transition to a secondary cell dormant state and the second MAC CE being configured to control activation and deactivation of the secondary cell;

transition to the secondary cell dormant state from either a secondary cell activated state or a secondary cell deactivated state, in response to that the first MAC CE includes an indication to transition to the secondary cell dormant state and that the second MAC CE includes an indication to transition to the secondary cell activated state or the secondary cell deactivated state; and operate in the secondary cell dormant state.

2. The apparatus of claim 1, wherein the one or more processors are further configured to:

transition to a secondary cell activated state from the secondary cell dormant state when the first MAC CE excludes an indication to transition to the secondary cell dormant state and the second MAC CE includes an indication to transition to the secondary cell activated state;

transition to a secondary cell deactivated state from the secondary cell dormant state when the first MAC CE excludes an indication to transition to the secondary cell dormant state and the second MAC CE includes an indication to transition to the secondary cell deactivated state; and operate in the secondary cell activated state based on the transition to the secondary cell activated state or operating in the secondary cell deactivated state based on the transition to the secondary cell deactivated state.

3. The apparatus of claim 2, wherein the one or more processors are further configured to:

transition to the secondary cell activated state from the secondary cell deactivated state, in response to that the first MAC CE excludes an indication to transition to the secondary cell dormant state and the second MAC CE includes an indication to transition to the secondary cell activated state;

transition to the secondary cell deactivated state from the secondary cell activated state, in response to that the first MAC CE excludes an indication to transition to the secondary cell dormant state and the second MAC CE includes an indication to transition to the secondary cell deactivated state; and operate in the secondary cell activated state based on the transition to the secondary cell activated state or operating in the secondary cell deactivated state based on the transition to the secondary cell deactivated state.

4. The apparatus of claim 1, wherein the one or more processors are further configured to:

obtain a first logical channel identifier (LCID) value indicating that the first MAC CE is a dormant state activation/deactivation MAC CE based on a one octet format or obtaining a second LCID value indicating that the first MAC CE is the dormant state activation/deactivation MAC CE based on a four octet format; and identify the first MAC CE corresponding to the secondary cell based on the one octet format or the four octet format.

5. The apparatus of claim 1, wherein the one or more processors are further configured to:

receive a radio resource control (RRC) connection reconfiguration message, the RRC connection reconfiguration message including an indication to add the secondary cell into the secondary cell activated state or into the secondary cell dormant state; and transition directly to the secondary cell activated state or the secondary cell dormant state based on the indication.

6. The apparatus of claim 1, wherein the one or more processors are further configured to:

receive a radio resource control (RRC) connection reconfiguration message, the RRC connection reconfiguration message including an indication to release the secondary cell; and release the secondary cell from the secondary cell dormant state.

7. The apparatus of claim 1, wherein the one or more processors are further configured to:

configure a secondary cell deactivation timer; and transition to the secondary cell deactivated state from the secondary cell dormant state upon expiration of the secondary cell deactivation timer.

8. The apparatus of claim 1, wherein the one or more processors are further configured to:

configure a secondary cell inactivity timer for the secondary cell, wherein the secondary cell inactivity timer controls a transition to the secondary cell dormant state from a secondary cell activated state; and transition to the secondary cell dormant state from the secondary cell activated state upon expiration of the secondary cell inactivity timer.

9. A method of wireless communication for a scheduled entity, comprising:

obtaining a first medium access control (MAC) control element (CE) and a second MAC CE from a network in a same subframe, the first MAC CE and the second MAC CE being configured to indicate one of a plurality of state transition actions for a secondary cell, the first MAC CE being configured to control a transition to a secondary cell dormant state and the second MAC CE is configured to control activation and deactivation of the secondary cell;

transitioning to the secondary cell dormant state from either a secondary cell activated state or a secondary cell deactivated state, in response to that the first MAC CE includes an indication to transition to the secondary cell dormant state and that the second MAC CE includes an indication to transition to the secondary cell activated state or the secondary cell deactivated state; and operating in the secondary cell dormant state.

10. The method of claim 9, wherein the operating in the secondary cell dormant state comprises refraining from at least one of:

monitoring at least one downlink control channel of the secondary cell; or transferring data between the scheduled entity and the network.

11. The method of claim 9, further comprising:

transitioning to the secondary cell activated state from the secondary cell dormant state, in response to that the first MAC CE excludes an indication to transition to the secondary cell dormant state and the second MAC CE includes an indication to transition to the secondary cell activated state;

transitioning to the secondary cell deactivated state from the secondary cell dormant state, in response to that the first MAC CE excludes an indication to transition to the secondary cell dormant state and the second MAC CE includes an indication to transition to the secondary cell deactivated state; and operating in the secondary cell activated state based on the transition to the secondary cell activated state or operating in the secondary cell deactivated state based on the transition to the secondary cell deactivated state.

12. The method of claim 11, further comprising:

transitioning to the secondary cell activated state from the secondary cell deactivated state, in response to that the first MAC CE excludes an indication to transition to the secondary cell dormant state and the second MAC CE includes an indication to transition to the secondary cell activated state;

transitioning to the secondary cell deactivated state from the secondary cell activated state, in response to that the first MAC CE excludes an indication to transition to the secondary cell dormant state and the second MAC CE includes an indication to transition to the secondary cell deactivated state; and operating in the secondary cell activated state based on the transition to the secondary cell activated state or operating in the secondary cell deactivated state based on the transition to the secondary cell deactivated state.

13. The method of claim 9, further comprising:

obtaining a first logical channel identifier (LCID) value indicating that the first MAC CE is a dormant state activation/deactivation MAC CE based on a one octet format or obtaining a second LCID value indicating that the MAC CE is the dormant state activation/ deactivation MAC CE based on a four octet format; and identifying the first MAC CE corresponding to the secondary cell based on the one octet format or the four octet format.

14. The method of claim 13, wherein the first MAC CE includes a one-bit value corresponding to the secondary cell.

15. The method of claim 9, further comprising:

receiving a radio resource control (RRC) connection reconfiguration message, the RRC connection reconfiguration message including an indication to add the secondary cell into the secondary cell activated state or into the secondary cell dormant state; and transitioning directly to the secondary cell activated state or the secondary cell dormant state based on the indication.

16. The method of claim 9, further comprising:

receiving a radio resource control (RRC) connection reconfiguration message, the RRC connection reconfiguration message including an indication to release the secondary cell; and releasing the secondary cell from the secondary cell dormant state.

17. The method of claim 9, further comprising:

configuring a secondary cell deactivation timer; and transitioning to the secondary cell deactivated state from the secondary cell dormant state upon expiration of the secondary cell deactivation timer.

18. The method of claim 9, further comprising:

configuring a secondary cell inactivity timer for the secondary cell, wherein the secondary cell inactivity timer controls a transition to the secondary cell dormant state from the secondary cell activated state; and transitioning to the secondary cell dormant state from the secondary cell activated state upon expiration of the secondary cell inactivity timer.

19. The method of claim 18, further comprising:

prioritizing the secondary cell inactivity timer over at least one other timer configured for the secondary cell.

20. A non-transitory computer-readable medium storing computer-executable code, the computer-executable code comprising code for causing a wireless communication device to:

obtain a first medium access control (MAC) control element (CE) and a second MAC CE from a network in a same subframe, the first MAC CE and the second MAC CE being configured to indicate one of a plurality of state transition actions for a secondary cell, the first MAC CE being configured to control a transition to a secondary cell dormant state and the second MAC CE is configured to control activation and deactivation of the secondary cell;

transition to the secondary cell dormant state from either a secondary cell activated state or a secondary cell deactivated state, in response to that the first MAC CE includes an indication to transition to the secondary cell dormant state and that the second MAC CE includes an indication to transition to the secondary cell activated state or the secondary cell deactivated state; and operate in the secondary cell dormant state.

\* \* \* \* \*